(12) United States Patent
Leung et al.

(10) Patent No.: US 12,276,512 B2
(45) Date of Patent: Apr. 15, 2025

(54) SYSTEMS AND METHODS FOR SELECTING VEHICLE ROUTES

(71) Applicant: QUANATA,LLC, San Francisco, CA (US)

(72) Inventors: Theobolt N. Leung, San Francisco, CA (US); Eric Dahl, Newman Lake, WA (US); Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 76 days.

(21) Appl. No.: 17/686,750

(22) Filed: Mar. 4, 2022

(65) Prior Publication Data

US 2022/0187089 A1    Jun. 16, 2022

Related U.S. Application Data

(63) Continuation of application No. PCT/US2020/042306, filed on Jul. 16, 2020.
(Continued)

(51) Int. Cl.
*G01C 21/34* (2006.01)
*B60W 40/09* (2012.01)
(Continued)

(52) U.S. Cl.
CPC ......... *G01C 21/3469* (2013.01); *B60W 40/09* (2013.01); *B60W 50/10* (2013.01);
(Continued)

(58) Field of Classification Search
CPC ............ G01C 21/3469; G01C 21/3484; G01C 21/3492; G01C 21/3617; B60W 40/09;
(Continued)

(56) References Cited

U.S. PATENT DOCUMENTS 5,009,833 A    4/1991 Takeuchi et al.
5,877,954 A    3/1999 Klimasauskas et al.
(Continued)

FOREIGN PATENT DOCUMENTS

CN    107730425 A    2/2018
JP    2014021725 A    2/2014
(Continued)

OTHER PUBLICATIONS

International Search Report and Written Opinion received for PCT Patent Application No. PCT/US2020/039768, mailed on Sep. 2, 2020, 7 pages.
(Continued)

*Primary Examiner* — Jaime Figueroa
*Assistant Examiner* — Joshua Alexander Garza
(74) *Attorney, Agent, or Firm* — BRYAN CAVE LEIGHTON PAISNER LLP

(57) ABSTRACT

Method and system for selecting a vehicle route. For example, the method includes collecting information for a future vehicle trip that will be made by a user, generating multiple routes for the same future vehicle trip, predicting an amount of fuel consumption for each of the multiple routes based at least in part upon information for the route and user driving features of the user, and selecting a route from the multiple routes based at least in part upon the amounts of fuel consumption predicted for the user, where the selected route corresponds to a least amount among the amounts of fuel consumption predicted for the user.

20 Claims, 45 Drawing Sheets

Related U.S. Application Data

(60) Provisional application No. 62/899,038, filed on Sep. 11, 2019.

(51) Int. Cl.

| | | |
|---|---|---|
| *B60W 50/10* | (2012.01) | |
| *G01C 21/36* | (2006.01) | |
| *G06Q 30/018* | (2023.01) | |
| *G06Q 30/0201* | (2023.01) | |
| *G06Q 30/0207* | (2023.01) | |
| *G06Q 50/06* | (2024.01) | |
| *G06Q 50/40* | (2024.01) | |
| *G07C 5/04* | (2006.01) | |

(52) U.S. Cl.
CPC ..... *G01C 21/3484* (2013.01); *G01C 21/3492* (2013.01); *G01C 21/3617* (2013.01); *G06Q 30/018* (2013.01); *G06Q 30/0201* (2013.01); *G06Q 30/0224* (2013.01); *G07C 5/04* (2013.01); *B60W 2510/0638* (2013.01); *B60W 2530/209* (2020.02); *B60W 2540/30* (2013.01); *G06Q 50/06* (2013.01); *G06Q 50/40* (2024.01)

(58) Field of Classification Search
CPC ........... B60W 50/10; B60W 2530/209; B60W 2510/0638; B60W 2540/30; G06Q 30/018; G06Q 30/0201; G06Q 30/0224; G06Q 50/06; G06Q 50/30; G07C 5/04
See application file for complete search history.

(56) References Cited

U.S. PATENT DOCUMENTS

| | | | |
|---|---|---|---|
| 10,565,593 B1 | 2/2020 | Aabram et al. | |
| 10,830,605 B1 | 11/2020 | Chintakindi et al. | |
| 10,832,342 B1 | 11/2020 | Gregorio et al. | |
| 10,915,964 B1 | 2/2021 | Purgatorio et al. | |
| 2008/0059206 A1 | 3/2008 | Jenkins | |
| 2008/0125958 A1 | 5/2008 | Boss et al. | |
| 2009/0157510 A1 | 6/2009 | Pridmore et al. | |
| 2009/0210295 A1 | 8/2009 | Edholm et al. | |
| 2010/0049397 A1 | 2/2010 | Liu et al. | |
| 2010/0057339 A1 | 3/2010 | Pryakhin et al. | |
| 2010/0106603 A1 | 4/2010 | Dey et al. | |
| 2010/0321910 A1 | 12/2010 | Hsu et al. | |
| 2011/0100773 A1 | 5/2011 | Hidaka et al. | |
| 2011/0106370 A1 | 5/2011 | Duddle et al. | |
| 2011/0166773 A1 | 7/2011 | Raz et al. | |
| 2012/0004839 A1 | 1/2012 | Mizuno et al. | |
| 2012/0232783 A1 | 9/2012 | Calkins et al. | |
| 2013/0166326 A1 | 6/2013 | Lavie et al. | |
| 2013/0246133 A1 | 9/2013 | Dembo et al. | |
| 2013/0261942 A1 | 10/2013 | McQuade et al. | |
| 2013/0261966 A1 | 10/2013 | Wang et al. | |
| 2014/0236466 A1 | 8/2014 | Doron | |
| 2014/0277835 A1 | 9/2014 | Filev et al. | |
| 2014/0277874 A1 | 9/2014 | Crombez et al. | |
| 2014/0309914 A1 | 10/2014 | Scofield et al. | |
| 2014/0322676 A1 | 10/2014 | Raman | |
| 2015/0120107 A1 | 4/2015 | Yu et al. | |
| 2015/0226563 A1 | 8/2015 | Cox et al. | |
| 2015/0285651 A1 | 10/2015 | Cerecke et al. | |
| 2016/0033293 A1* | 2/2016 | Nobrega | G01C 21/3461 |
| | | | 701/428 |
| 2016/0034910 A1 | 2/2016 | Davis | |
| 2016/0092899 A1 | 3/2016 | Osberg | |
| 2016/0221578 A1 | 8/2016 | Tang et al. | |
| 2017/0146362 A1 | 5/2017 | Bai et al. | |
| 2017/0323244 A1 | 11/2017 | Rani et al. | |
| 2017/0351978 A1 | 12/2017 | Bellowe | |
| 2017/0364821 A1* | 12/2017 | Mathur | G06N 5/01 |
| 2018/0058868 A1 | 3/2018 | Kang et al. | |
| 2018/0174485 A1 | 6/2018 | Stankoulov | |
| 2018/0285885 A1 | 10/2018 | Laberteaux et al. | |
| 2018/0345981 A1 | 12/2018 | Ferguson et al. | |
| 2019/0113354 A1* | 4/2019 | Matsumura | G01C 21/3453 |
| 2019/0217793 A1 | 7/2019 | Van Hoecke et al. | |
| 2019/0283591 A1* | 9/2019 | Koebler | B60K 35/00 |
| 2020/0039525 A1 | 2/2020 | Hu et al. | |
| 2020/0074492 A1 | 3/2020 | Scholl et al. | |
| 2020/0168012 A1 | 5/2020 | Boss et al. | |
| 2020/0300204 A1 | 9/2020 | Payne et al. | |
| 2021/0012584 A1* | 1/2021 | Saavedra Román | |
| | | | G01C 21/3492 |
| 2021/0370974 A1 | 12/2021 | Park | |

FOREIGN PATENT DOCUMENTS

| | | |
|---|---|---|
| KR | 101484225 B1 | 1/2015 |
| WO | 2009/125178 A2 | 10/2009 |

OTHER PUBLICATIONS

International Search Report and Written Opinion received for PCT Patent Application No. PCT/US2020/039777, mailed on Oct. 29, 2020, 13 pages.

International Search Report and Written Opinion received for PCT Patent Application No. PCT/US2020/039813, mailed on Sep. 14, 2020, 25 pages.

International Search Report and Written Opinion received for PCT Patent Application No. PCT/US2020/042306, mailed on Oct. 2, 2020, 19 pages.

Ojeda et al. "Fuel consumption prediction for heavy-duty vehicles using digital maps", 2017 IEEE 20th International Conference on Intelligent Transportation Systems (ITSC), 2017, 7 pages.

Campolina et al., "Fuel Efficient Routes Using Vehicular Sensor Data" Mobility Management And Wireless Access, pp. 29-36 (2018).

Actuarial Post. Co-Op Insurance first to offer unique carbon offset policies. retrieved from: https://web.archive.org/web/20170408131153/ https://www.actuarialpost.co.uk/article/co-op-insurance-first-to-offer-unique-carbon-offset-policies-10717.htm> 2017.

Environmental Policy. Green Insurnace .< Retrieved from: https://web.archive.org/web/20171222002024/https://www.environmentalpolicy.org.uk/green-insurance.html> 2017.

* cited by examiner

Carbon offsets for mindful driving.

Bring science-based targets and cap-and-trade to individuals. A carbon offset is in investment in a project to reduce in emissions of carbon dioxide or other greenhouse gases made in order to compensate for emissions made elsewhere.

HiRoad buys offsets for a percentage of every mile logged in the beta app based on the year make and model of the vehicle.

remap the 50% discount driving discount into a 100% carbon offset payment.

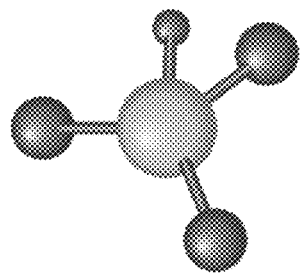

Figure 11

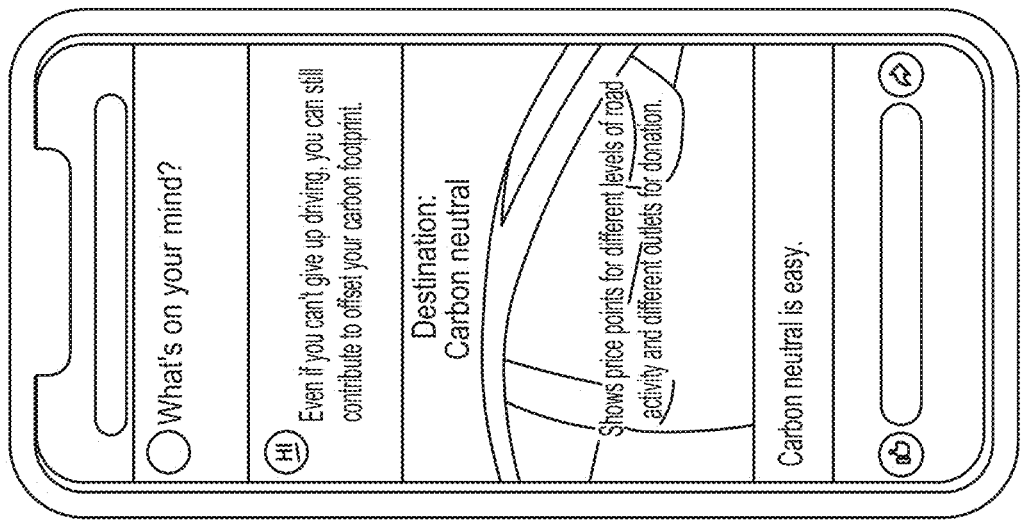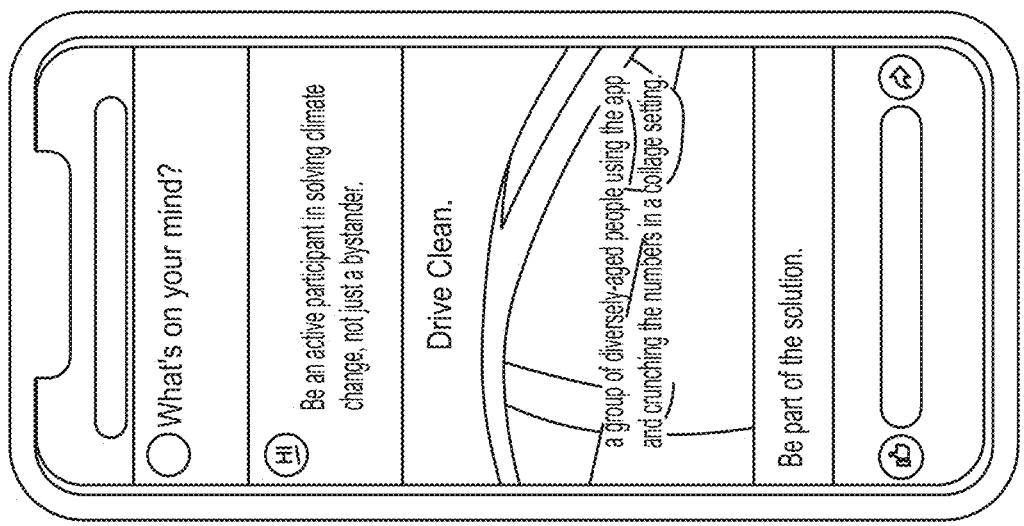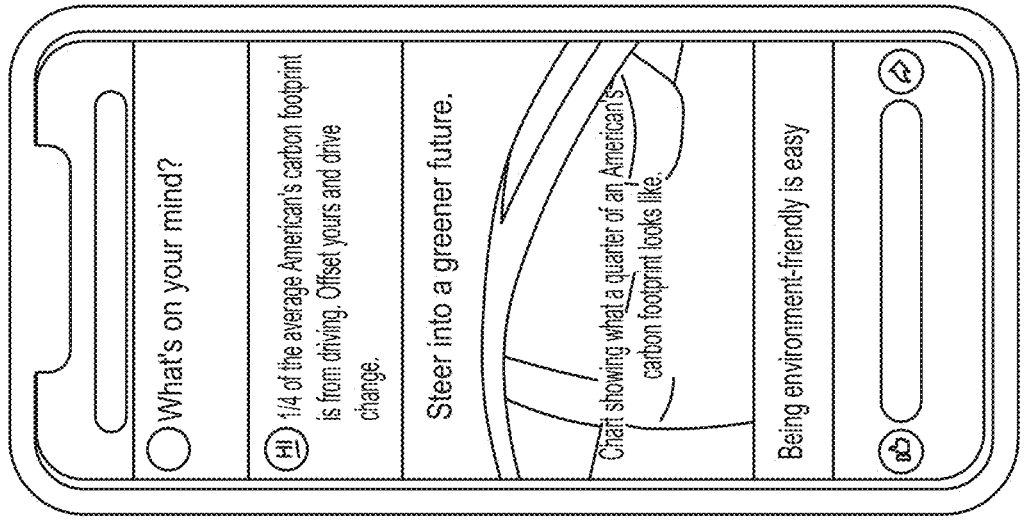
Figure 17

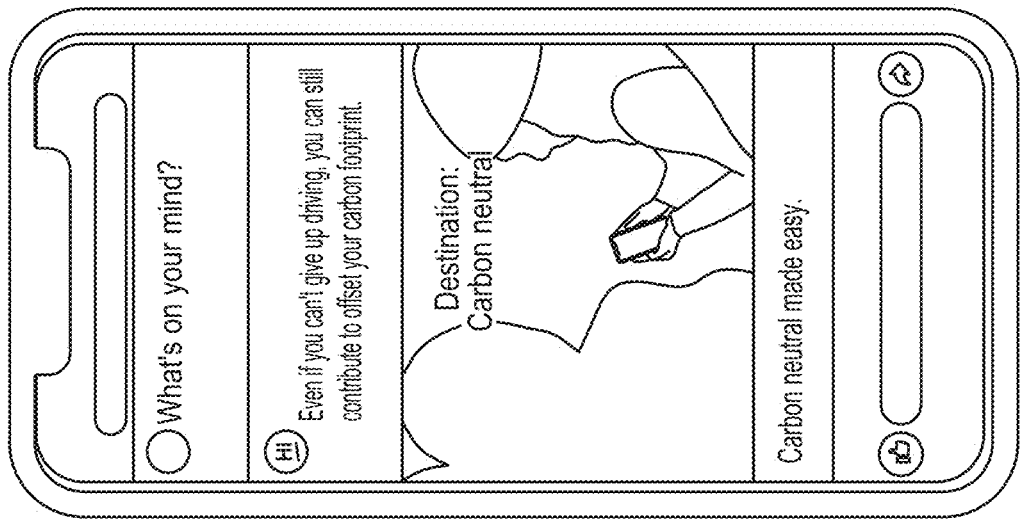
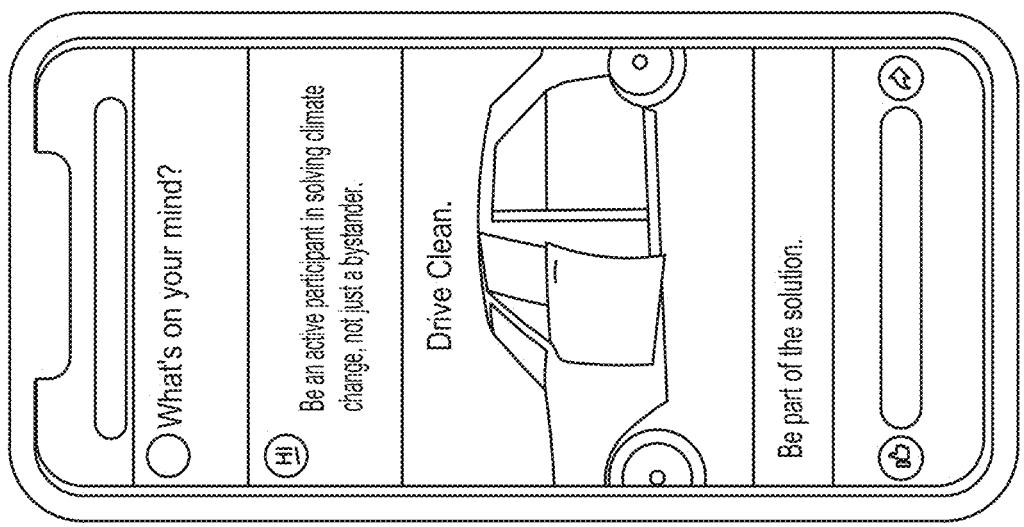
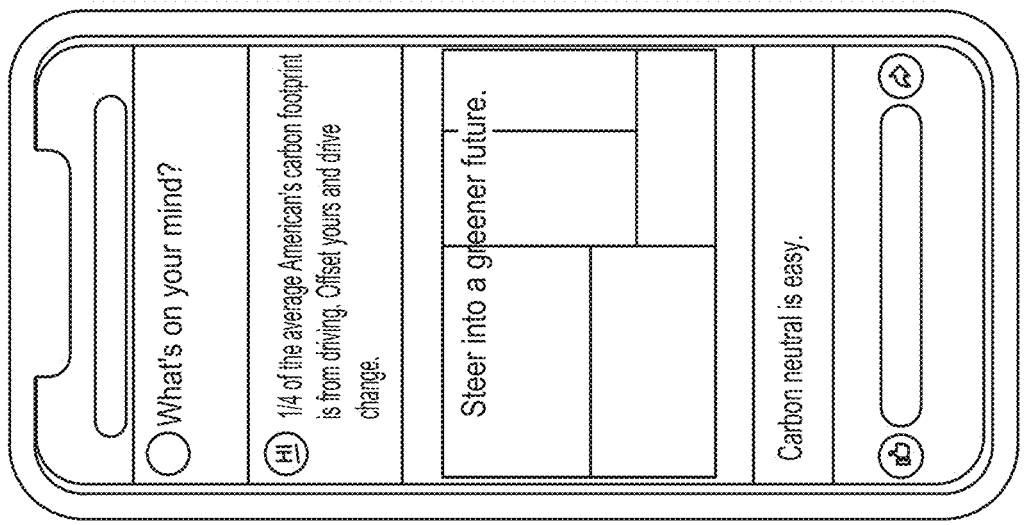
Figure 18

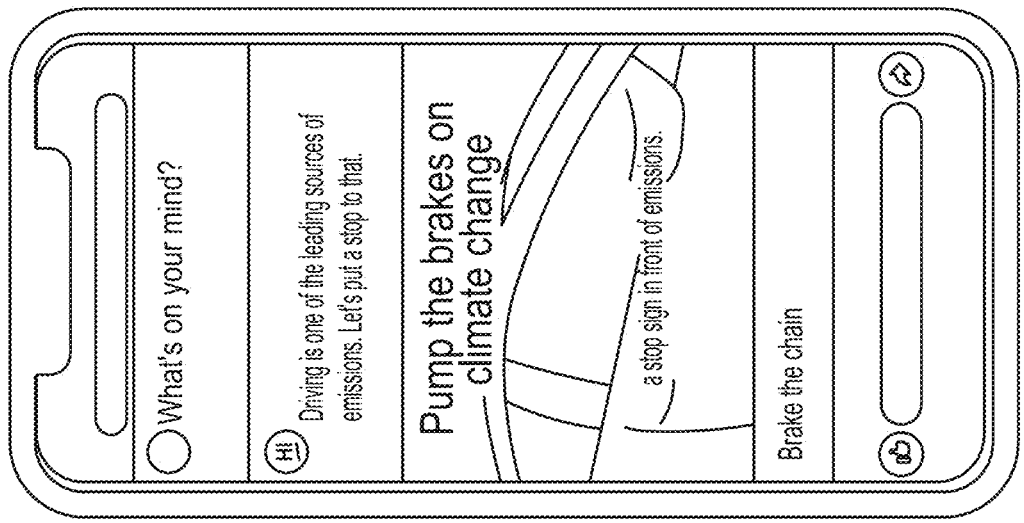
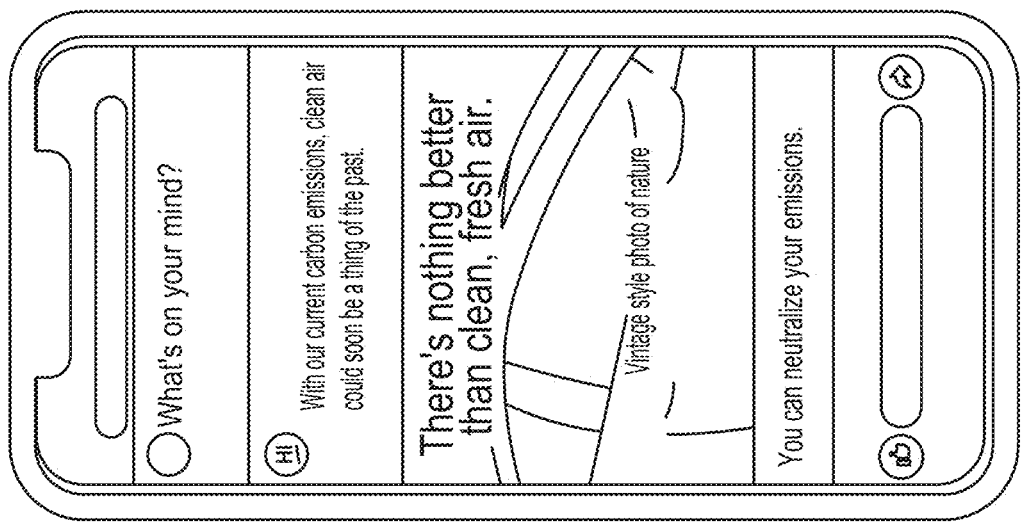
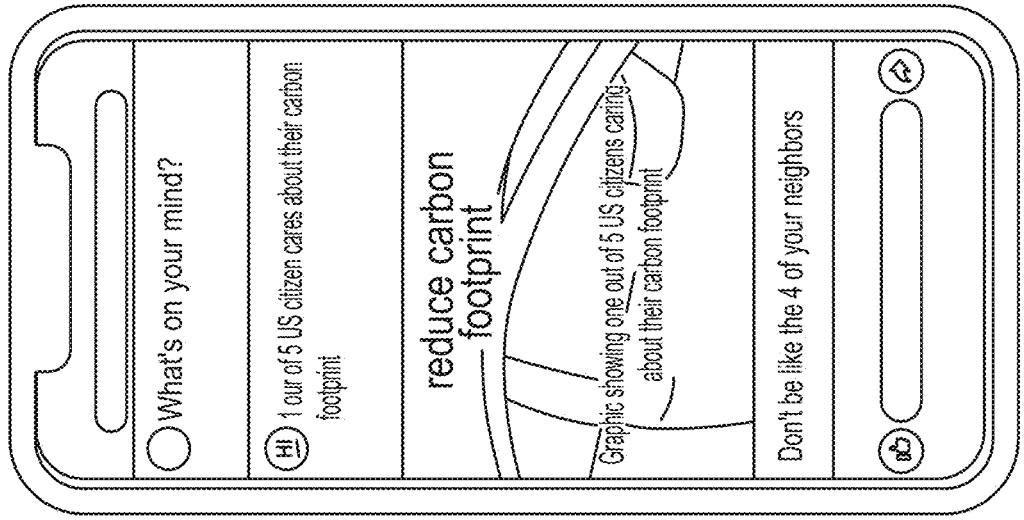
Figure 19

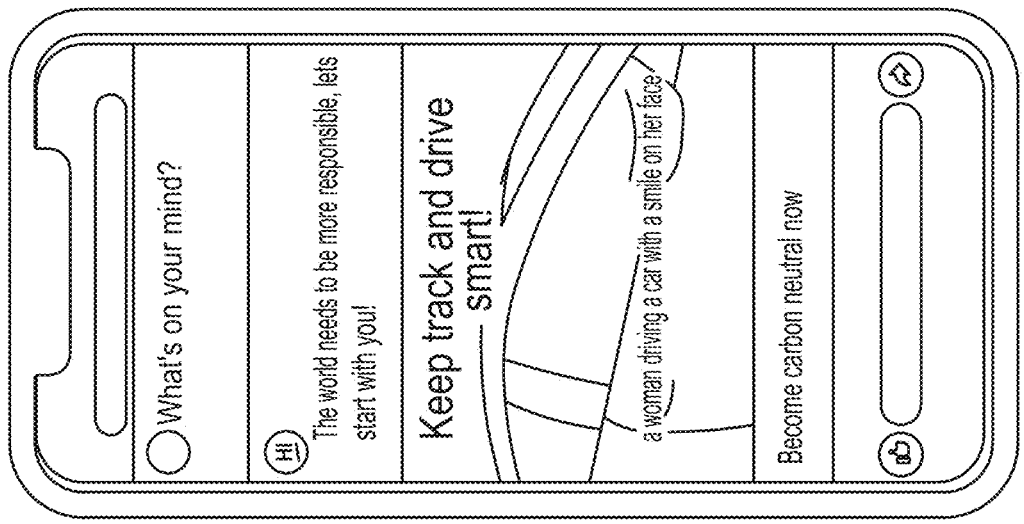
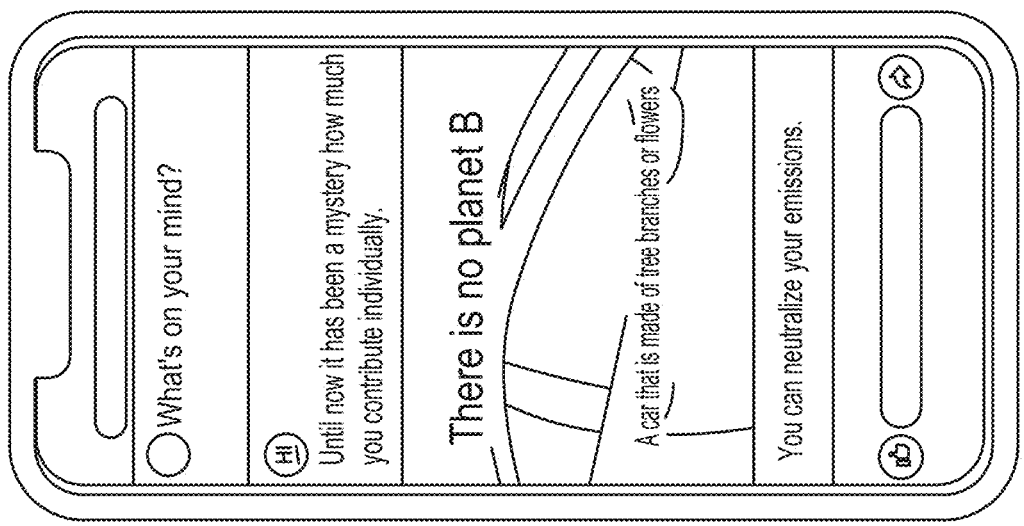
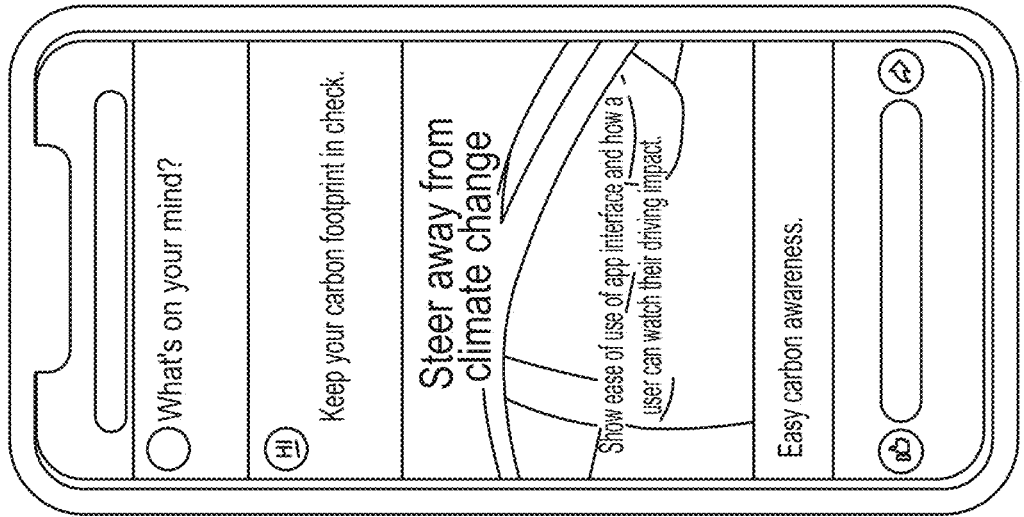
Figure 20

Pump performance

2015 Ford F-150
4th refuel

Odometer
Miles

[Enter]

1 2 3
4 5 6
7 8 9
. 0 ⊗

2015 Ford F-150
4th refuel
14,335 miles

Fuel
Gallons 1 2 3
4 5 6
7 8 9
. 0 ⊗

2015 Ford F-150
vs. all 2015 Ford F-150s 19.5 mpg 1.2 tons CO$_2$/m
To date

[Refuel]

2015 Ford F-150
4th refuel 19.5 mpg
since last refuel 97 gallons
To date 194 tons CO$_2$
To date

[Refuel]

Figure 22

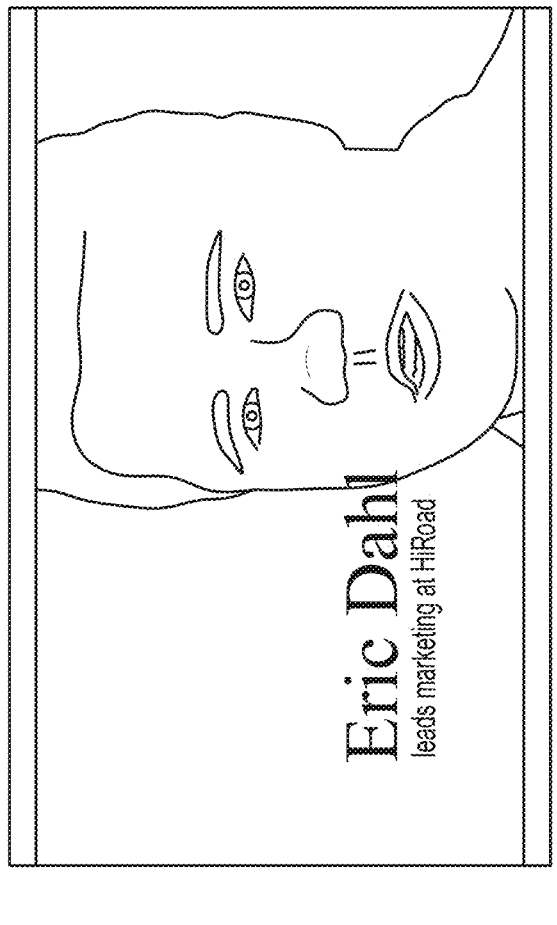
Figure 23

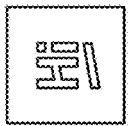
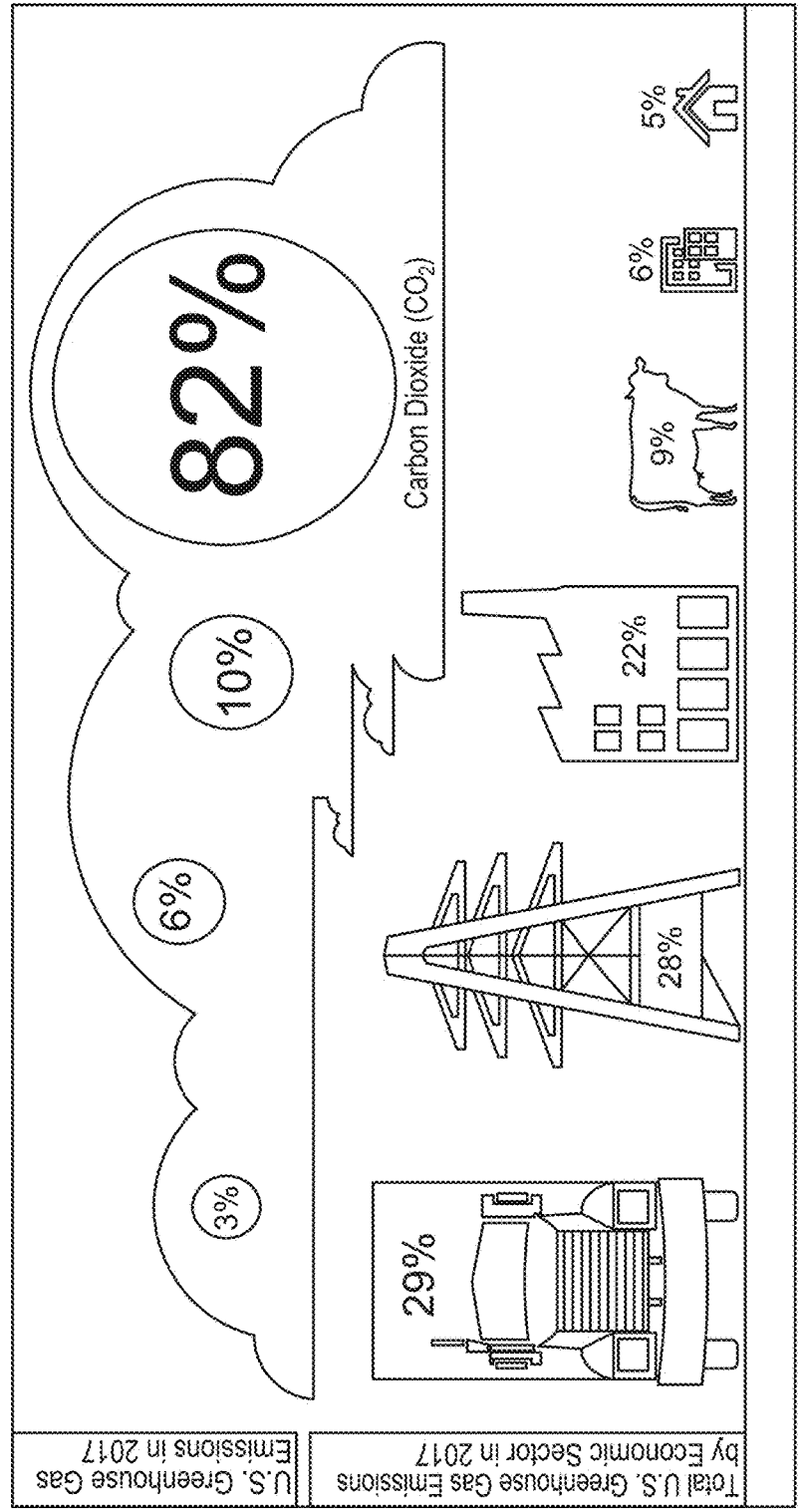
Figure 24

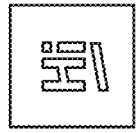
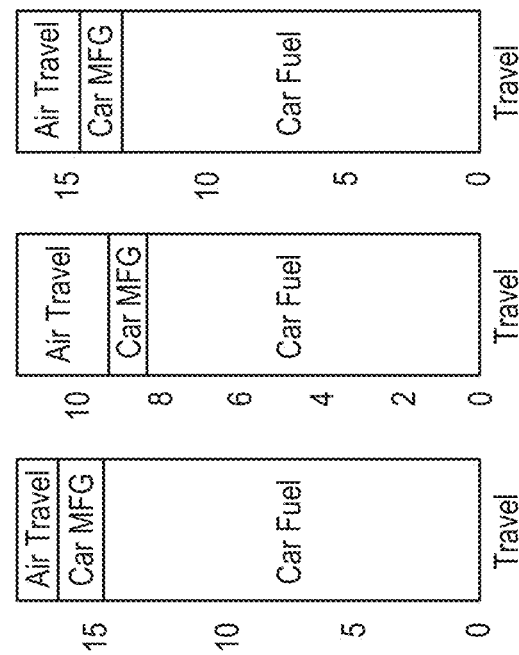
Figure 35

SYSTEMS AND METHODS FOR SELECTING VEHICLE ROUTES

CROSS-REFERENCE TO RELATED APPLICATIONS

This application is a continuation of International Application No. PCT/US2020/042306, filed Jul. 16, 2020, which claims priority to U.S. Provisional Patent Application No. 62/899,038, filed Sep. 11, 2019, both applications being incorporated by reference herein for all purposes.

FIELD OF THE DISCLOSURE

Some embodiments of the present disclosure are directed to selecting a vehicle route for a user. More particularly, certain embodiments of the present disclosure provide methods and systems for selecting a route from among multiple routes based at least in part upon a predicted fuel consumption efficiency for the route. Merely by way of example, the present disclosure has been applied to selecting a route for a vehicle trip that the user will make between a particular pair of origination and destination points. But it would be recognized that the present disclosure has much broader range of applicability.

BACKGROUND OF THE DISCLOSURE

Numerous route selection techniques exist to assist a vehicle operator in mapping out a route for a potential trip. These techniques typically examine various routes that are available and generate route choices for the vehicle operator based on factors such as shortest distance, fastest travel time, number of scenic views, etc. However, many of these techniques do not consider fuel consumption efficiency in their route selection and/or take into account certain driver-related factors that may affect the fuel consumption efficiency. Hence, there remains a need to develop route selection techniques for determining one or more route choices based on fuel consumption efficiency.

BRIEF SUMMARY OF THE DISCLOSURE

Some embodiments of the present disclosure are directed to selecting a vehicle route for a user. More particularly, certain embodiments of the present disclosure provide methods and systems for selecting a route from among multiple routes based at least in part upon a predicted fuel consumption efficiency for the route. Merely by way of example, the present disclosure has been applied to selecting a route for a vehicle trip that the user will make between a particular pair of origination and destination points. But it would be recognized that the present disclosure has much broader range of applicability.

According to some embodiments, a method for selecting a vehicle route includes collecting information for a future vehicle trip that will be made by a user. The future vehicle trip corresponds to a particular pair of origination and destination points. Also, the method includes generating multiple routes for the same future vehicle trip, where the multiple routes all correspond to the same particular pair of origination and destination points. Additionally, the method includes predicting multiple amounts of fuel consumption for the multiple routes respectively. For each route of the multiple routes, an amount of fuel consumption by the user is predicted based at least in part upon information for the route and one or more user driving features of the user. Moreover, the method includes selecting a route from the multiple routes based at least in part upon the predicted multiple amounts of fuel consumption. The predicted multiple amounts of fuel consumption correspond to the multiple routes respectively and the selected route corresponds to a least amount among the predicted multiple amounts of fuel consumption.

According to certain embodiments, a method for selecting one or more vehicle routes for one or more users for a same future vehicle trip includes collecting information for a future vehicle trip that will be made separately by a first user and by a second user. The future vehicle trip corresponds to a particular pair of origination and destination points. Also, the method includes generating multiple routes for the same future vehicle trip, where the multiple routes all correspond to the same particular pair of origination and destination points. Additionally, the method includes predicting a first set of multiple amounts of fuel consumption for the multiple routes respectively and predicting a second set of multiple amounts of fuel consumption for the multiple routes respectively. For each route of the multiple routes, an amount of fuel consumption by the first user is predicted based at least in part upon information for the route and a first set of one or more user driving features of the first user. For each route of the multiple routes, an amount of fuel consumption by the second user is predicted based at least in part upon information for the route and a second set of one or more user driving features of the second user. Further, the method includes selecting a first route from the multiple routes based at least in part upon the predicted first set of multiple amounts of fuel consumption for the multiple routes. The selected first route corresponds to a least amount among the predicted first set of multiple amounts of fuel consumption. Moreover, the method includes selecting a second route from the multiple routes based at least in part upon the predicted second set of multiple amounts of fuel consumption for the multiple routes. The selected second route corresponds to a least amount among the predicted second set of multiple amounts of fuel consumption.

According to some embodiments, a computing device for selecting a vehicle route includes one or more processors and a memory that stores instructions for execution by the one or more processors. The instructions, when executed, cause the one or more processors to collect information for a future vehicle trip that will be made by a user. The future vehicle trip corresponds to a particular pair of origination and destination points. Also, the instructions, when executed, cause the one or more processors to generate multiple routes for the same future vehicle trip, where the multiple routes all correspond to the same particular pair of origination and destination points. Additionally, the instructions, when executed, cause the one or more processors to predict multiple amounts of fuel consumption for the multiple routes respectively. For each route of the multiple routes, an amount of fuel consumption by the user is predicted based at least in part upon information for the route and one or more user driving features of the user. Moreover, the instructions, when executed, cause the one or more processors to select a route from the multiple routes based at least in part upon the predicted multiple amounts of fuel consumption. The predicted multiple amounts of fuel consumption correspond to the multiple routes respectively and the selected route corresponds to a least amount among the predicted multiple amounts of fuel consumption.

According to certain embodiments, a non-transitory computer-readable medium stores instructions for selecting a vehicle route. The instructions are executed by one or more processors of a computing device. The non-transitory computer-readable medium includes instructions to collect information for a future vehicle trip that will be made by a user. The future vehicle trip corresponds to a particular pair of origination and destination points. Also, the non-transitory computer-readable medium includes instructions to generate multiple routes for the same future vehicle trip, where the multiple routes all correspond to the same particular pair of origination and destination points. Additionally, the non-transitory computer-readable medium includes instructions to predict multiple amounts of fuel consumption for the multiple routes respectively. For each route of the multiple routes, an amount of fuel consumption by the user is predicted based at least in part upon information for the route and one or more user driving features of the user. Moreover, the non-transitory computer-readable medium includes instructions to select a route from the multiple routes based at least in part upon the predicted multiple amounts of fuel consumption. The predicted multiple amounts of fuel consumption correspond to the multiple routes respectively and the selected route corresponds to a least amount among the predicted multiple amounts of fuel consumption.

Depending upon the embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 7 to FIG. 22 are simplified diagrams showing a system according to certain embodiments of the present disclosure.

FIG. 23 to FIG. 42 are simplified diagrams showing a system according to some embodiments of the present disclosure.

DETAILED DESCRIPTION OF THE DISCLOSURE

Some embodiments of the present disclosure are directed to selecting a vehicle route for a user. More particularly, certain embodiments of the present disclosure provide methods and systems for selecting a route from among multiple routes based at least in part upon a predicted fuel consumption efficiency for the route. Merely by way of example, the present disclosure has been applied to selecting a route for a vehicle trip that the user will make between a particular pair of origination and destination points. But it would be recognized that the present disclosure has much broader range of applicability.

As discussed herein, fuel consumption efficiency refers to the amount of fuel used per unit distance according to some embodiments. According to various embodiments, the fuel includes any suitable type of vehicle fuel such as gasoline, diesel, natural gas, hydrogen, propane, alcohol, other hydrocarbons, or mixtures thereof.

Figure 1:
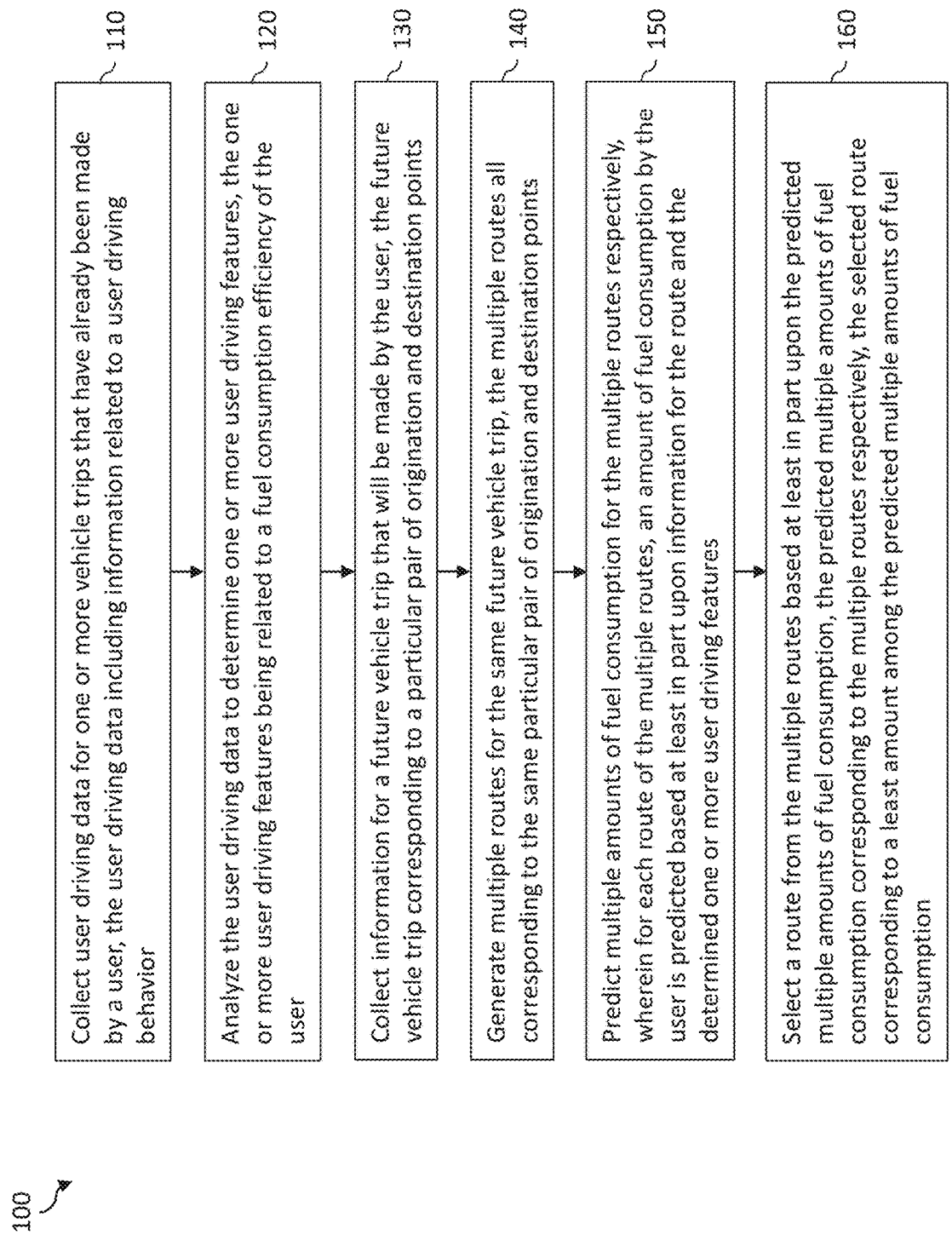
FIG. 1 is a simplified method for selecting a vehicle route for a user according to certain embodiments of the present disclosure.

I. One or More Methods for Selecting a Vehicle Route for a User According to Certain Embodiments FIG. 1 is a simplified method for selecting a vehicle route for a user according to certain embodiments of the present disclosure. This diagram is merely an example, which should not unduly limit the scope of the claims. One of ordinary skill in the art would recognize many variations, alternatives, and modifications. The method 100 includes process 110 for collecting user driving data for vehicle trips already made by the user, process 120 for analyzing the user driving data to determine user driving features, process 130 for collecting information for a future vehicle trip, process 140 for generating multiples routes for the future vehicle trip, process 150 for predicting multiple amounts of fuel consumption for the multiple routes, and process 160 for selecting a route from the multiple routes. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

Specifically, at the process 110, the user driving data are collected for one or more vehicle trips that have already been made by the user according to some embodiments. For example, the user driving data are associated with vehicle trips that the user has made during the previous day, previous week, previous month, previous year, or any combination thereof.

According to certain embodiments, the user driving data include information related to a user driving behavior. As an example, the user driving behavior represents a manner in which the user has operated a vehicle. For example, the user driving behavior indicates the user's driving habits and/or driving patterns.

According to some embodiments, the user driving data are collected from one or more sensors associated with the user's vehicle. For example, the one or more sensors include any type and number of accelerometers, gyroscopes, magnetometers, location sensors (e.g., GPS sensors), tilt sensors, yaw rate sensors, speedometers, steering angle sensors, brake sensors, proximity detectors, and/or any other suitable sensors that measure vehicle state and/or operation. In certain embodiments, the one or more sensors are part of or located in the vehicle. In some embodiments, the one or more sensors are part of a computing device (e.g., a mobile device of the user) that is connected to the vehicle while the vehicle is in operation. According to certain embodiments, the user driving data are collected continuously or at predetermined time intervals. According to some embodiments, the user driving data are collected based on a triggering event. For example, the user driving data are collected when each sensor has acquired a threshold amount of sensor measurements.

At the process 120, the user driving data are analyzed to determine one or more user driving features according to certain embodiments. As an example, the one or more user driving features are related to a fuel consumption efficiency of the user. For example, the fuel consumption efficiency indicates how fuel has been consumed during previous trips given the one or more user driving features. As an example, the one or more user driving features indicate various driving maneuvers made by the user that can have an impact on the amount of fuel consumed including braking (e.g., excessive braking, sudden braking, braking while reaching a turn, braking while driving in a turn), acceleration (e.g., rapid acceleration, prolonged acceleration, acceleration while driving in a turn, accelerating while exiting a turn), cornering (e.g., sharp turning, swerving), speeding (e.g., cruising, adopting speed limits), lane changing, tailgating, idling, timing of gear shifting, and/or other suitable maneuvers. According to some embodiments, the one or more user driving features are classified by their level of severity (e.g., speed and duration at which a maneuver is performed).

According to certain embodiments, the one or more user driving features include a first set of user driving features that increase the fuel consumption efficiency and a second set of user driving features that decrease the fuel consumption efficiency. For example, a type of maneuver belonging to the first set of user driving features includes performing smooth acceleration at moderate rates which tends to increase the fuel consumption efficiency. As an example, a type of maneuver belonging to the second set of user driving features includes using excessive braking which tends to decrease fuel consumption efficiency. For example, a type of maneuver belonging to the first set of user driving features includes avoiding constant acceleration by remaining in one lane which tends to increase the fuel consumption efficiency. As an example, a type of maneuver belonging to the second set of user driving features includes making unnecessary braking and acceleration by tailgating which tends to decrease fuel consumption efficiency.

According to some embodiments, the one or more user driving features are classified according to their importance levels for either increasing or decreasing the fuel consumption efficiency. For example, each user driving feature of the first set of user driving features corresponds to a respective first importance level for increasing the fuel consumption efficiency. As an example, each user driving feature of the second set of user driving features corresponds to a respective second importance level for decreasing the fuel consumption efficiency.

At the process 130, the information for the future vehicle trip that will be made by the user are collected according to certain embodiments. For example, the future vehicle trip corresponds to a particular pair of origination and destination points. As an example, the particular pair of origination and destination points represents a specified starting point and a specified ending point for the future vehicle trip such as between the user's home and the user's workplace. In various embodiments, the future vehicle trip is a scheduled or planned trip that the user will make during the next day, next week, next month, next year, or any combination thereof.

According to some embodiments, the information for the future vehicle trip include one or more vehicle information (e.g., model/year of the vehicle), one or more distance information (e.g., total distance between the particular pair of origination and destination points), one or more congestion information (e.g., expected traffic flows based upon time of day and/or day of the week that the future trip will take place, expected traffic flows based upon weather conditions during the time that the future trip will take place), and/or one or more other suitable information (e.g., terrain information, road construction information). In various embodiments, the expected traffic flows in the congestion information are obtained (e.g., via a third party) from analysis of historical traffic data.

In some examples, the information for the future vehicle trip are collected by receiving the information from the user. For example, the user provides various information (e.g., origination and destination points, date of trip) associated with the future vehicle trip. In certain examples, the information for the future vehicle trip are collected by analyzing trip data. For example, the trip data include information on the user's commute to and from work during the past month. As an example, by analyzing this trip data, the user's scheduled commute to and from work for the upcoming month can be determined to form the basis of the information for the future vehicle trip.

At the process 140, the multiple routes for the same future vehicle trip are generated according to some embodiments. For example, the multiple routes all correspond to the same particular pair of origination and destination points. According to various embodiments, the multiple routes are generated based at least in part upon the information for the future vehicle trip. As an example, the multiple routes represent different paths for the vehicle to travel between the particular pair of origination and destination points. For example, if the future vehicle trip involves traveling between two cities, then each of the multiple routes indicates a particular route to drive from the first city to the second city.

At the process 150, the multiple amounts of fuel consumption for the multiple routes are predicted respectively according to certain embodiments. According to various embodiments, an amount of fuel consumption is predicted for each route of the multiple routes based at least in part upon information for the route and the determined one or more user driving features.

For example, if the user driving features indicate that user executes a lot of sharp turning and the information for the route indicate a path with numerous turns, then the amount of fuel consumption predicted for the route will be high. As an example, if, on the other hand, the information for the route indicate a straighter path, then a lower amount of fuel consumption will be predicted for the route.

For example, if the user driving features indicate that the user tends to brake and/or accelerate excessively and the information for the route indicate a path with many traffic light intersections, then the amount of fuel consumption predicted for the route will be high. As an example, if, on the other hand, the information for the route indicate a path with fewer traffic lights, then a lower amount of fuel consumption will be predicted for the route.

For example, if the user driving features indicate that the user likes to use cruise control when driving and the information for the route indicate a path having mostly highway travel, then the amount of fuel consumption predicted for the route will be low. As an example, if, on the other hand, the information for the route indicate a path with most of the travel on local traffic roads, then a higher amount of fuel consumption will be predicted for the route.

At the process 160, the route is selected from the multiple routes based at least in part upon the predicted multiple amounts of fuel consumption according to some embodiments. For example, the predicted multiple amounts of fuel consumption correspond to the multiple routes respectively. As an example, the selected route corresponds to a least amount of fuel consumption among the predicted multiple amounts of fuel consumption. According to various embodiments, the selected route enables the user to achieve a high fuel consumption efficiency for a specific trip. As an example, the selected route is driven by the user between the particular pair of origination and destination points for the future vehicle trip so as to optimize the fuel consumption efficiency of the user. In certain embodiments, the route selected is based at least in part upon other criteria and/or user preferences (e.g., minimizing distance traveled, minimizing time spent traveling, avoiding tolls).

Figure 2:
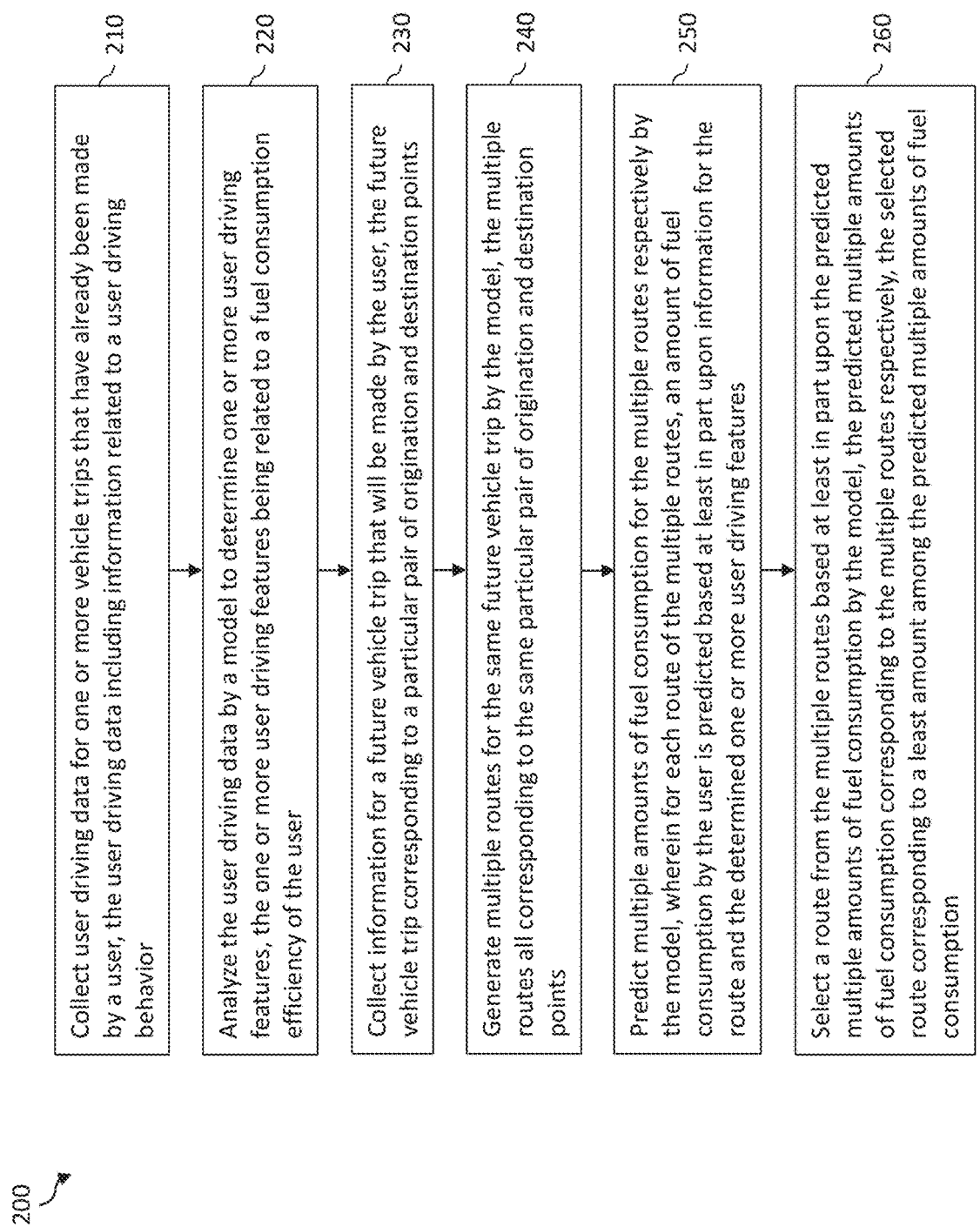
FIG. 2 is a simplified method for selecting a vehicle route for a user according to some embodiments of the present disclosure.

FIG. 2 is a simplified method for selecting a vehicle route for a user according to some embodiments of the present disclosure. This diagram is merely an example, which should not unduly limit the scope of the claims. One of ordinary skill in the art would recognize many variations, alternatives, and modifications. The method 200 includes process 210 for collecting user driving data for vehicle trips already made by the user, process 220 for analyzing the user driving data by a model to determine user driving features, process 230 for collecting information for a future vehicle trip, process 240 for generating multiples routes for the future vehicle trip by the model, process 250 for predicting multiple amounts of fuel consumption for the multiple routes by the model, and process 260 for selecting a route from the multiple routes by the model. In some examples, the model is a machine learning model (e.g., a decision tree, a Bayesian network, a genetic algorithm). As an example, the model is an artificial neural network. In certain examples, the model is a statistical model. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 210, the user driving data are collected for one or more vehicle trips that have already been made by the user according to some embodiments. For example, the user driving data include information related to a user driving behavior (e.g., the user's driving habits and/or driving patterns). According to certain embodiments, the user driving data are collected from various sensors (e.g., one or more accelerometers, one or more gyroscopes, one or more magnetometers, and/or one or more GPS sensors) associated with a vehicle operated by the user. In some embodiments, the various sensors are part of or located in the vehicle. In certain embodiments, the various sensors are part of a computing device associated with the user that is connected to the vehicle during vehicle operation.

At the process 220, the user driving data are analyzed by the model to determine one or more user driving features according to certain embodiments. For example, the one or more user driving features are related to a fuel consumption efficiency of the user. As an example, the fuel consumption efficiency indicates how fuel has been consumed during previous trips given the one or more user driving features. For example, the one or more user driving features indicate various driving maneuvers (e.g., braking, acceleration, speeding, and/or cornering) made by the user that can have an impact on the amount of fuel consumed.

In some embodiments, the model processes information associated with the user driving data. In certain embodiments, the model determines the one or more user driving features based at least in part upon the user driving data. According to some embodiments, the model has been trained, and the trained model possesses existing knowledge of which user driving features in the user driving data are useful in terms of determining fuel consumption efficiency. For example, determining the one or more user driving features involves that the trained model analyzes the user driving data based upon the existing knowledge. As an example, analyzing the user driving data includes various tasks such as performing feature extractions, applying pattern recognition, and/or other suitable tasks.

At the process 230, the information for the future vehicle trip that will be made by the user are collected according to some embodiments. For example, the future vehicle trip corresponds to a particular pair of origination and destination points. As an example, the particular pair of origination and destination points represents two geographic locations to start and end the future vehicle trip.

At the process 240, the multiple routes for the same future vehicle trip are generated by the model according to certain embodiments. For example, the multiple routes all correspond to the same particular pair of origination and destination points and represent different paths for the vehicle to travel between the particular pair of origination and destination points.

At the process 250, the multiple amounts of fuel consumption for the multiple routes are predicted respectively by the model according to certain embodiments. According to various embodiments, an amount of fuel consumption is predicted for each route of the multiple routes by the model based at least in part upon information for the route and the determined one or more user driving features.

In some embodiments, the model receives and processes the information for each route (e.g., number of turns, number intersections, highways/local roads) and the determined one or more user driving features (e.g., braking maneuvers, acceleration maneuvers, cornering maneuvers). According to certain embodiments, the model has been trained, and the trained model possesses existing knowledge of which information for the route and which user driving features are useful in terms of predicting the amount of fuel consumption for each route. For example, predicting the amount of fuel consumption involves that the trained model analyzes the information for the route and the determined one or more user driving features based upon the existing knowledge. As an example, analyzing the information for the route and the determined one or more user driving features includes various tasks such as performing feature extractions, applying pattern recognition, and/or other suitable tasks.

At the process 260, the route is selected from the multiple routes by the model based at least in part upon the predicted multiple amounts of fuel consumption according to some embodiments. For example, the predicted multiple amounts of fuel consumption correspond to the multiple routes respectively and the selected route corresponds to a least amount of fuel consumption among the predicted multiple amounts of fuel consumption.

According to certain embodiments, analyzing the user driving data to determine the user driving features in the process 120 as shown in FIG. 1 is performed by the process 220. According to some embodiments, generating the multiples routes for the future vehicle trip in the process 140 as shown in FIG. 1 is performed by the process 240. According to certain embodiments, predicting the multiple amounts of fuel consumption for the multiple routes in the process 150 as shown in FIG. 1 is performed by the process 250. According to some embodiments, selecting the route from the multiple routes in the process 160 as shown in FIG. 1 is performed by the process 260.

Figure 3A:
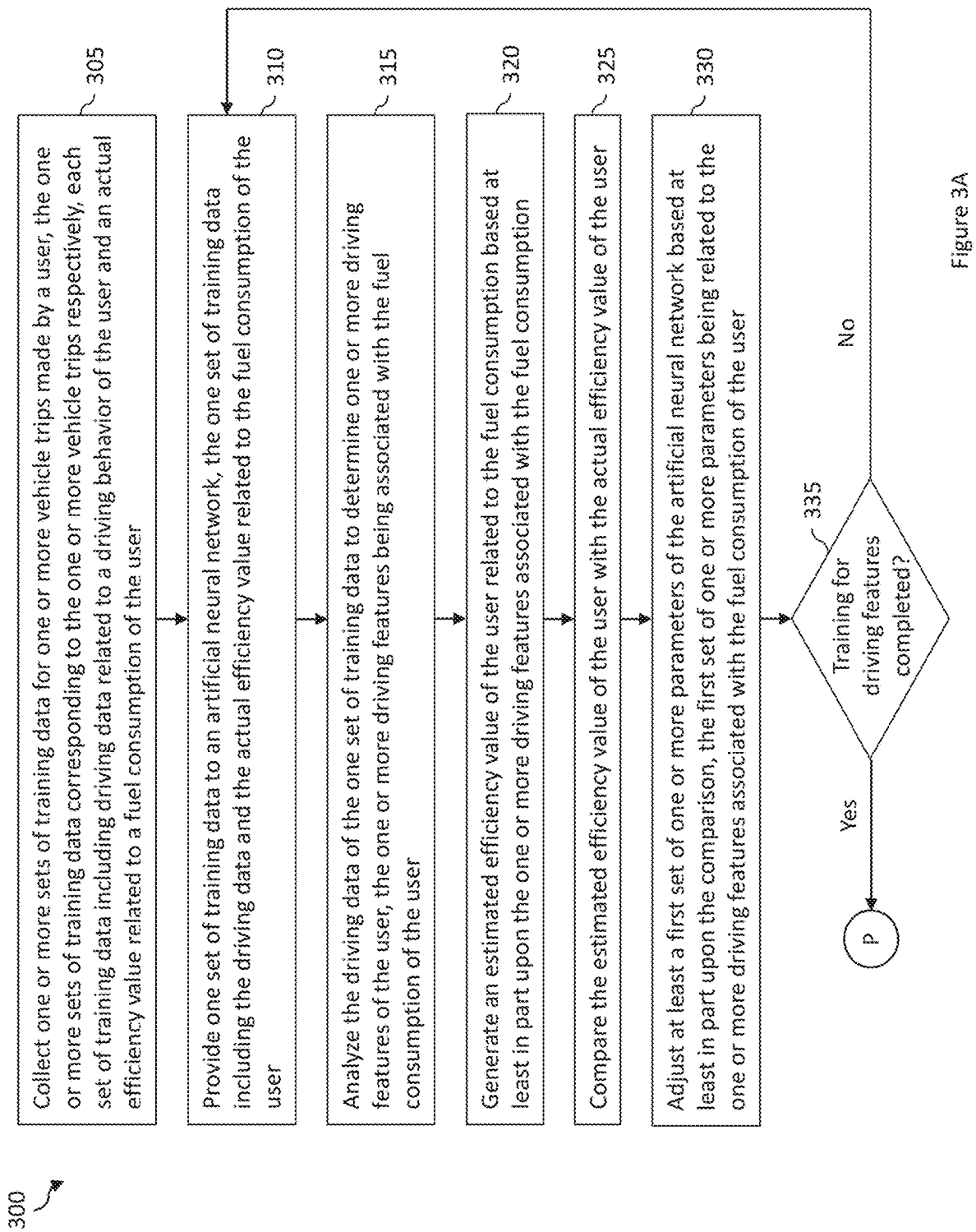
FIG. 3A and FIG. 3B are a simplified method for training an artificial neural network according to certain embodiments of the present disclosure.
Figure 3B:
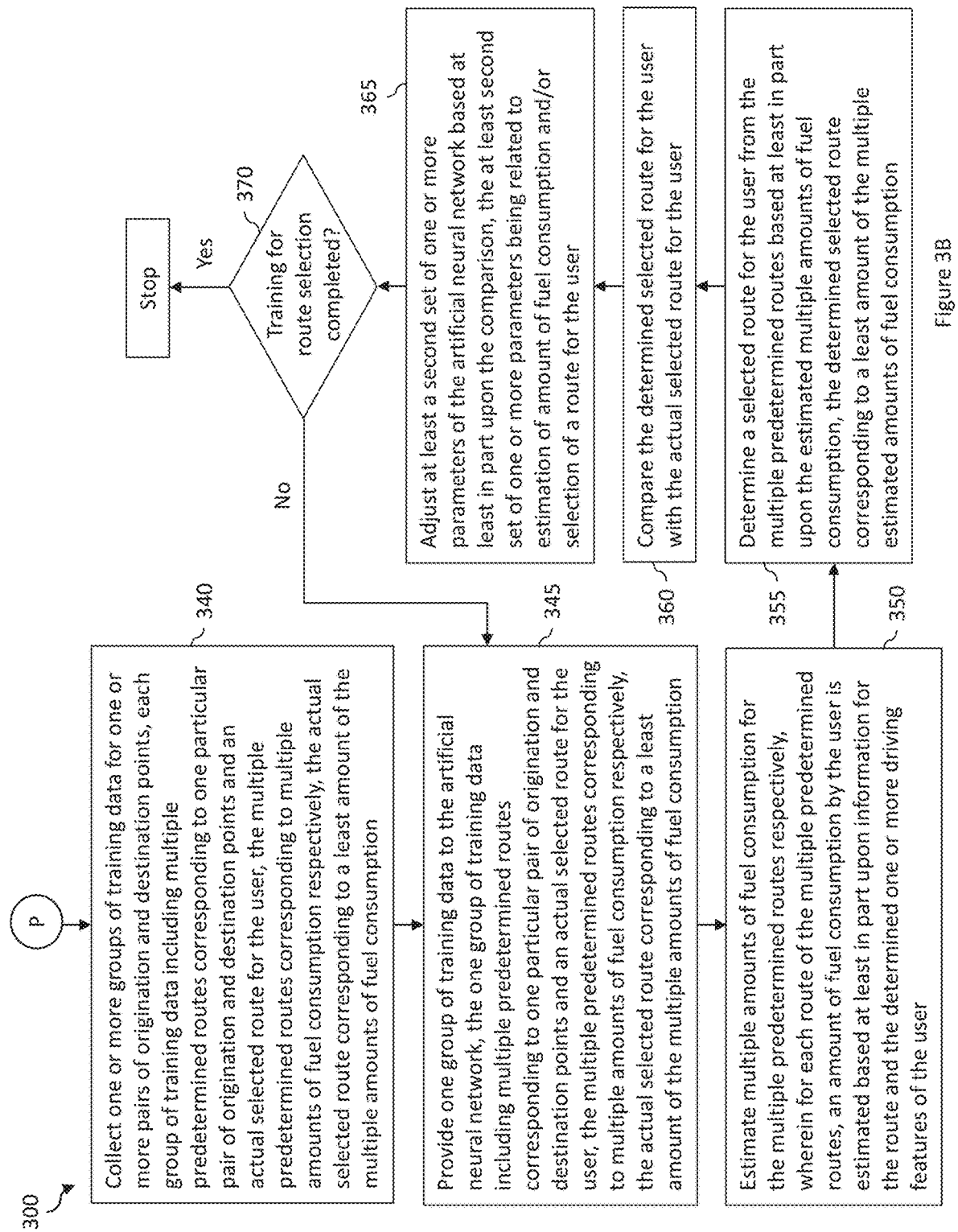

FIG. 3A and FIG. 3B is a simplified method for training an artificial neural network for selecting a vehicle route for a user according to some embodiments of the present disclosure. This diagram is merely an example, which should not unduly limit the scope of the claims. One of ordinary skill in the art would recognize many variations, alternatives, and modifications. The method 300 includes process 305 for collecting sets of training data for driving features training, process 310 for providing one set of training data to an artificial neural network for the driving features training, process 315 for analyzing the one set of training data to determine driving features associated with a fuel consumption, process 320 for generating an estimated efficiency value related to the fuel consumption, process 325 for comparing the estimated efficiency value with an actual efficiency value, process 330 for adjusting a first set of parameters in the artificial neural network, process 335 for determining whether the driving features training in the artificial neural network has been completed, process 340 for collecting groups of training data for route selection training, process 345 for providing one group of training data to the artificial neural network for the route selection training, process 350 for analyzing the one group of training data to estimate multiple amounts of fuel consumption for multiple routes, process 355 for determining a selected route, process 360 for comparing the determined selected route with an actual selected route, process 365 for adjusting a second set of parameters in the artificial neural network, and process 370 for determining whether the route selection in the artificial neural network has been completed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 305, one or more sets of training data for one or more vehicle trips made by the user are collected for the driving features training according to some embodiments. For example, the one or more sets of training data correspond to the one or more vehicle trips respectively. As an example, each set of training data includes driving data related to a driving behavior of the user and an actual efficiency value related to a fuel consumption of the user. In various embodiments, the one or more sets of training data are collected from sensors (e.g., one or more accelerometers, one or more gyroscopes, one or more magnetometers, and/or one or more GPS sensors) associated with a vehicle operated by the user.

At the process 310, one set of training data in the one or more sets of training data is provided to the artificial neural network for the driving features training according to certain embodiments. As an example, the artificial neural network is a convolutional neural network, a recurrent neural network, a modular neural network, or any other suitable type of neural network.

At the process 315, the driving data of the one set of training data are analyzed by the artificial neural network to determine one or more driving features associated with the fuel consumption of the user according to some embodiments. According to certain embodiments, the one or more driving features indicate various driving maneuvers (e.g., braking, acceleration, speeding, and/or cornering) that can have an impact on the amount of fuel consumed. For example, driving maneuvers such as sudden braking and/or acceleration are considered to consume more fuel. As an example, driving maneuvers such as smooth braking and/or acceleration at moderate rates are considered to consume less fuel.

At the process 320, the estimated efficiency value related to the fuel consumption is generated by the artificial neural network based at least in part upon the one or more driving features according to certain embodiments. For example, in generating the estimated efficiency value, the first set of parameters related to the one or more driving features associated with the fuel consumption are calculated by the artificial neural network (e.g., weight values associated with various layers of connections in the artificial neural network).

At the process 325, the estimated efficiency value is compared with the actual efficiency value to determine an accuracy of the estimated efficiency value according to some embodiments. According to certain embodiments, the accuracy is determined by using a loss function or a cost function for the one set of training data.

At the process 330, based at least in part upon the comparison, the first set of parameters related to the one or more driving features associated with the fuel consumption are adjusted by the artificial neural network according to certain embodiments. For example, the first set of parameters are adjusted in order to reduce (e.g., minimize) the loss function or the cost function.

At the process 335, a determination is made on whether the driving features training has been completed in the artificial neural network according to some embodiments. For example, training for the one set of training data is completed when the loss function or the cost function for the one set of training data is sufficiently reduced (e.g., minimized). As an example, the driving features training is completed when training for each of the one or more sets of training data is accomplished.

In some embodiments, if the process 335 determines that the driving features training is not yet completed, then the method 300 returns to the process 310 in an iterative manner until training is deemed to be completed. In certain embodiments, if the process 335 determines that the driving features training is completed, then the method 300 continues with the route selection training.

At the process 340, one or more groups of training data for one or more pairs of origination and destination points are collected for the route selection training according to some embodiments. For example, each group of training data includes multiple predetermined routes corresponding to one particular pair of origination and destination points and an actual selected route for the user. As an example, the multiple predetermined routes correspond to multiple amounts of fuel consumption respectively and the actual selected route corresponds to a least amount of the multiple amounts of fuel consumption.

At the process 345, one group of training data in the one or more groups of training data is provided to the artificial neural network for the route selection training according to certain embodiments.

At the process 350, the one group of training data is analyzed by the artificial neural network to estimate the multiple amounts of fuel consumption for the multiple predetermined routes respectively according to some embodiments. For example, an amount of fuel consumption by the user is estimated for each route of the multiple predetermined routes based at least in part upon information for the route and the determined one or more driving features of the user.

At the process 355, the selected route for the user is determined from the multiple predetermined routes based at least in part upon the estimated multiple amounts of fuel consumption according to certain embodiments. As an example, the determined selected route corresponds to a least amount of the multiple estimated amounts of fuel consumption. According to some embodiments, in determining the selected route, the second set of parameters related to the estimation of amount of fuel consumption and/or selection of a route for the user are calculated by the artificial neural network (e.g., weight values associated with various layers of connections in the artificial neural network).

At the process 360, the determined selected route for the user is compared with the actual selected route for the user to determine an accuracy of the determined selected route according to some embodiments. According to certain embodiments, the accuracy is determined by using a loss function or a cost function for the one group of training data.

At the process 365, based at least in part upon the comparison, the second set of parameters related to the estimation of amount of fuel consumption and/or selection of a route for the user are adjusted by the artificial neural network according to some embodiments. For example, the second set of parameters are adjusted in order to reduce (e.g., minimize) the loss function or the cost function.

At the process 370, a determination is made on whether the route selection training has been completed in the artificial neural network according to certain embodiments. For example, training for the one group of training data is completed when the loss function or the cost function for the one group of training data is sufficiently reduced (e.g., minimized). As an example, the route selection training is completed when training for each of the one or more groups of training data is accomplished.

In some embodiments, if the process 370 determines that the route selection training is not yet completed, then the method 300 returns to the process 345 in an iterative manner until training is deemed to be completed. In certain embodiments, if the process 370 determines that the route selection training is completed, then training by the method 300 in the artificial neural network stops.

In some examples, the artificial neural network that has been trained by the method 300 is used as a model by the process 220, the process 240, the process 250 and/or the process 260 of the method 200 as shown in FIG. 2. In certain examples, the trained artificial neural network possesses existing knowledge of which driving features are desirable in terms of fuel consumption efficiency. In some examples, the determined one or more driving features relate to the one or more user driving features in the process 120 of the method 100 as shown in FIG. 1 and/or in the process 220 of the method 200 as shown in FIG. 2.

Figure 4A:
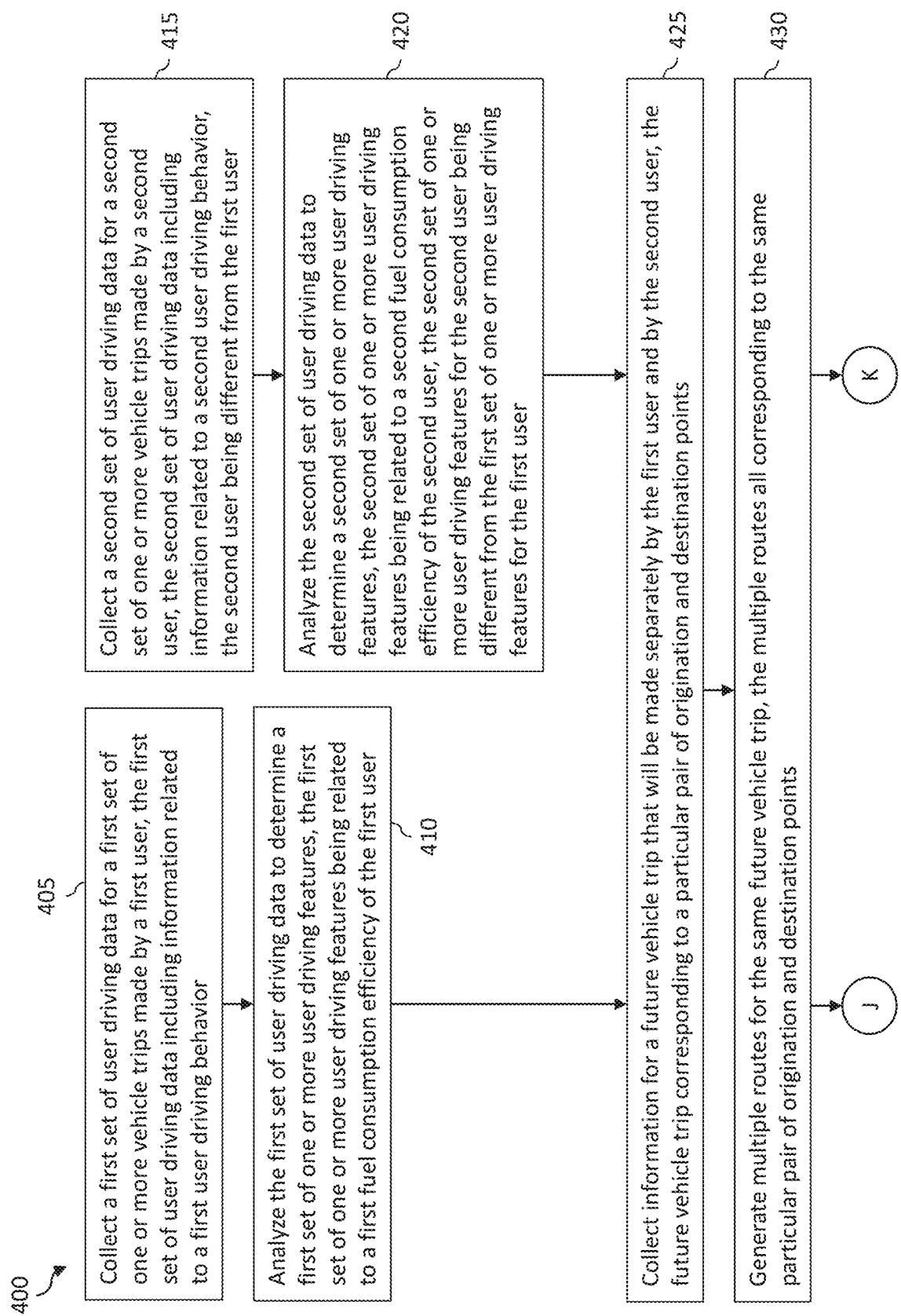
FIG. 4A and FIG. 4B are a simplified method for selecting one or more vehicle routes for one or more users according to certain embodiments of the present disclosure.
Figure 4B:
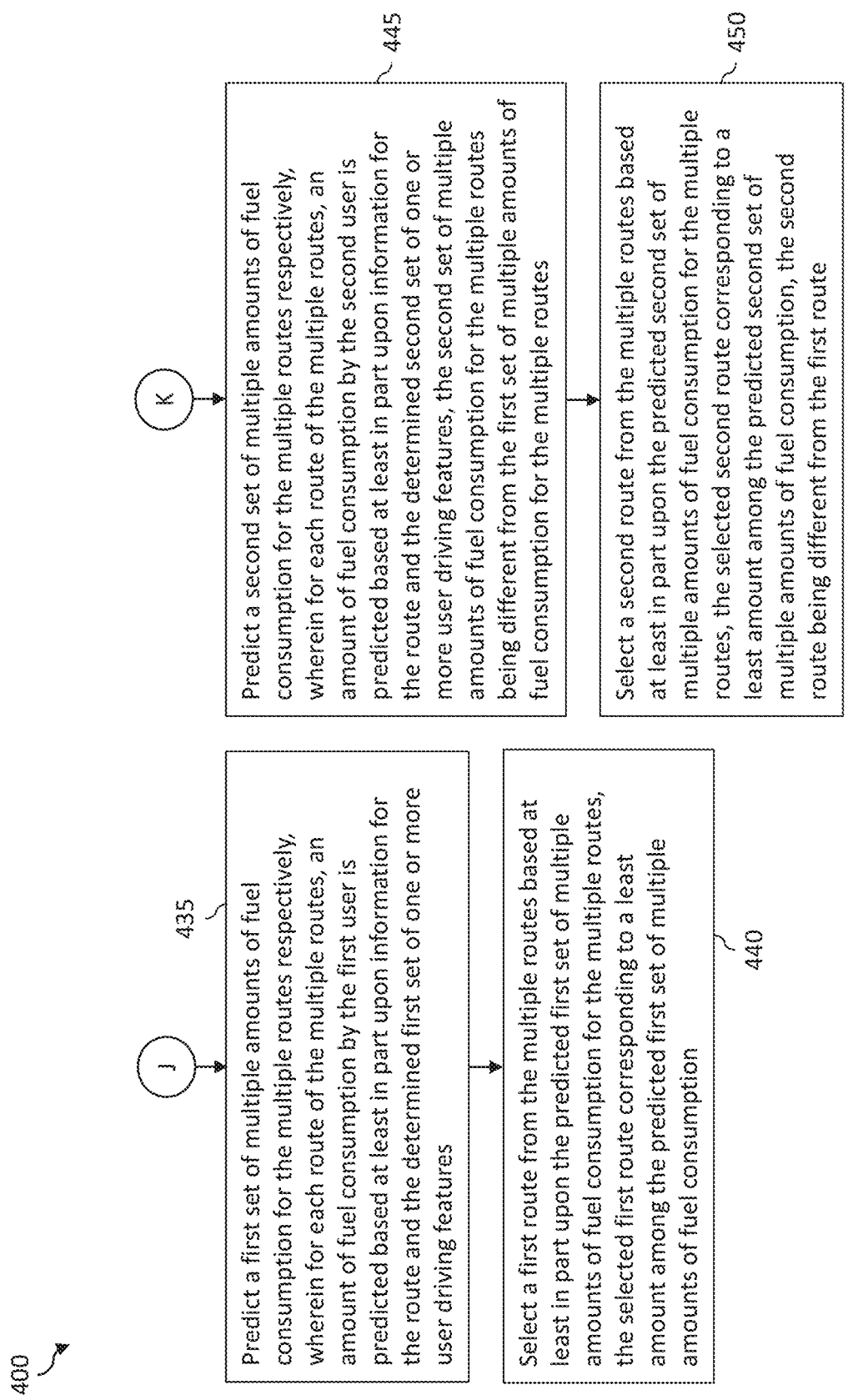

II. One or More Methods for Selecting One or More Vehicle Routes for One or More Users According to Certain Embodiments FIG. 4A and FIG. 4B is a simplified method for selecting one or more vehicle routes for one or more users according to certain embodiments of the disclosure. This diagram is merely an example, which should not unduly limit the scope of the claims. One of ordinary skill in the art would recognize many variations, alternatives, and modifications. The method 400 includes process 405 for collecting a first set of user driving data for vehicle trips already made by a first user, process 410 for analyzing the first set of user driving data to determine a first set of user driving features, process 415 for collecting a second set of user driving data for vehicle trips already made by a second user, process 420 for analyzing the second set of user driving data to determine a second set of user driving features, process 425 for collecting information for a future vehicle trip, process 430 for generating multiples routes for the future vehicle trip, process 435 for predicting a first set of multiple amounts of fuel consumption for the multiple routes, process 440 for selecting a first route from the multiple routes, process 445 for predicting a second set of multiple amounts of fuel consumption for the multiple routes, and process 450 for selecting a second route from the multiple routes. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 405, the first set of user driving data are collected for a first set of one or more vehicle trips that have already been made by the first user according to some embodiments. For example, the first set of user driving data include information related to a first user driving behavior (e.g., the first user's driving habits and/or driving patterns). According to certain embodiments, the first set of user driving data are collected from various sensors (e.g., one or more accelerometers, one or more gyroscopes, one or more magnetometers, and/or one or more GPS sensors) associated with a first vehicle operated by the first user.

At the process 410, the first set of user driving data are analyzed to determine a first set of one or more user driving features according to certain embodiments. For example, the first set of one or more user driving features are related to a first fuel consumption efficiency of the first user. As an example, the first fuel consumption efficiency indicates how fuel has been consumed during previous trips of the first user given the first set of one or more user driving features. For example, the first set of one or more user driving features indicate various driving maneuvers (e.g., braking, acceleration, speeding, and/or cornering) made by the first user that can have an impact on the amount of fuel consumed.

At the process 415, the second set of user driving data are collected for a second set of one or more vehicle trips that have already been made by the second user according to some embodiments. For example, the second set of user driving data include information related to a second user driving behavior (e.g., the second user's driving habits and/or driving patterns). According to certain embodiments, the second set of user driving data are collected from various sensors (e.g., one or more accelerometers, one or more gyroscopes, one or more magnetometers, and/or one or more GPS sensors) associated with a second vehicle operated by the second user. According to various embodiments, the first user is different from the second user.

At the process 420, the second set of user driving data are analyzed to determine a second set of one or more user driving features according to certain embodiments. For example, the second set of one or more user driving features are related to a second fuel consumption efficiency of the second user. As an example, the second fuel consumption efficiency indicates how fuel has been consumed during previous trips of the second user given the second set of one or more user driving features. For example, the second set of one or more user driving features indicate various driving maneuvers (e.g., braking, acceleration, speeding, and/or cornering) made by the second user that can have an impact on the amount of fuel consumed.

According to some embodiments, the first set of one or more user driving features for the first user are different from the second set of one or more user driving features for the second user. For example, the first user tends to use excessive braking while the second user does not. According to certain embodiments, the first set of one or more user driving features are the same as the second set of one or more user driving features. For example, both the first and second users tend to execute smooth acceleration at moderate rates. According to some embodiments, at least some of the first set of one or more user driving features are the same as the second set of one or more user driving features and/or vice versa. For example, the first and second users share the same tendency for speeding but differ in their braking/acceleration maneuvers.

At the process 425, the information for the future vehicle trip that will be made separately by the first user and by the second user are collected according to some embodiments. For example, the future vehicle trip corresponds to a particular pair of origination and destination points. As an example, the particular pair of origination and destination points represents two geographic locations to start and end the future vehicle trip.

At the process 430, the multiple routes for the same future vehicle trip are generated according to certain embodiments. For example, the multiple routes all correspond to the same particular pair of origination and destination points.

At the process 435, the first set of multiple amounts of fuel consumption for the multiple routes are predicted respectively according to some embodiments. For example, an amount of fuel consumption by the first user is predicted for each route of the multiple routes based at least in part upon information for the route and the determined first set of one or more user driving features.

At the process 440, the first route is selected from the multiple routes based at least in part upon the predicted first set of multiple amounts of fuel consumption according to certain embodiments. For example, the selected first route corresponds to a least amount of fuel consumption among the predicted first set of multiple amounts of fuel consumption.

At the process 445, the second set of multiple amounts of fuel consumption for the multiple routes are predicted respectively according to some embodiments. For example, an amount of fuel consumption by the second user is predicted for each route of the multiple routes based at least in part upon information for the route and the determined second set of one or more user driving features.

According to various embodiments, the first set of multiple amounts of fuel consumption for the multiple routes are different from the second set of multiple amounts of fuel consumption for the multiple routes. For example, if information for the multiple routes indicate the existence of many traffic light intersections, then high values for the first set of multiple amounts of fuel consumption will be predicted for the first user when the first set of user driving features indicate that the first user tends to brake/accelerate suddenly. As an example, given the same information about the traffic light intersections, lower values for the second set of multiple amounts of fuel consumption will be predicted for the second user if the second set of user driving features indicate that the second user tends to brake/accelerate at more smooth rates.

At the process 450, the second route is selected from the multiple routes based at least in part upon the predicted second set of multiple amounts of fuel consumption according to certain embodiments. For example, the selected second route corresponds to a least amount of fuel consumption among the predicted second set of multiple amounts of fuel consumption.

According to some embodiments, the selected first route is different from the selected second route. According to certain embodiments, the selected first route is the same as the selected second route. According to some embodiments, at least some portions of the selected first route is the same as the selected second route and/or vice versa. In various embodiments, the selected first and second routes enable the first and second users to achieve a respective high fuel consumption efficiency for the same future vehicle trip. As an example, the selected first route is driven by the first user between the particular pair of origination and destination points for the future vehicle while the selected second route is driven by the second user between the particular pair of origination and destination points for the future vehicle trip. In some embodiments, the first and second routes are selected based at least in part upon other criteria and/or user preferences (e.g., minimizing distance traveled, minimizing time spent traveling, avoiding tolls).

Figure 5A:
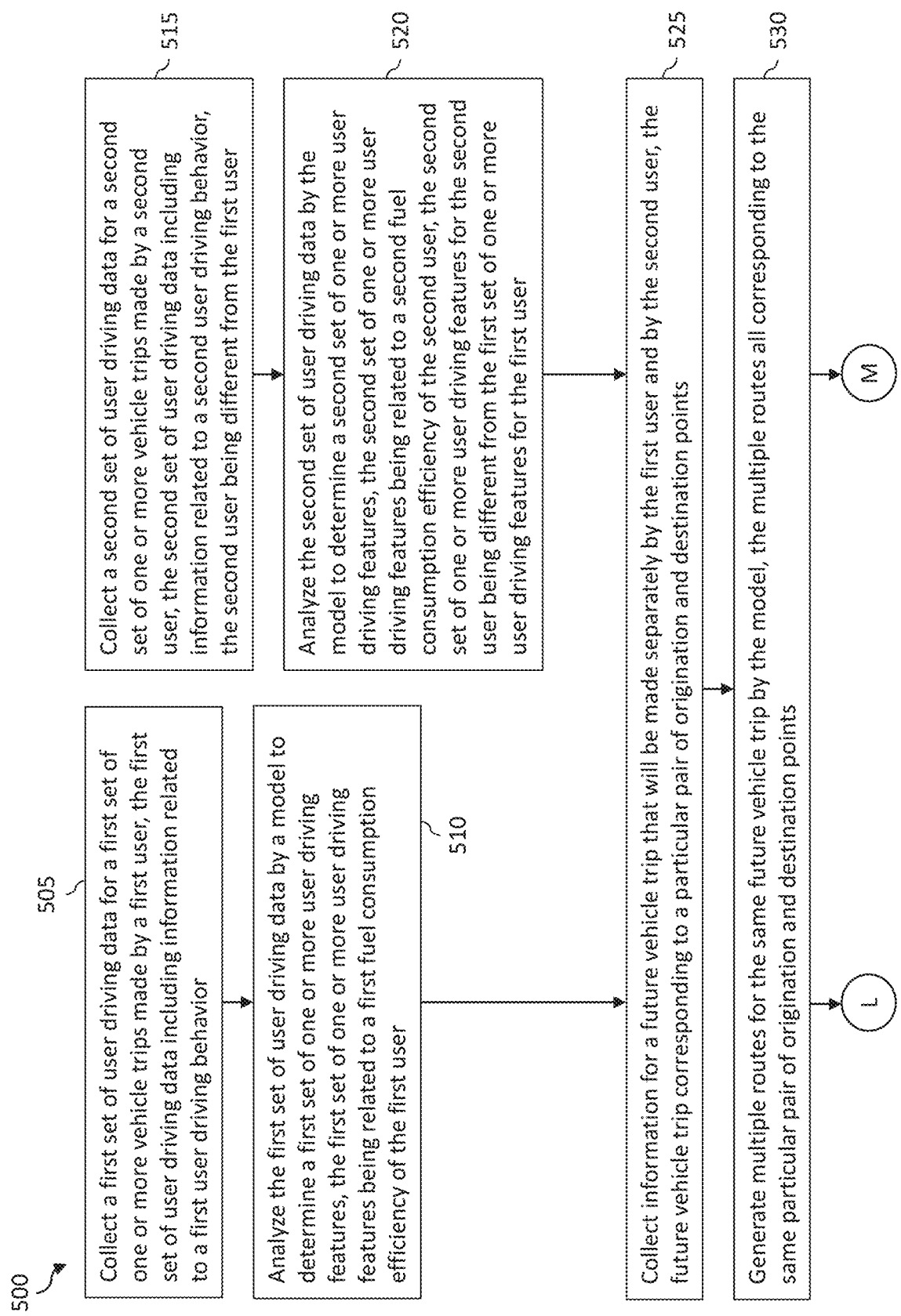
FIG. 5A and FIG. 5B are a simplified method for selecting one or more vehicle routes for one or more users according to some embodiments of the present disclosure.
Figure 5B:
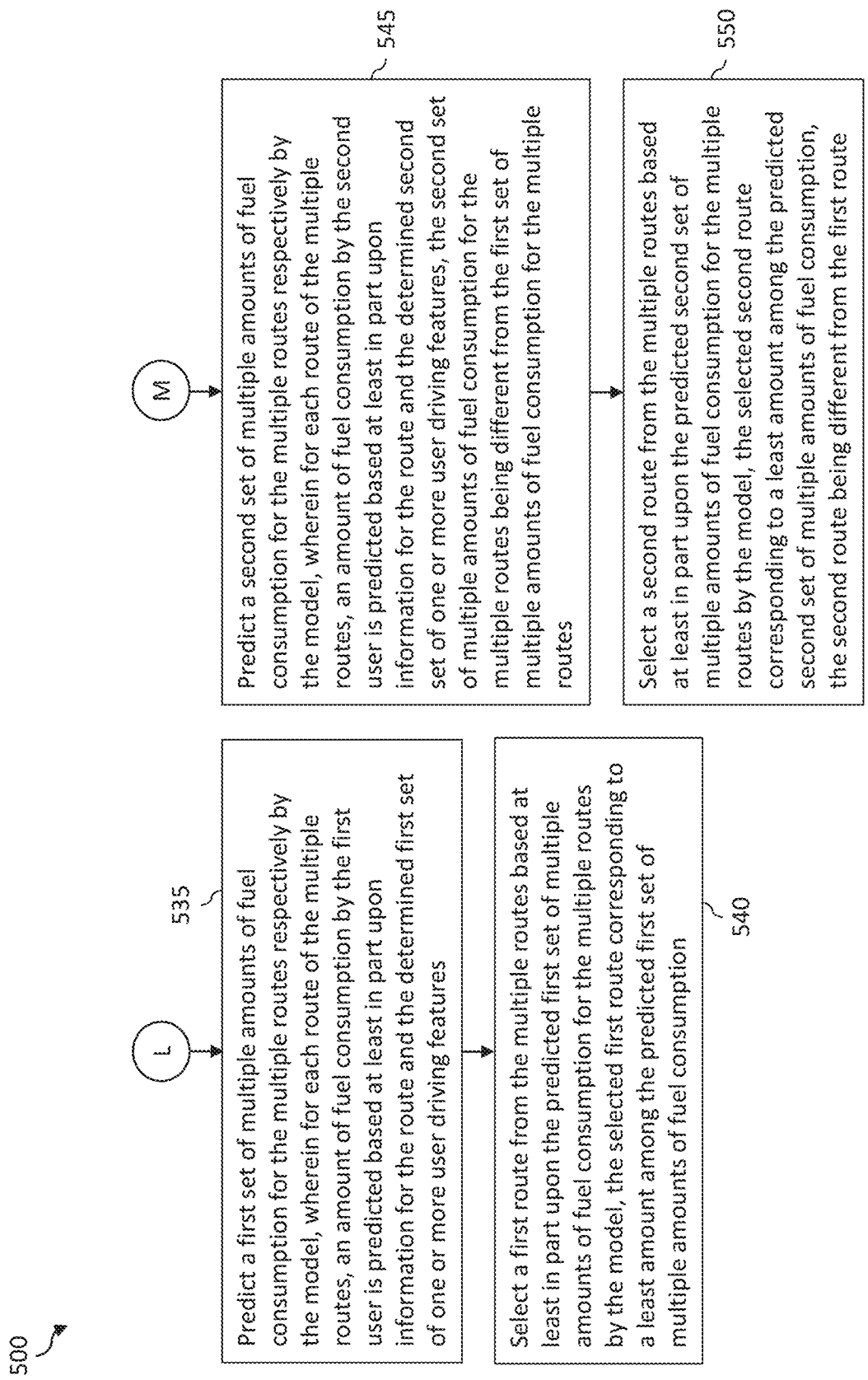

FIG. 5A and FIG. 5B is a simplified method for selecting one or more vehicle routes for one or more users according to some embodiments of the disclosure. The method 500 includes process 505 for collecting a first set of user driving data for vehicle trips already made by a first user, process 510 for analyzing the first set of user driving data by a model to determine a first set of user driving features, process 515 for collecting a second set of user driving data for vehicle trips already made by a second user, process 520 for analyzing the second set of user driving data by the model to determine a second set of user driving features, process 525 for collecting information for a future vehicle trip, process 530 for generating multiples routes for the future vehicle trip by the model, process 535 for predicting a first set of multiple amounts of fuel consumption for the multiple routes by the model, process 540 for selecting a first route from the multiple routes by the model, process 545 for predicting a second set of multiple amounts of fuel consumption for the multiple routes by the model, and process 550 for selecting a second route from the multiple routes by the model. In some examples, the model is a machine learning model (e.g., a decision tree, a Bayesian network, a genetic algorithm). As an example, the model is an artificial neural network. In certain examples, the model is a statistical model. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 505, the first set of user driving data are collected for a first set of one or more vehicle trips that have already been made by the first user according to some embodiments. For example, the first set of user driving data include information related to a first user driving behavior. According to certain embodiments, the first set of user driving data are collected from various sensors associated with a first vehicle operated by the first user.

At the process 510, the first set of user driving data are analyzed by the model to determine a first set of one or more user driving features according to certain embodiments. For example, the first set of one or more user driving features are related to a first fuel consumption efficiency of the first user. As an example, the first fuel consumption efficiency indicates how fuel has been consumed during previous trips of the first user given the first set of one or more user driving features.

At the process 515, the second set of user driving data are collected for a second set of one or more vehicle trips that have already been made by the second user according to some embodiments. For example, the second set of user driving data include information related to a second user driving behavior. According to certain embodiments, the second set of user driving data are collected from various sensors associated with a second vehicle operated by the second user.

At the process 520, the second set of user driving data are analyzed by the model to determine a second set of one or more user driving features according to certain embodiments. For example, the second set of one or more user driving features are related to a second fuel consumption efficiency of the second user. As an example, the second fuel consumption efficiency indicates how fuel has been consumed during previous trips of the second user given the second set of one or more user driving features.

According to various embodiments, the first user is different from the second user. In some embodiments, the first set of one or more user driving features are different from the second set of one or more user driving features. In certain embodiments, the first set of one or more user driving features are the same as the second set of one or more user driving features. In some embodiments, at least some of the first set of one or more user driving features are the same as the second set of one or more user driving features and/or vice versa.

In certain embodiments, the model processes information associated with the first set of user driving data and the second set of user driving data. In some embodiments, the model has been trained, and the trained model possesses existing knowledge of which of the first set of user driving features in the first set of user driving data are useful in terms of determining the first fuel consumption efficiency of the first user. For example, determining the first set of one or more user driving features involves that the trained model analyzes the first set of user driving data based upon the existing knowledge. In some embodiments, the trained model possesses existing knowledge of which of the second set of user driving features in the second set of user driving data are useful in terms of determining the second fuel consumption efficiency of the second user. For example, determining the second set of one or more user driving features involves that the trained model analyzes the second set of user driving data based upon the existing knowledge. In various embodiments, analyzing the first set of user driving data and/or the second set of user driving data includes any number of tasks such as performing feature extractions, applying pattern recognition, and/or other suitable tasks.

At the process 525, the information for the future vehicle trip that will be made separately by the first user and by the second user are collected according to some embodiments. For example, the future vehicle trip corresponds to a particular pair of origination and destination points.

At the process 530, the multiple routes for the same future vehicle trip are generated according to certain embodiments. For example, the multiple routes all correspond to the same particular pair of origination and destination points.

At the process 535, the first set of multiple amounts of fuel consumption for the multiple routes are predicted respectively by the model according to some embodiments. For example, an amount of fuel consumption by the first user is predicted for each route of the multiple routes based at least in part upon information for the route and the determined first set of one or more user driving features.

At the process 545, the second set of multiple amounts of fuel consumption for the multiple routes are predicted respectively by the model according to certain embodiments. For example, an amount of fuel consumption by the second user is predicted for each route of the multiple routes based at least in part upon information for the route and the determined second set of one or more user driving features.

In some embodiments, the model receives and processes the information for each route and the determined first set of one or more user driving features and the determined second set of one or more user driving features. According to certain embodiments, the model has been trained, and the trained model possesses existing knowledge of which information for the route and which of the first set of user driving features and/or which of the second set of user driving features are useful in terms of predicting the amount of fuel consumption by each user for each route. For example, predicting the amount of fuel consumption by the first user involves that the trained model analyzes the information for the route and the determined first set of one or more user driving features based upon the existing knowledge. As an example, predicting the amount of fuel consumption by the second user involves that the trained model analyzes the information for the route and the determined second set of one or more user driving features based upon the existing knowledge. In various embodiments, analyzing the information for the route, the determined first set of one or more user driving features and/or the determined second set of one or more user driving features includes various tasks such as performing feature extractions, applying pattern recognition, and/or other suitable tasks.

At the process 540, the first route is selected from the multiple routes by the model based at least in part upon the predicted first set of multiple amounts of fuel consumption according to certain embodiments. For example, the selected first route corresponds to a least amount of fuel consumption among the predicted first set of multiple amounts of fuel consumption.

At the process 550, the second route is selected from the multiple routes by the model based at least in part upon the predicted second set of multiple amounts of fuel consumption according to certain embodiments. For example, the selected second route corresponds to a least amount of fuel consumption among the predicted second set of multiple amounts of fuel consumption.

According to some embodiments, the first set of multiple amounts of fuel consumption for the multiple routes are different from the second set of multiple amounts of fuel consumption for the multiple routes. According to certain embodiments, the selected first route is different from the selected second route. According to some embodiments, the selected first route is the same as the selected second route.

According to certain embodiments, analyzing the first set of user driving data to determine the first set of user driving features in the process 410 as shown in FIG. 4A is performed by the process 510. According to some embodiments, analyzing the second set of user driving data to determine the second set of user driving features in the process 420 as shown in FIG. 4A is performed by the process 520. According to certain embodiments, generating the multiples routes for the future vehicle trip in the process 430 as shown in FIG. 4A is performed by the process 530.

According to some embodiments, predicting the first set of multiple amounts of fuel consumption for the multiple routes in the process 435 and selecting the first route form the multiple routes in the process 440 as shown in FIG. 4B are performed by the process 535 and the process 540, respectively. According to certain embodiments, predicting the second set of multiple amounts of fuel consumption for the multiple routes in the process 445 and selecting the second route form the multiple routes in the process 450 as shown in FIG. 4B are performed by the process 545 and the process 550, respectively According to certain embodiments, the model in FIG. 5A and FIG. 5B is the same as the model in FIG. 2. According to some embodiments, the model in FIG. 2 and/or FIG. 5A and FIG. 5B is the same as the artificial neural network in FIG. 3A and FIG. 3B.

Figure 6:
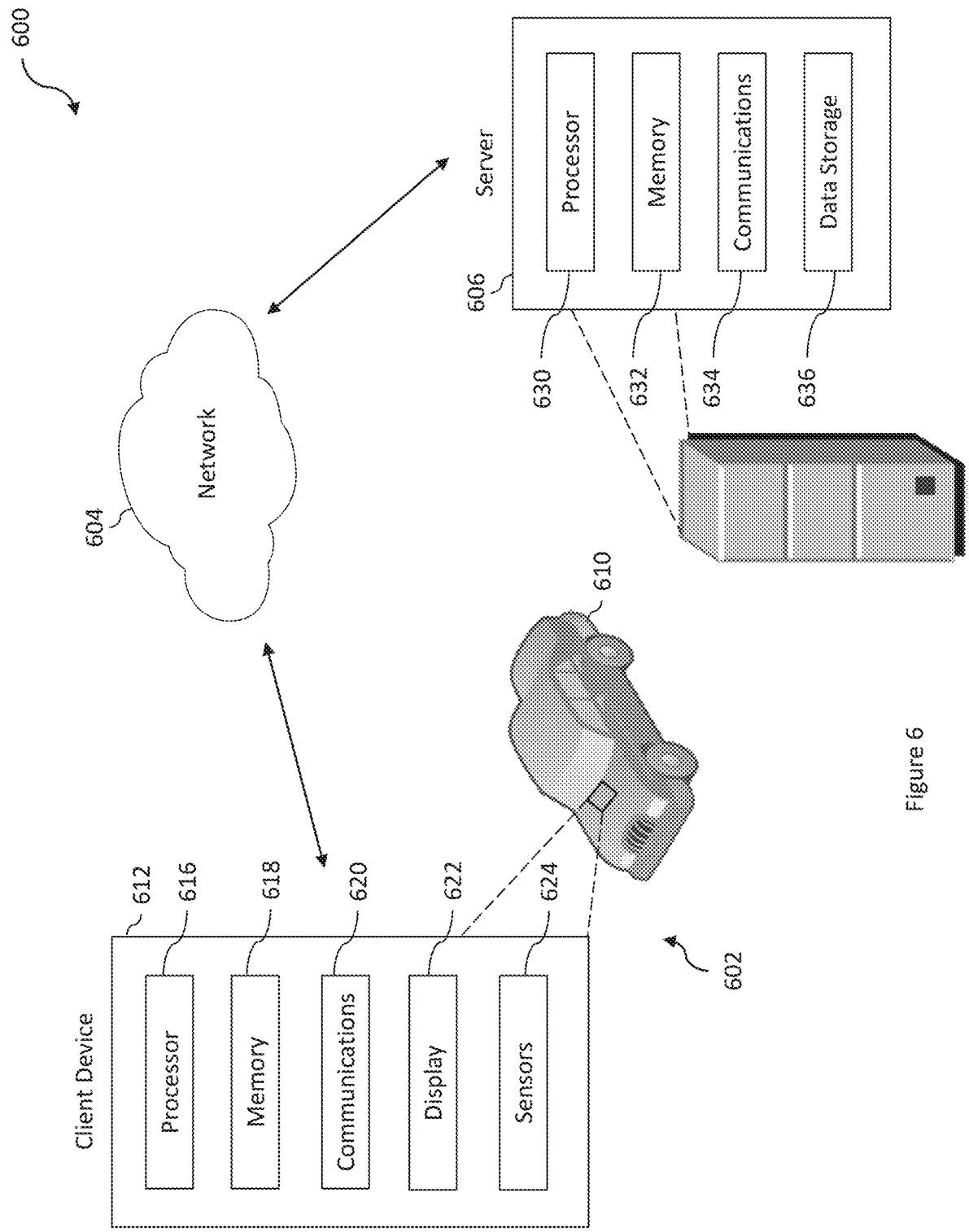
FIG. 6 is a simplified system for selecting vehicle routes according to certain embodiments of the present disclosure.
Figure 7:
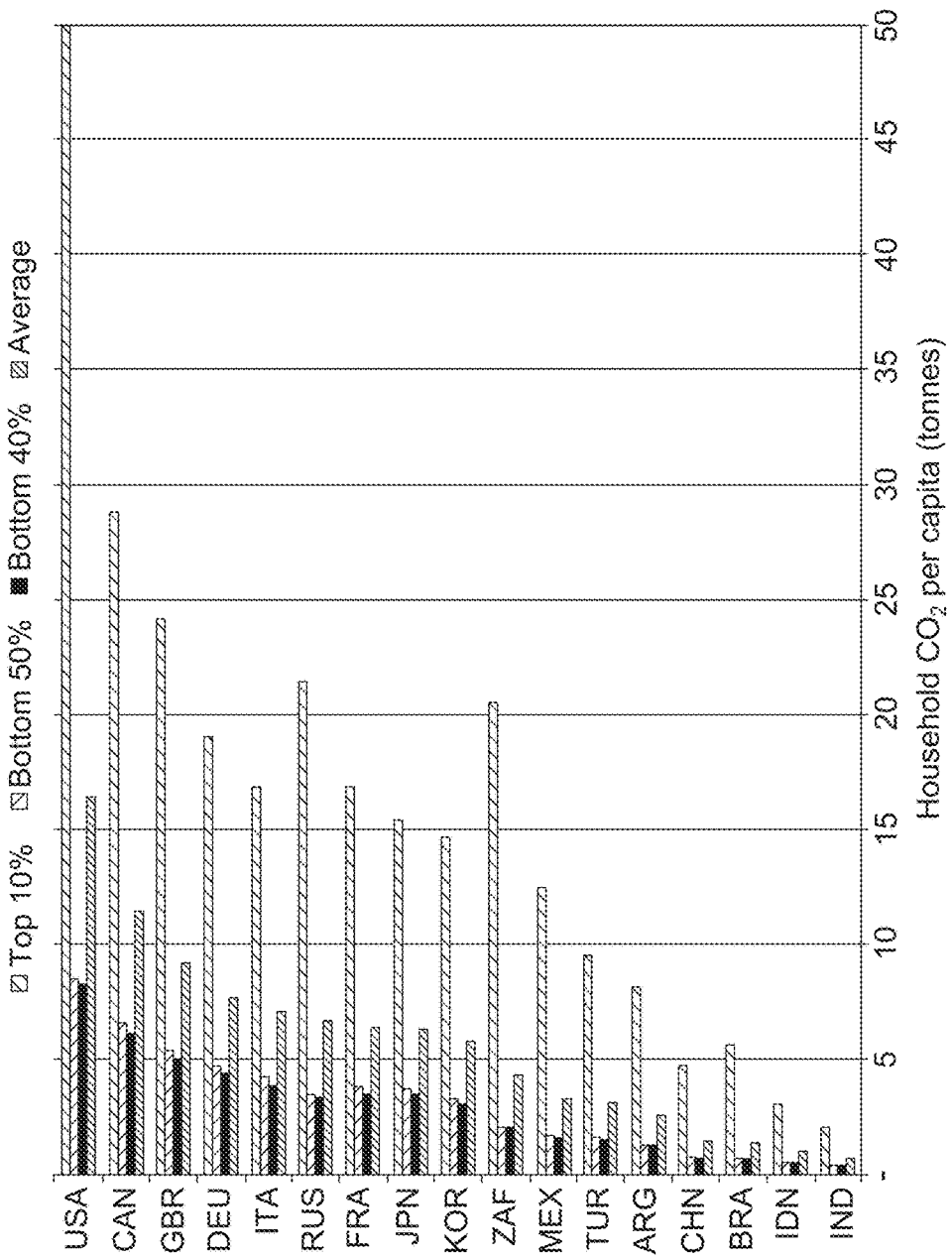
Figure 8:
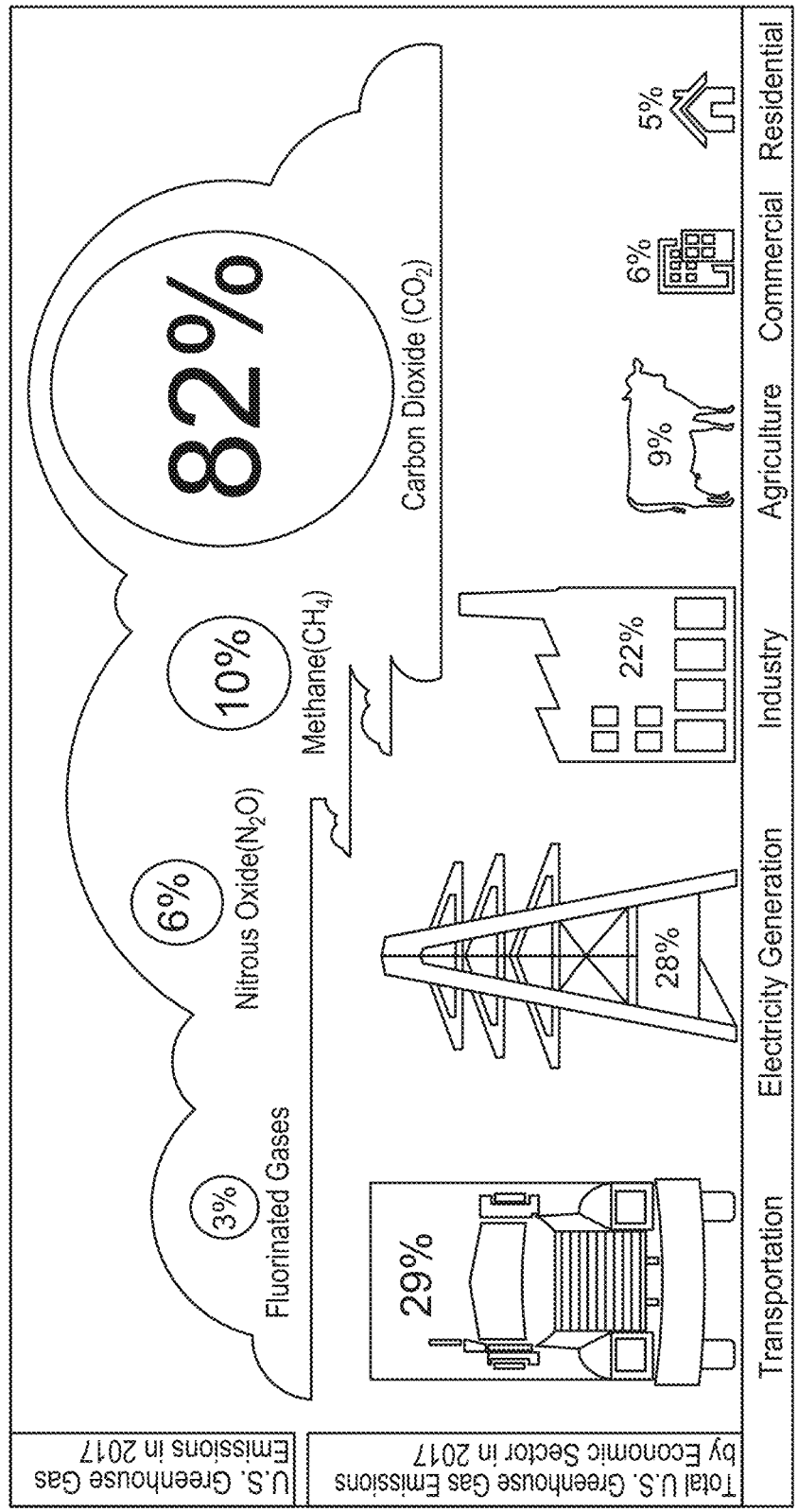
Figure 9:
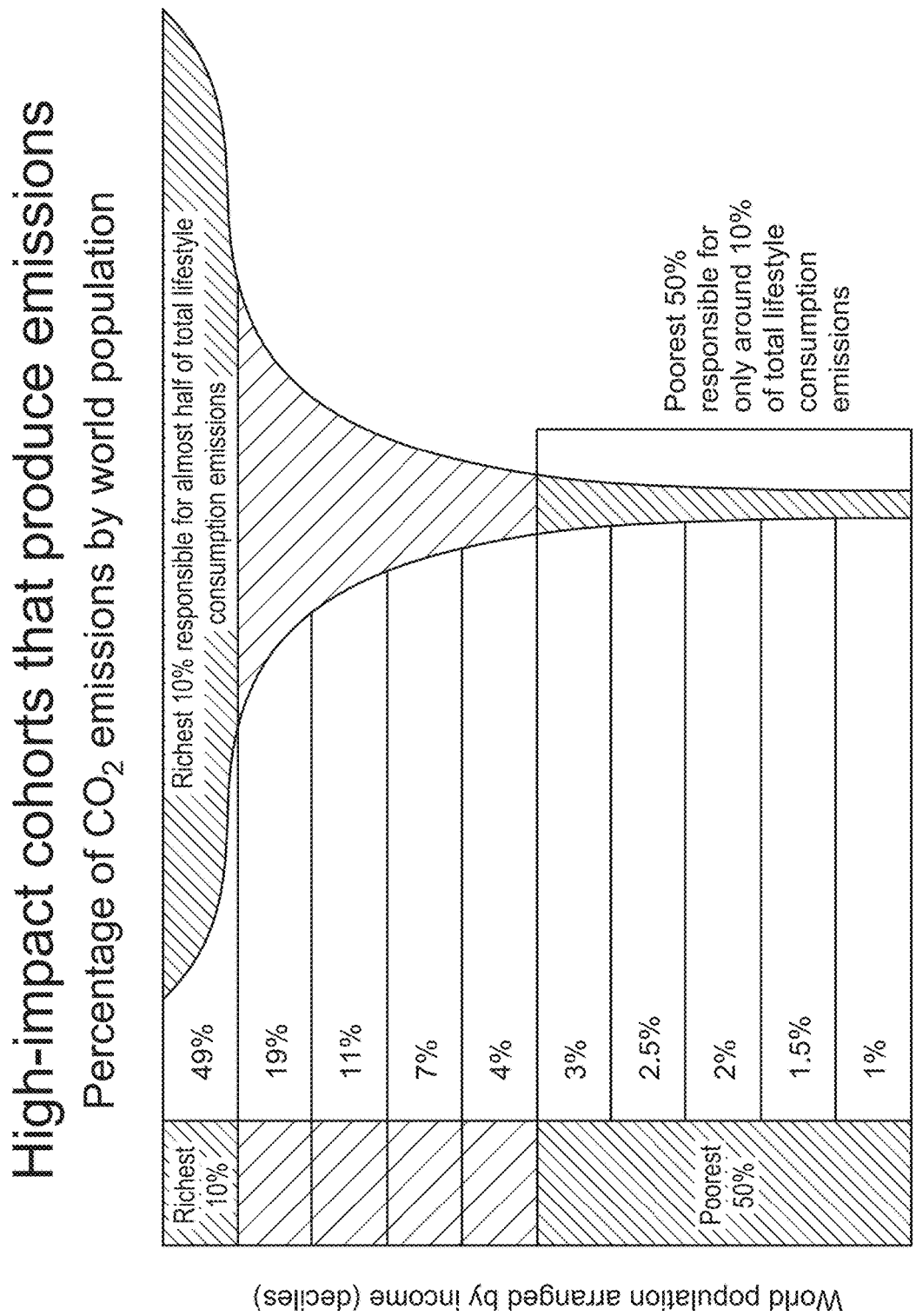
Figure 10:
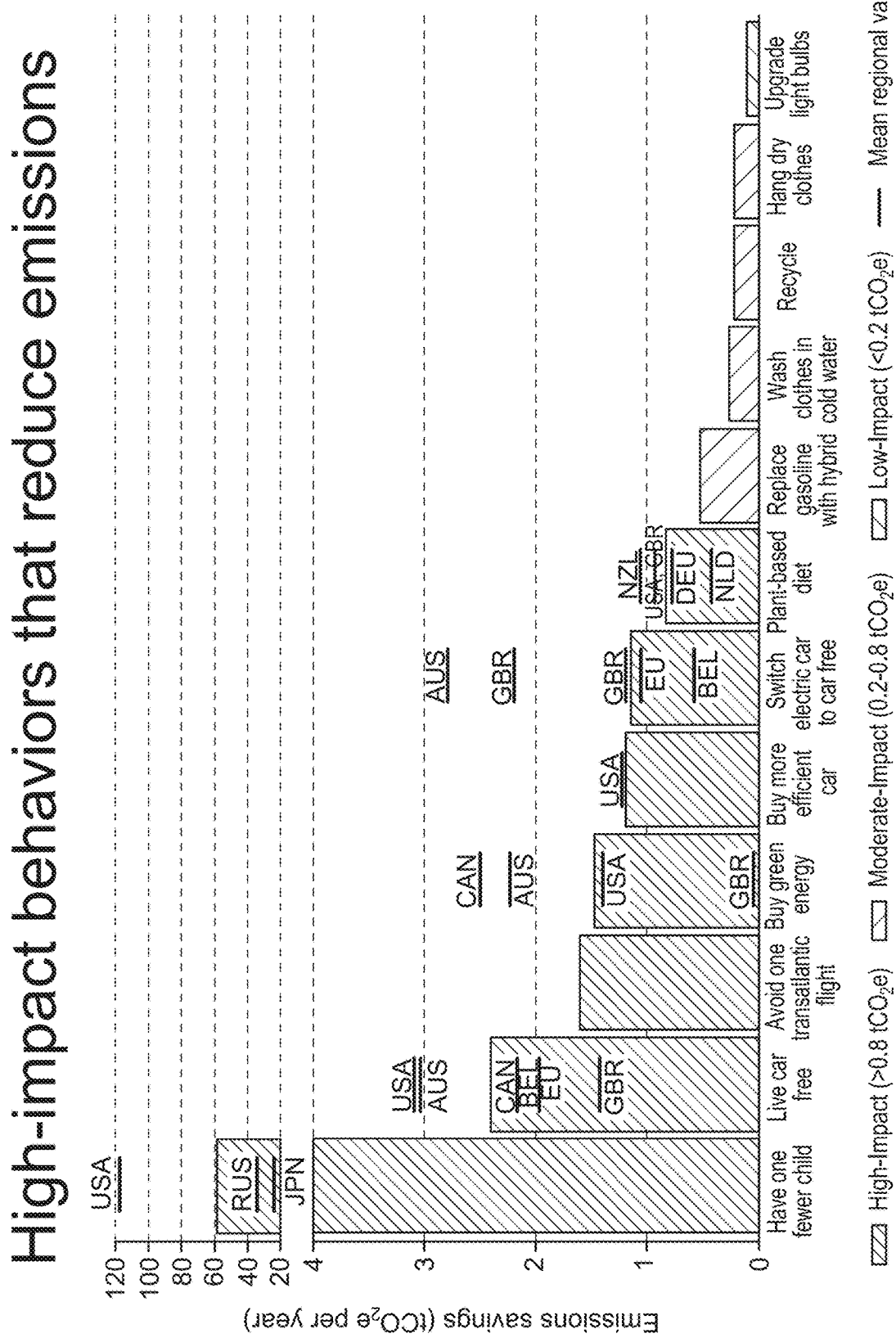
Figure 12:
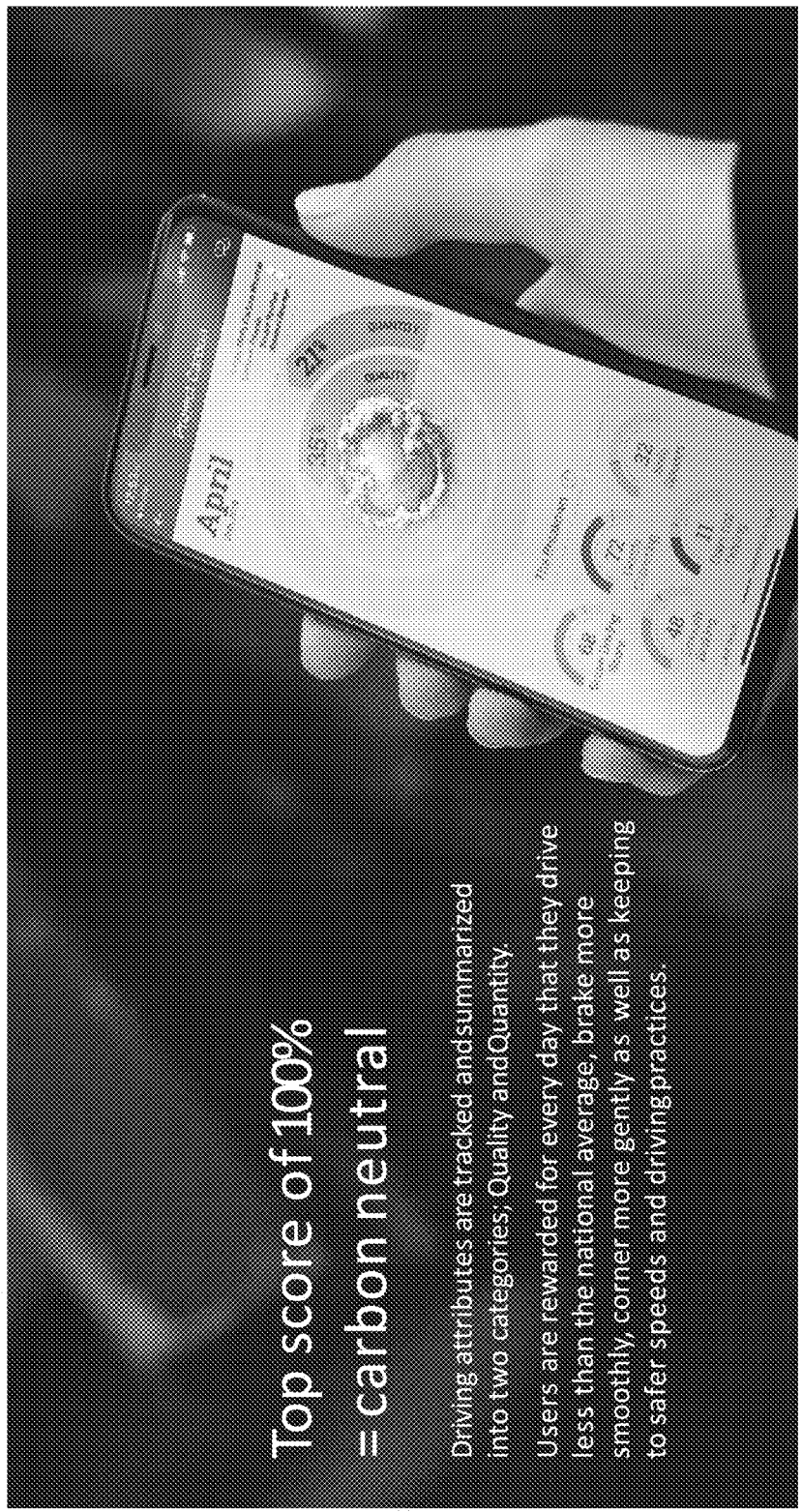
Figure 13:
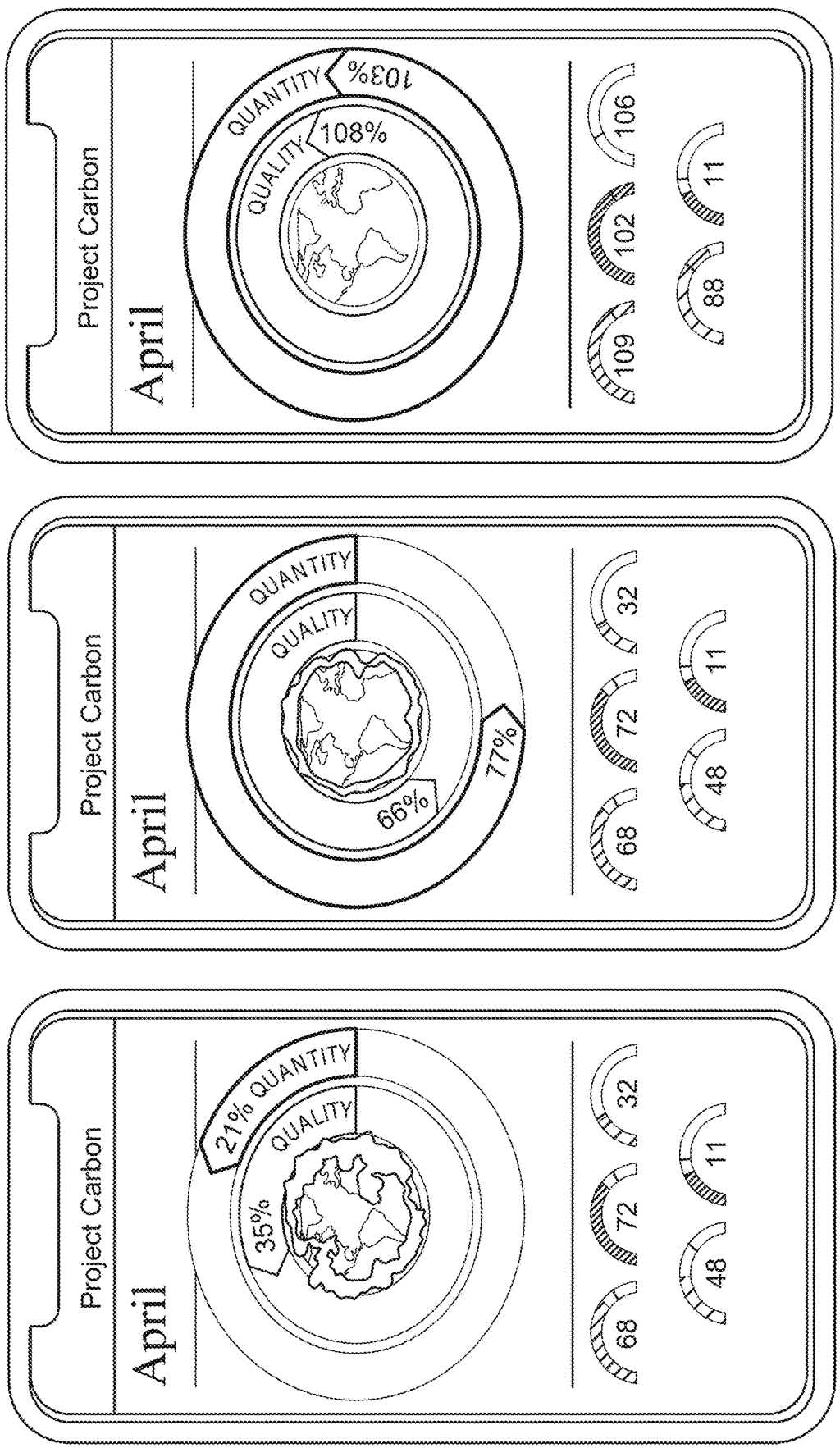
Figure 14:
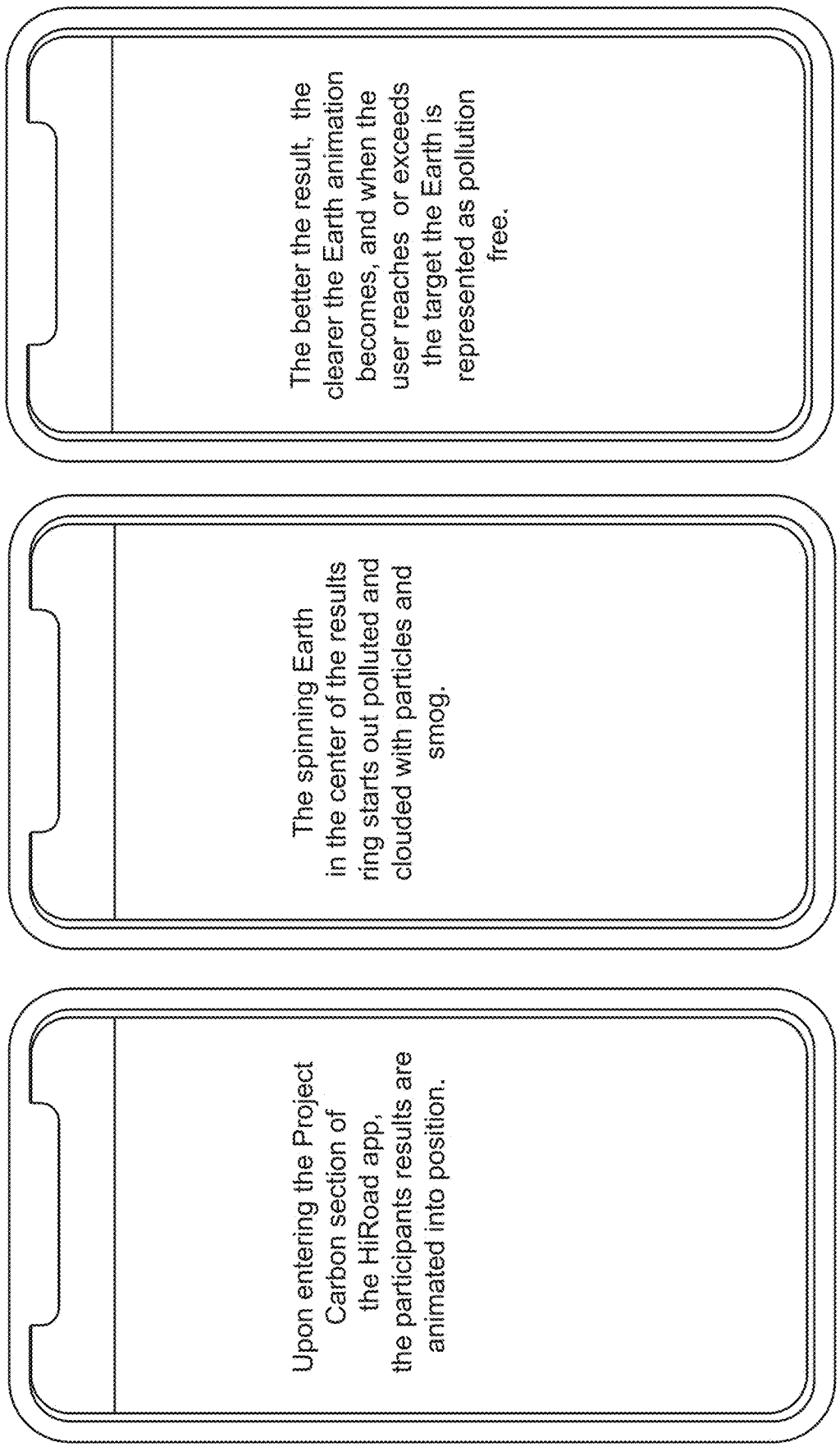
Figure 15:
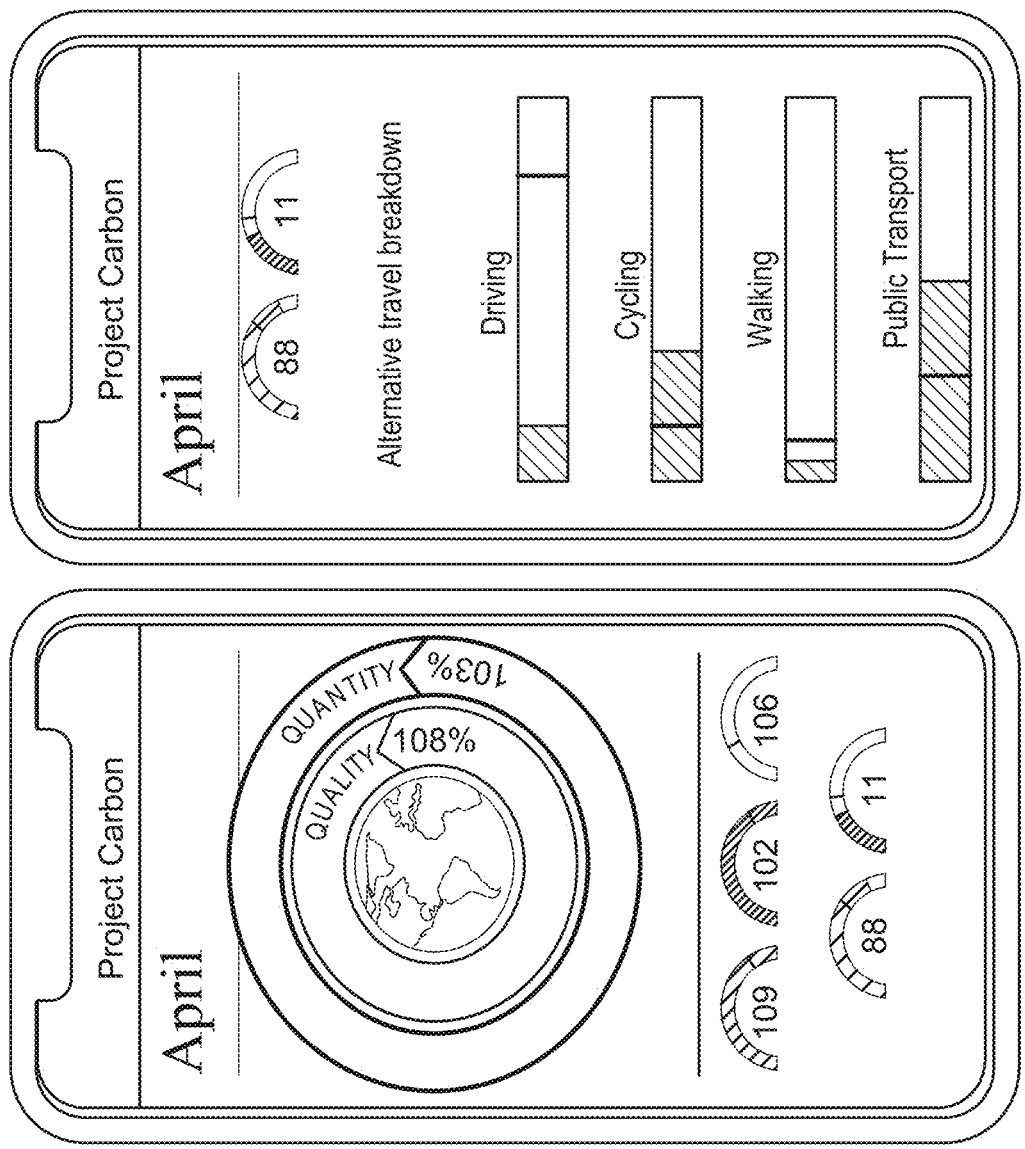
Figure 16:
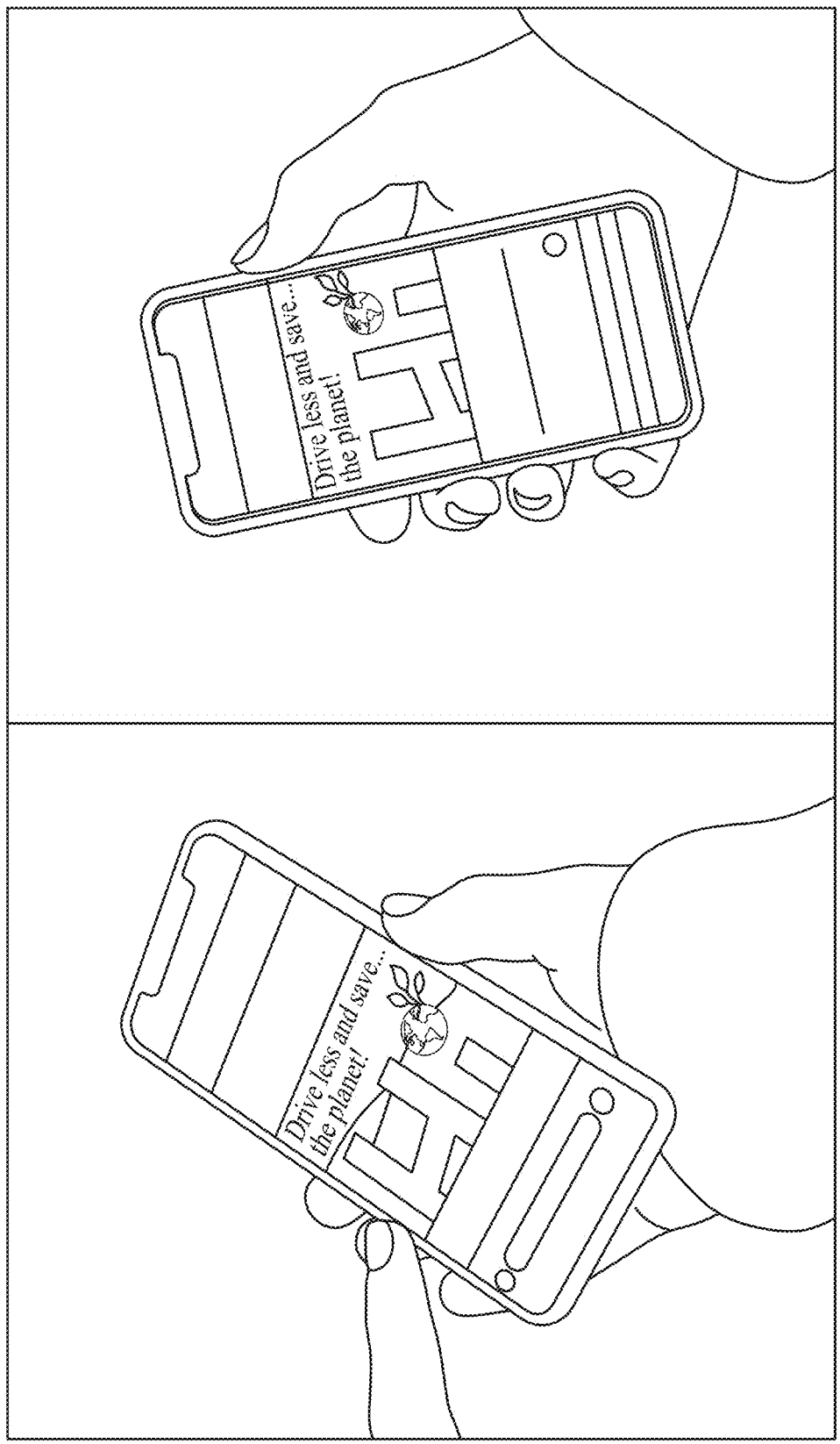
Figure 21:
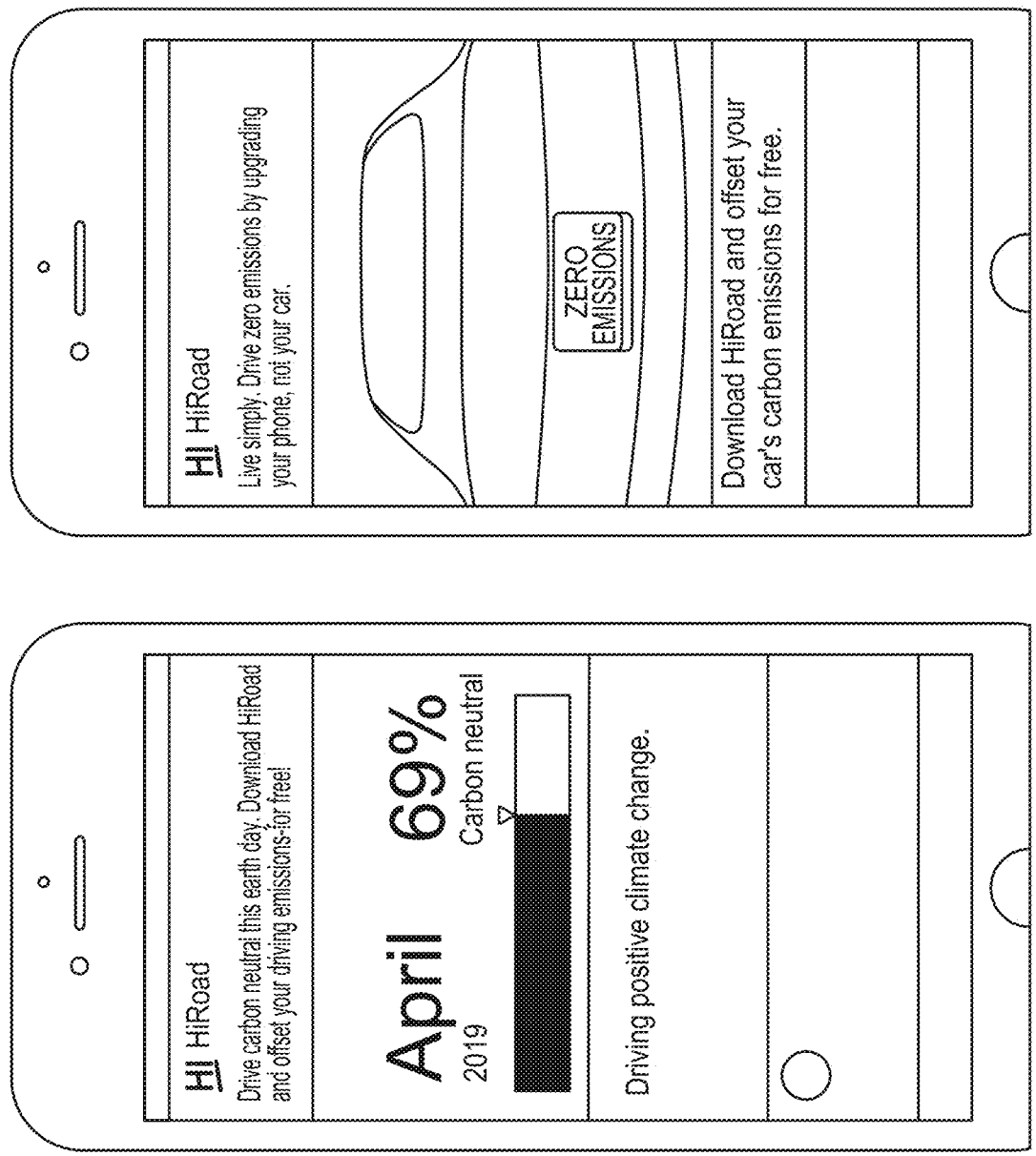
Figure 25:
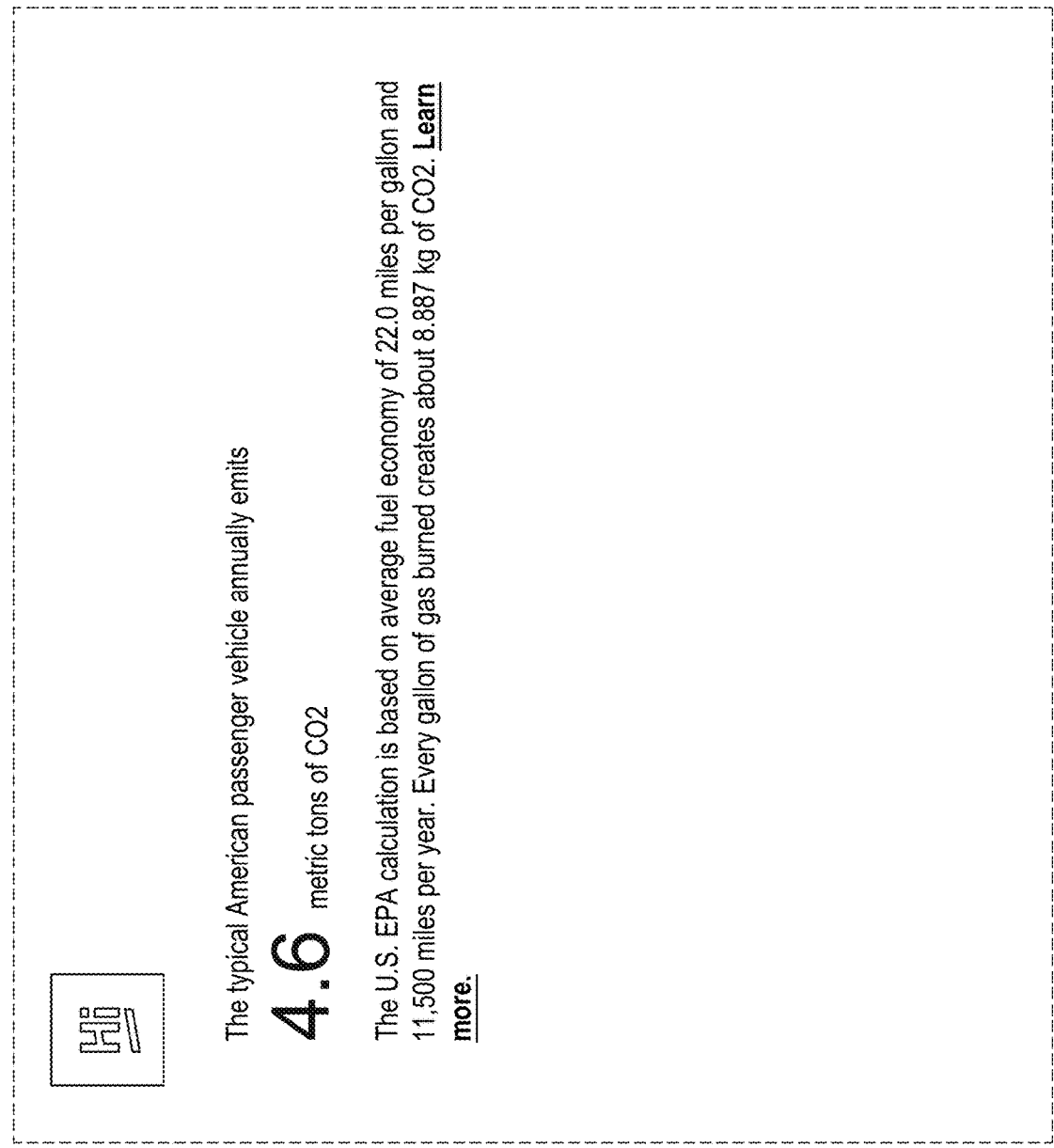
Figure 26:
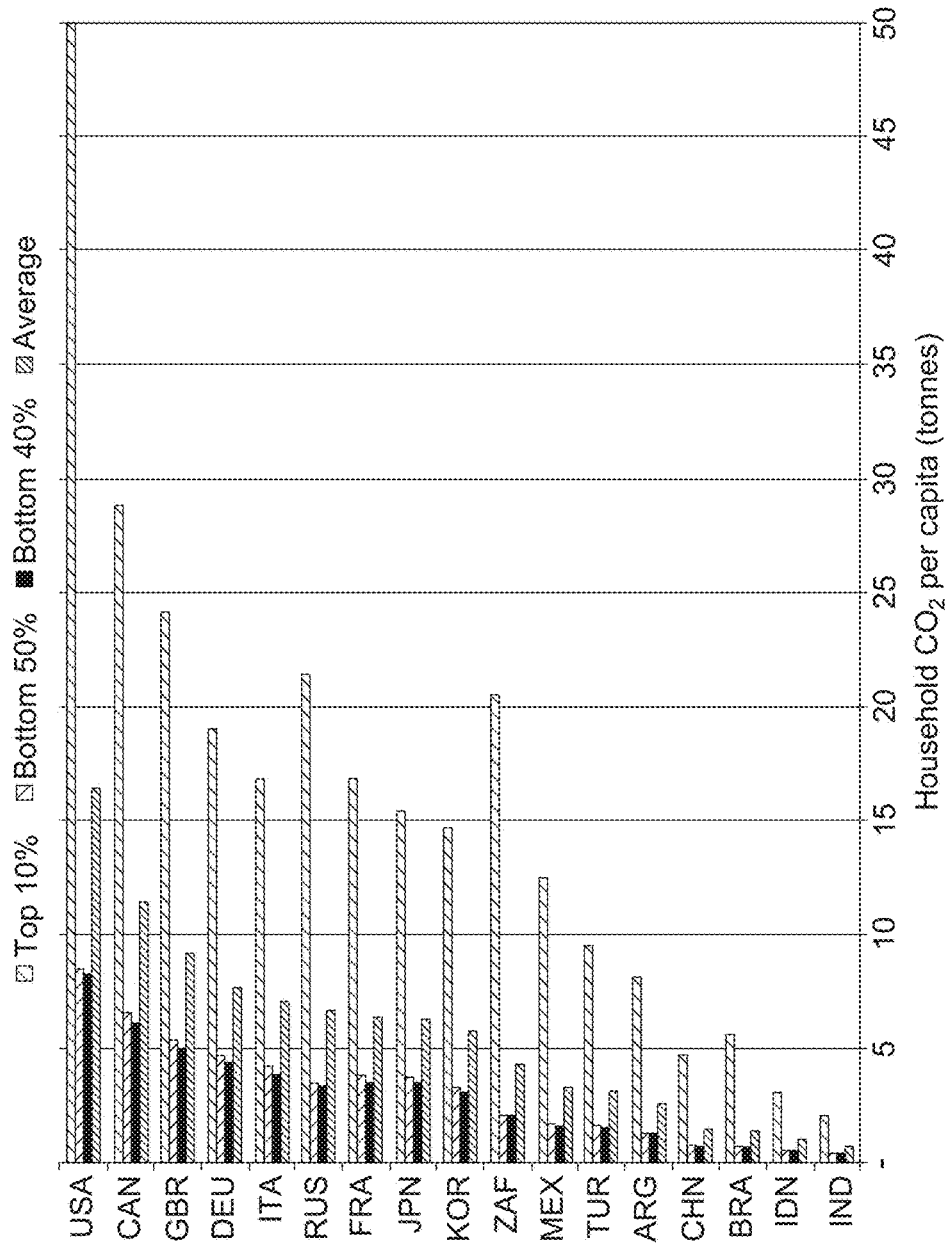
Figure 27:
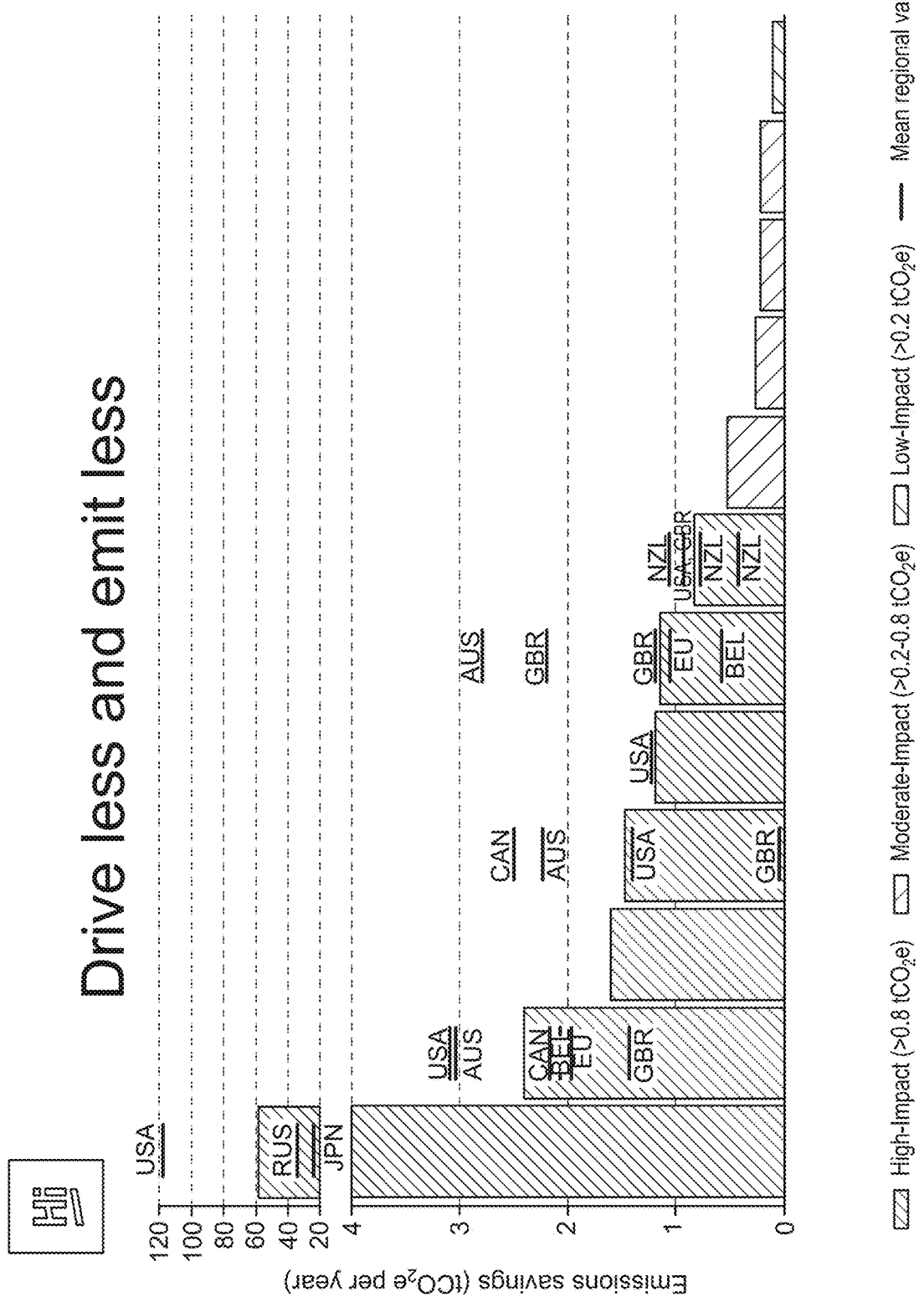
Figure 28:
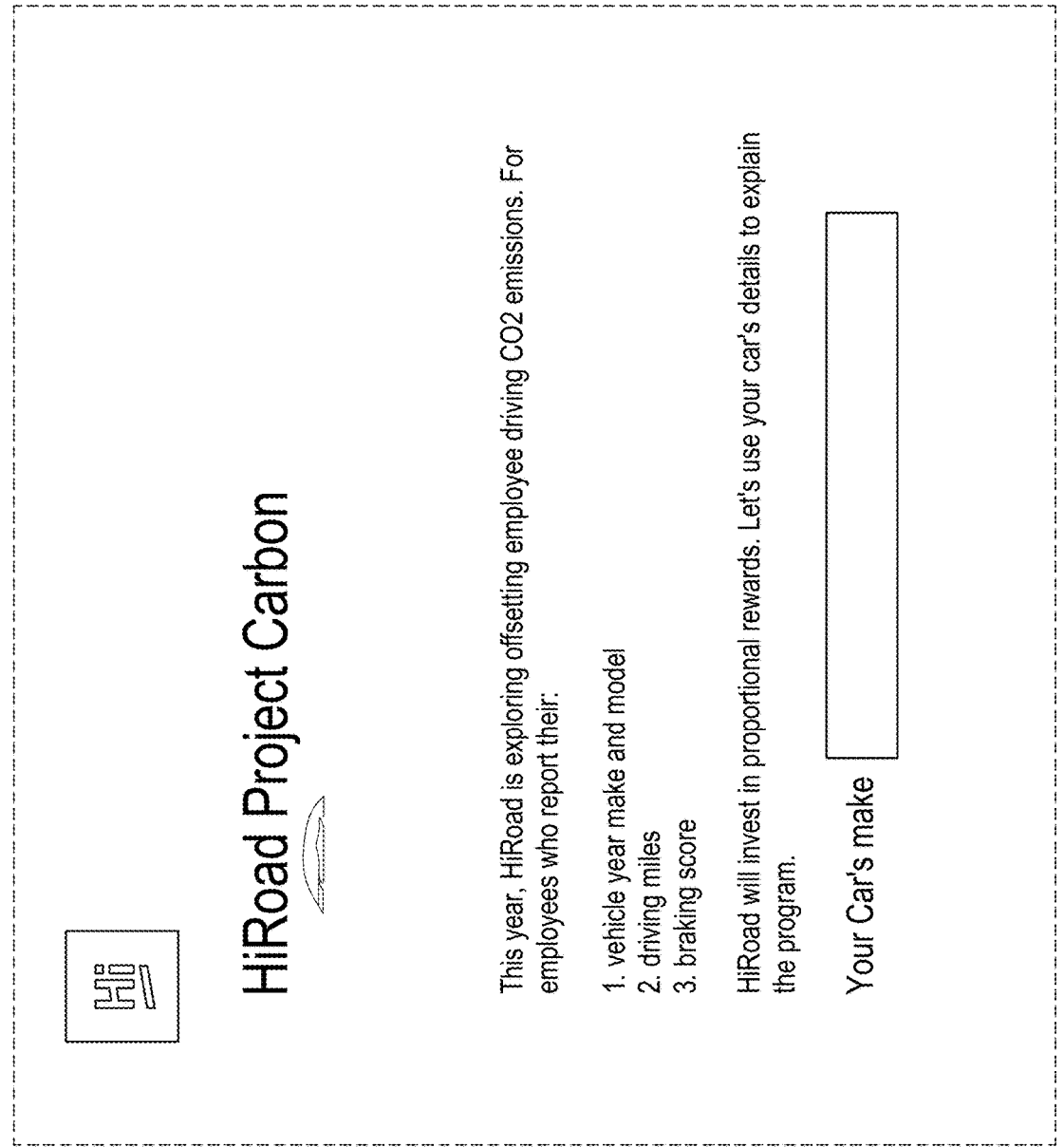
Figure 29:
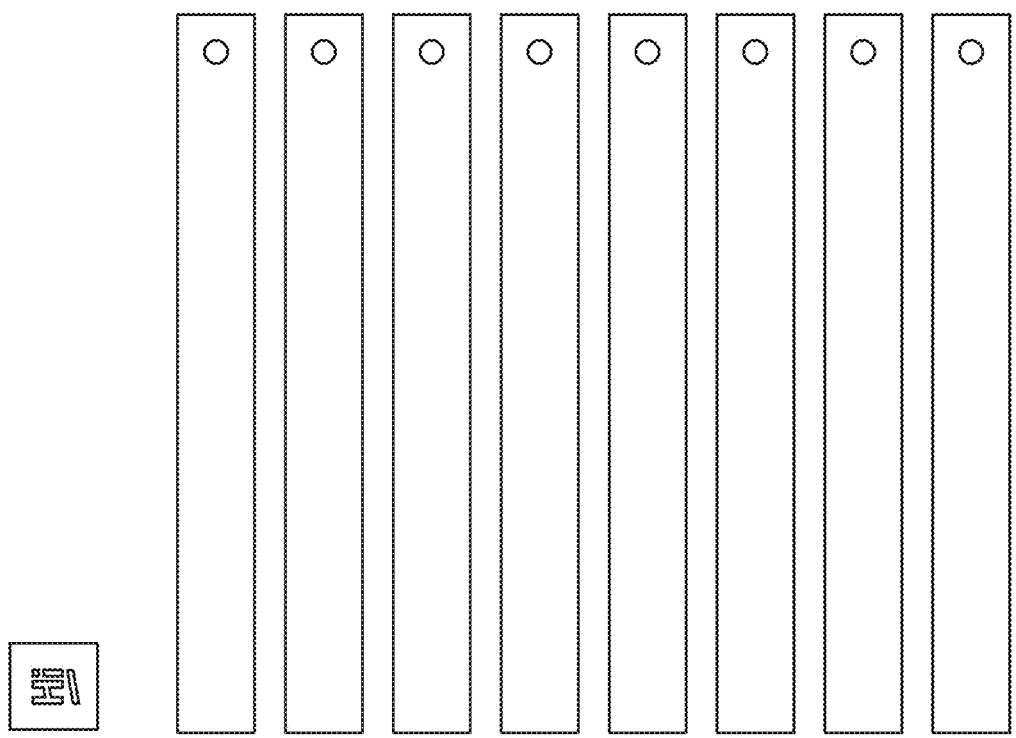
Figure 30:
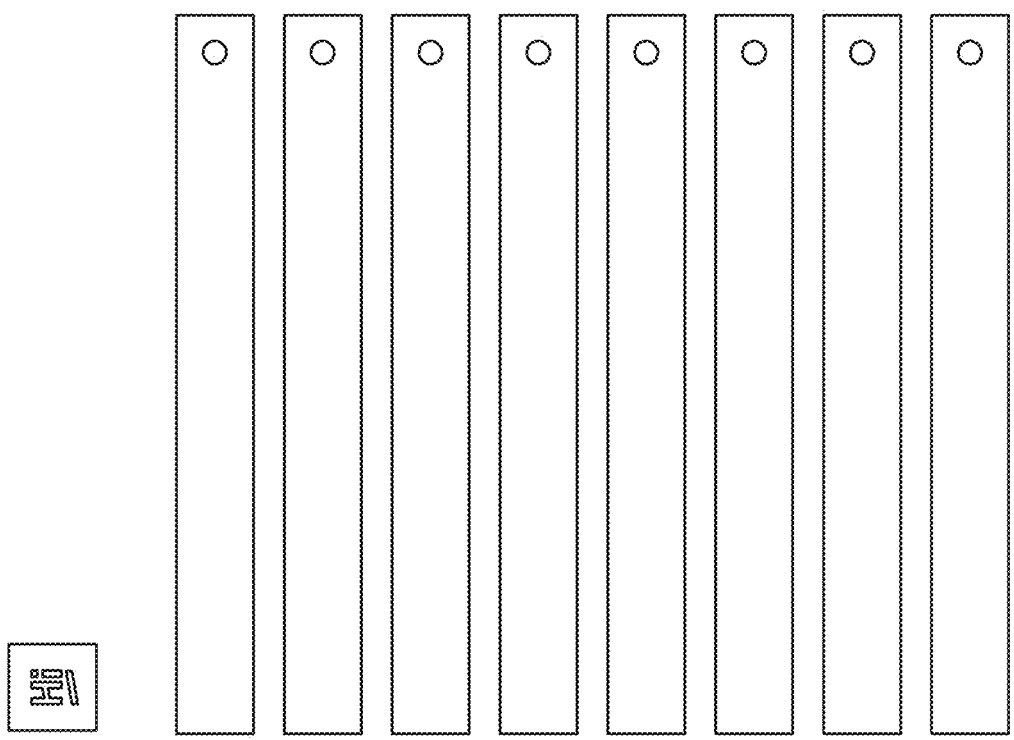
Figure 31:
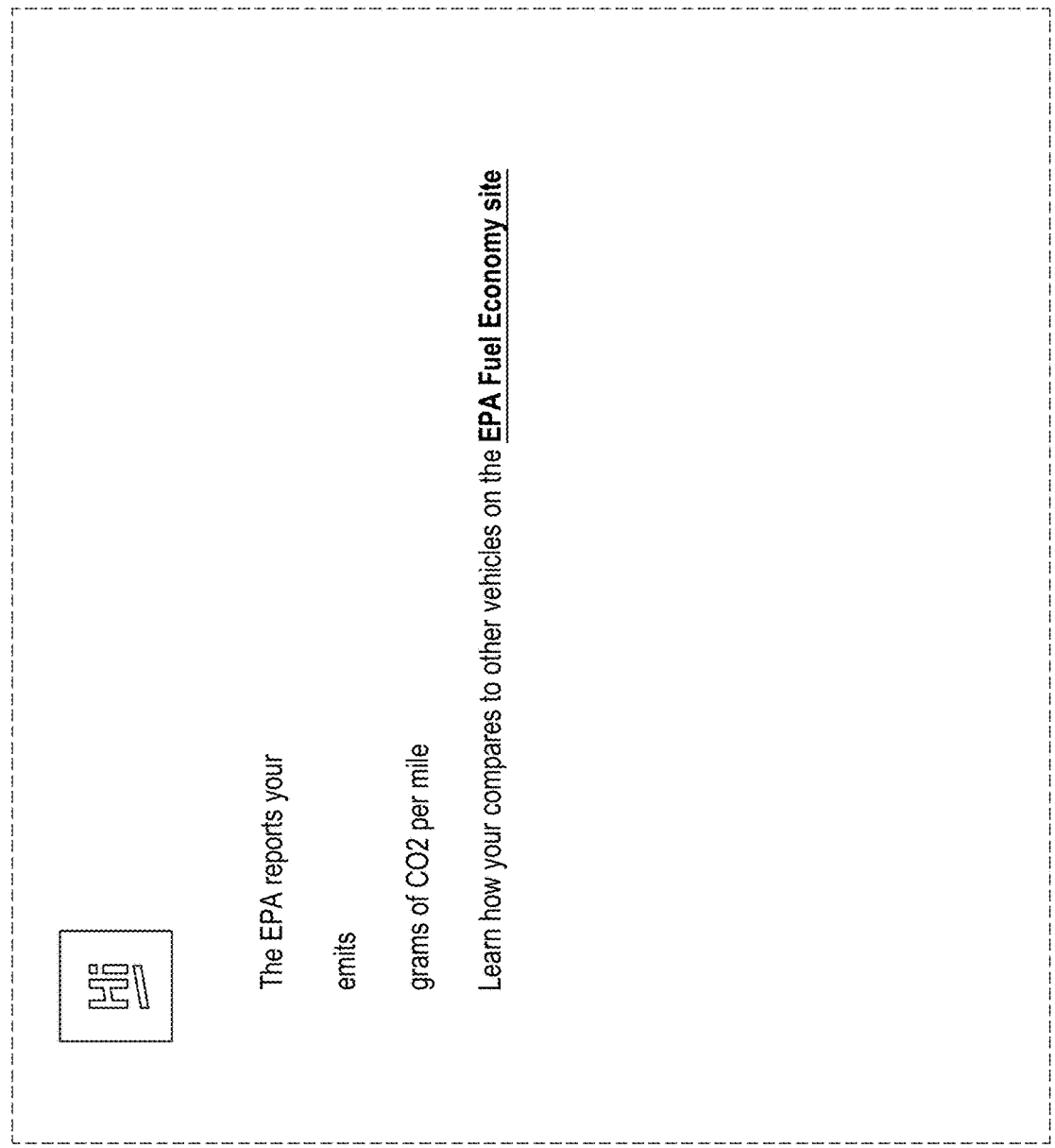
Figure 32:
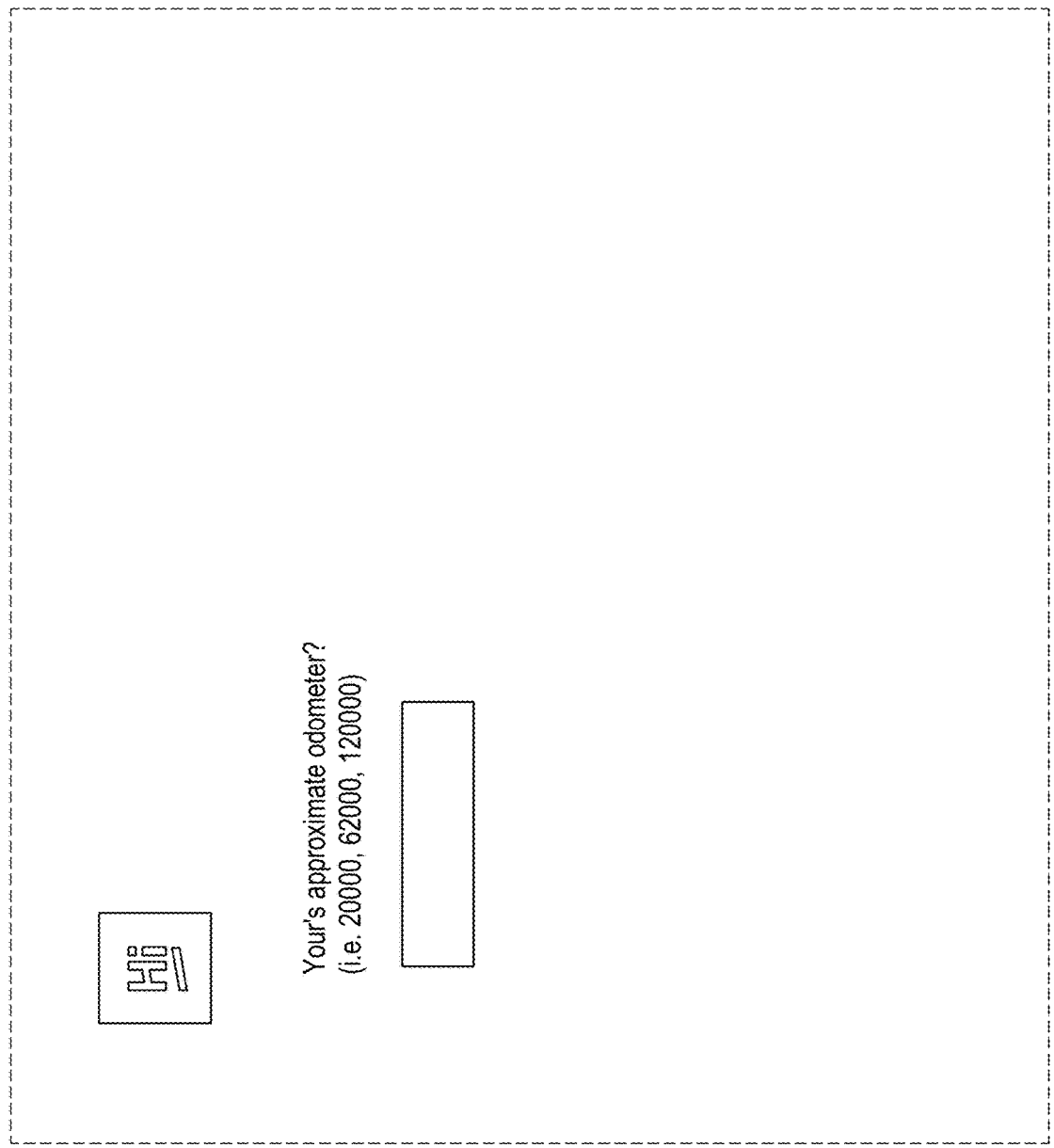
Figure 33:
Figure 34:
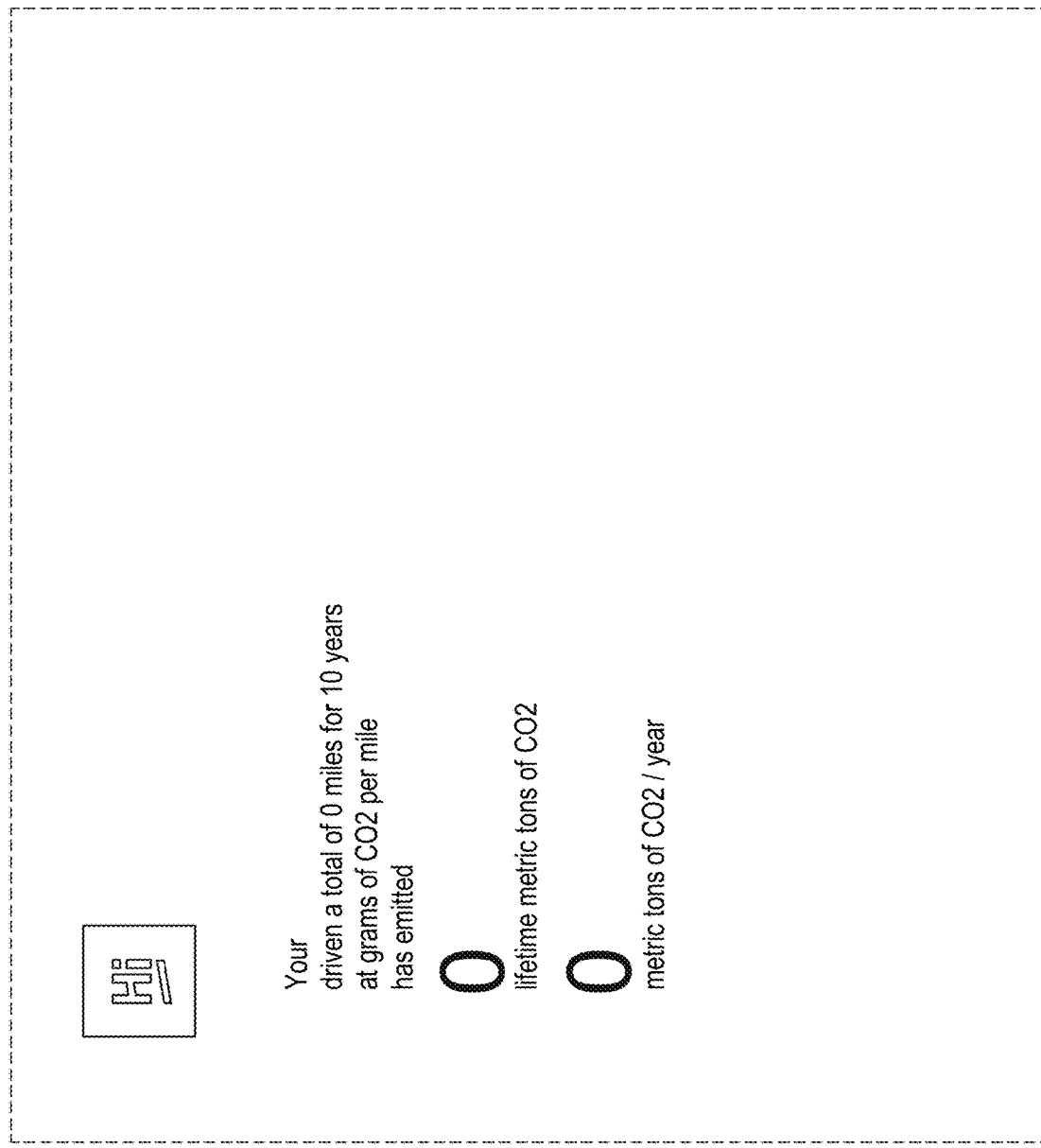
Figure 36:
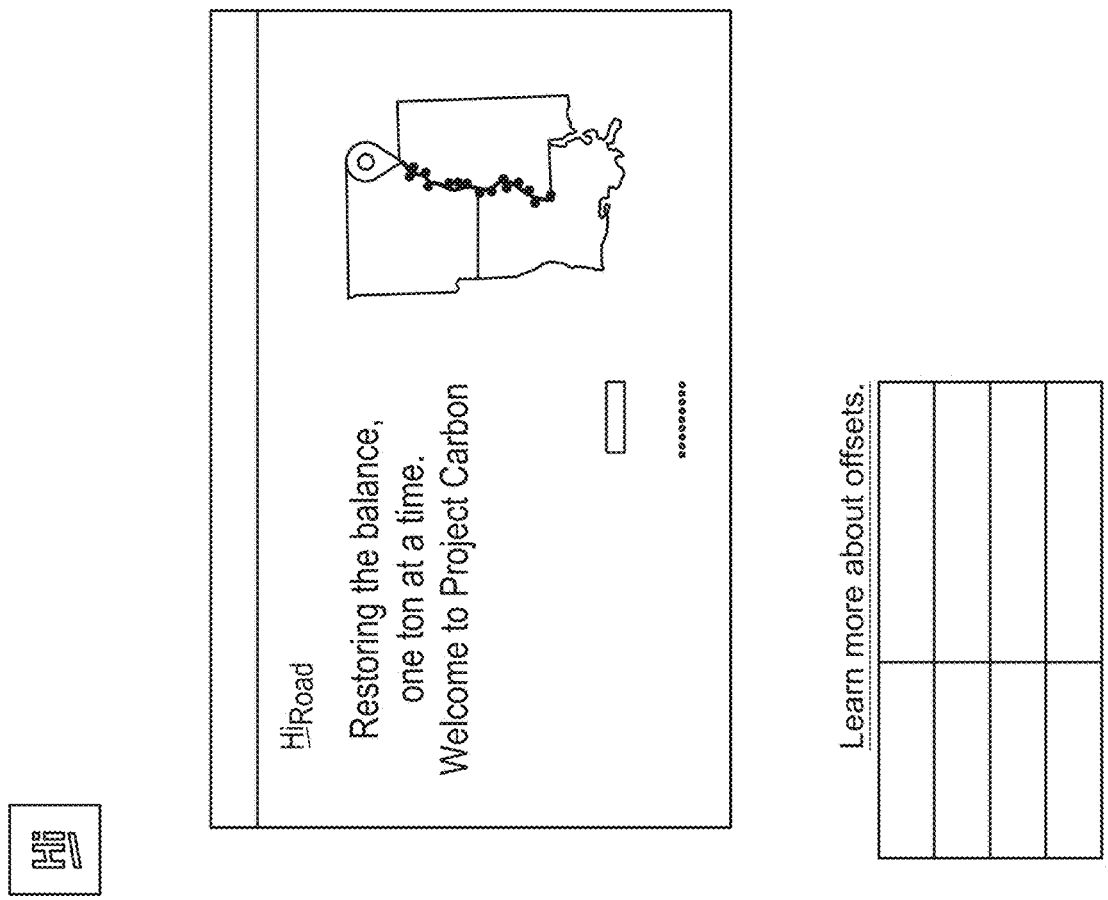
Figure 37:
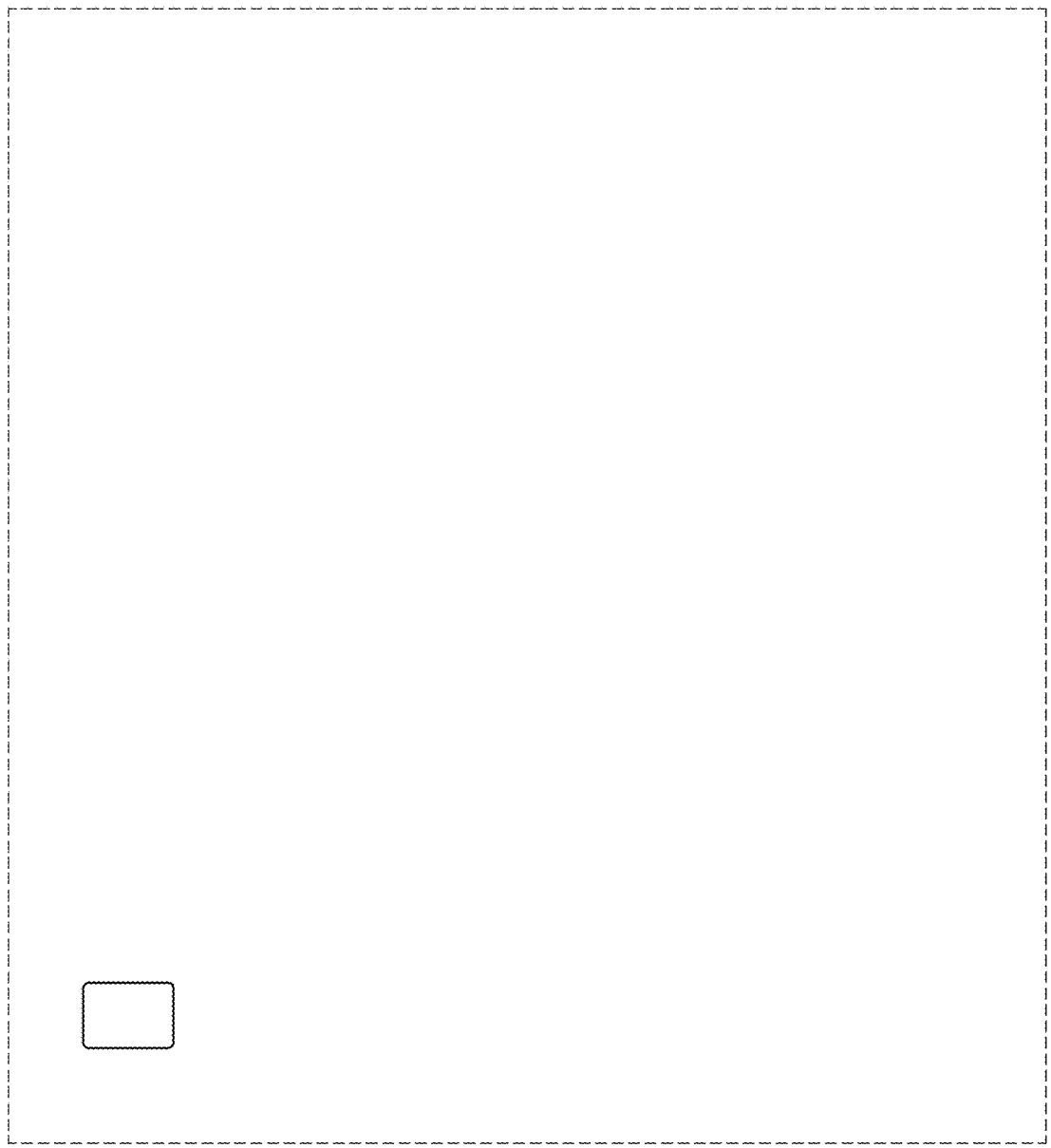
Figure 38:
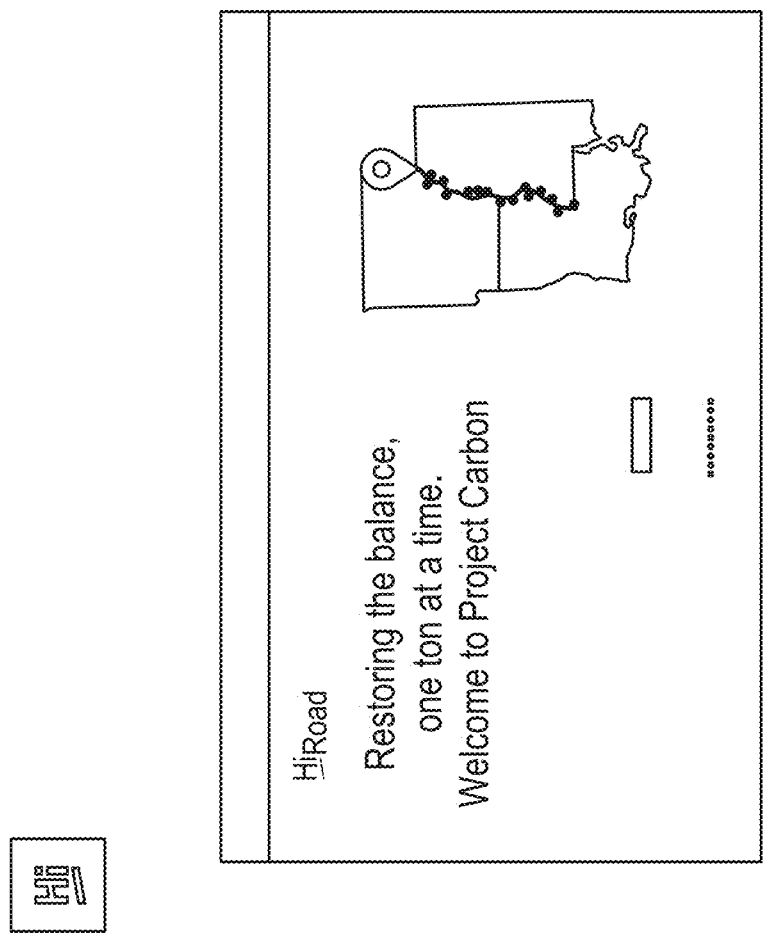
Figure 39:
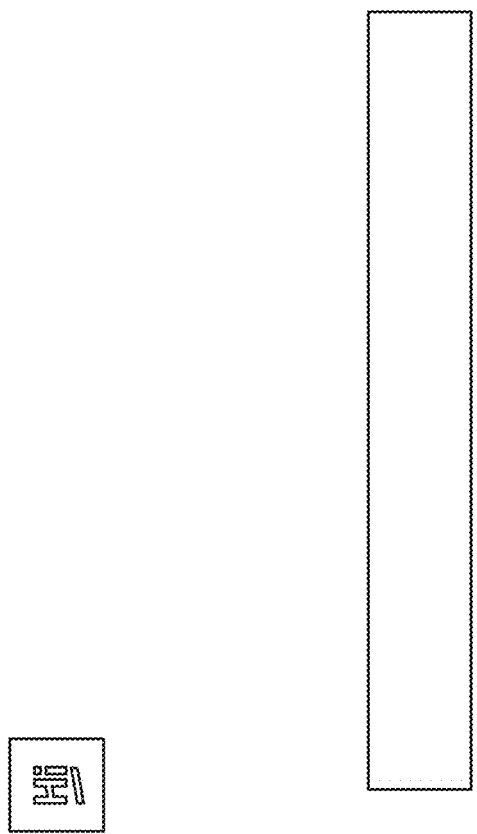
Figure 40:
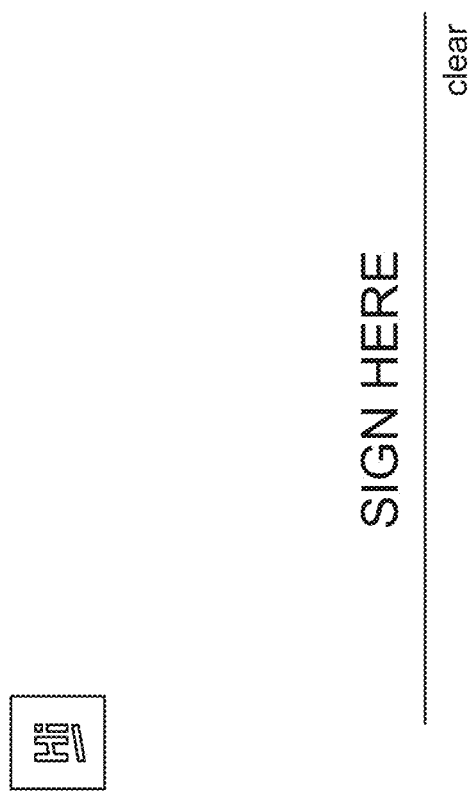
Figure 41:
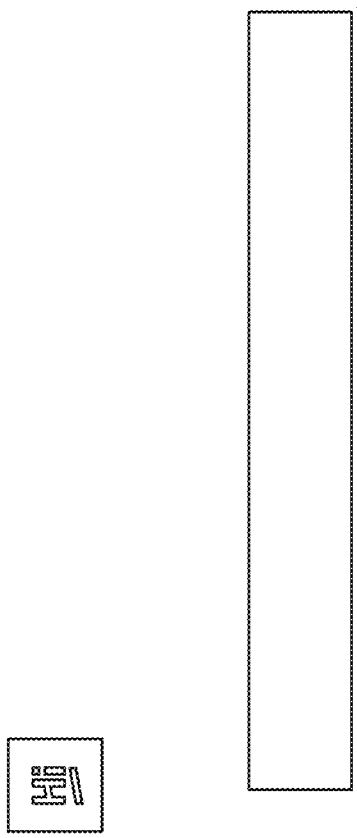
Figure 42:
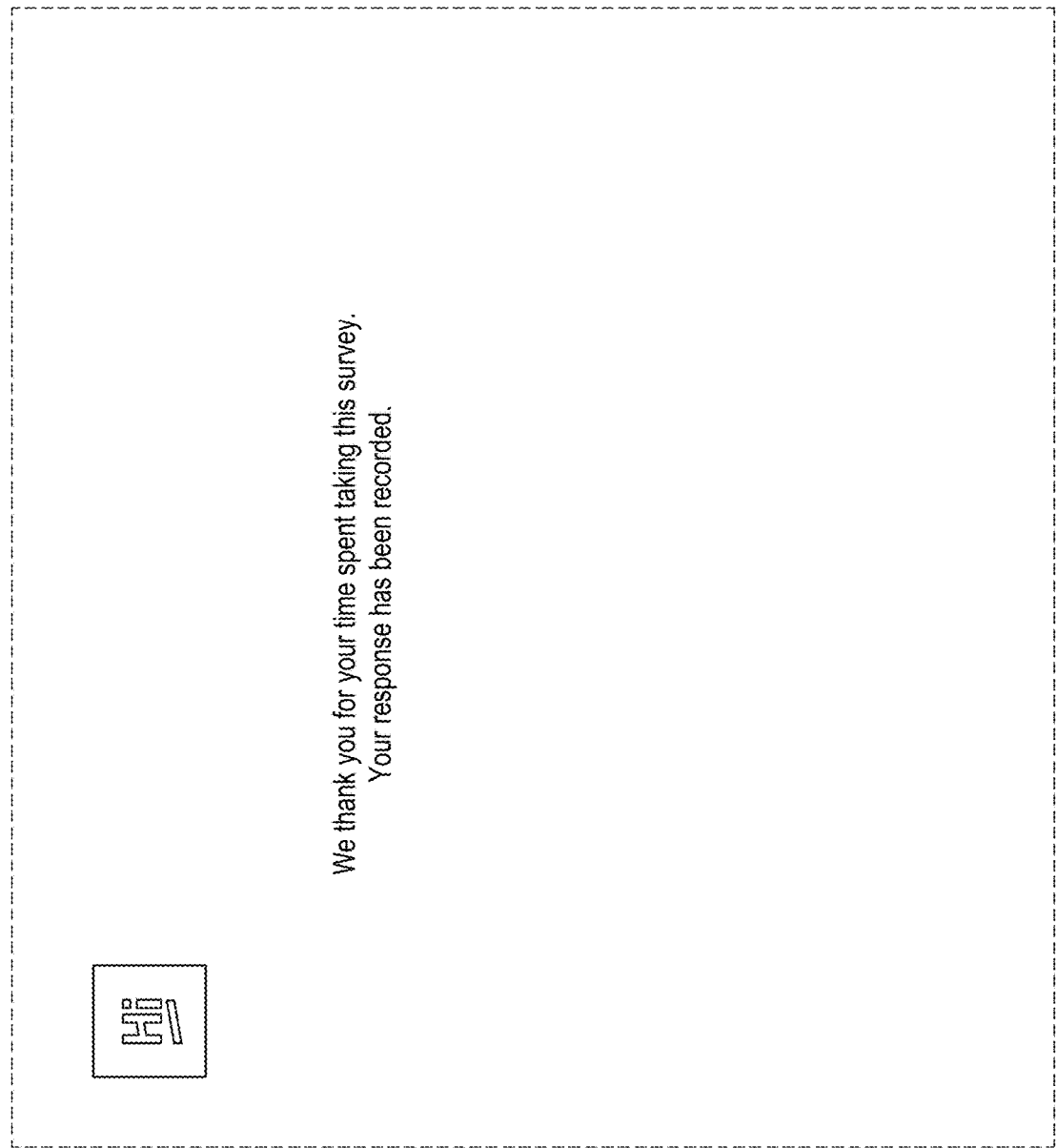

III. One or More Systems for Selecting Vehicle Routes According to Certain Embodiments FIG. 6 is a simplified system for selecting vehicle routes according to certain embodiments of the present disclosure. This diagram is merely an example, which should not unduly limit the scope of the claims. One of ordinary skill in the art would recognize many variations, alternatives, and modifications. The system 600 includes a vehicle system 602, a network 604, and a server 606. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 600 is used to implement the method 100, the method 200, the method 300, the method 400 and/or the method 500. According to certain embodiments, the vehicle system 602 includes a vehicle 610 and a client device 612 associated with the vehicle 610. For example, the client device 612 is an on-board computer embedded or located in the vehicle 610. As an example, the client device 612 is a mobile device (e.g., a smartphone) that is connected (e.g., via wired or wireless links) to the vehicle 610. As an example, the client device 612 includes a processor 616 (e.g., a central processing unit (CPU), a graphics processing unit (GPU)), a memory 618 (e.g., random-access memory (RAM), read-only memory (ROM), flash memory), a communications unit 620 (e.g., a network transceiver), a display unit 622 (e.g., a touchscreen), and one or more sensors 624 (e.g., an accelerometer, a gyroscope, a magnetometer, a GPS sensor).

In some embodiments, the vehicle 610 is operated by the user. In certain embodiments, multiple vehicles 610 exist in the system 600 which are operated by respective users. As an example, during vehicle trips, the one or more sensors 624 monitor the vehicle 610 by collecting data associated with various operating parameters of the vehicle, such as speed, acceleration, braking, location, engine status, as well as other suitable parameters. In certain embodiments, the collected data include vehicle telematics data. According to some embodiments, the data are collected continuously, at predetermined time intervals, and/or based on a triggering event (e.g., when each sensor has acquired a threshold amount of sensor measurements). In various embodiments, the collected data represent the various user driving data in the method 100, the method 200, the method 400 and/or the method 500, and/or the various sets/groups of training data in the method 300.

According to certain embodiments, the collected data are stored in the memory 618 before being transmitted to the server 606 using the communications unit 622 via the network 604 (e.g., via a local area network (LAN), a wide area network (WAN), the Internet). In some embodiments, the collected data are transmitted directly to the server 606 via the network 604. In certain embodiments, the collected data are transmitted to the server 606 via a third party. For example, a data monitoring system stores any and all data collected by the one or more sensors 624 and transmits those data to the server 606 via the network 604 or a different network.

According to certain embodiments, the server 606 includes a processor 630 (e.g., a microprocessor, a microcontroller), a memory 632, a communications unit 634 (e.g., a network transceiver), and a data storage 636 (e.g., one or more databases). In some embodiments, the server 606 is a single server, while in certain embodiments, the server 606 includes a plurality of servers with distributed processing. In FIG. 6, the data storage 636 is shown to be part of the server 606. In some embodiments, the data storage 636 is a separate entity coupled to the server 606 via a network such as the network 604. In certain embodiments, the server 606 includes various software applications stored in the memory 632 and executable by the processor 630. For example, these software applications include specific programs, routines, or scripts for performing functions associated with the method 100, the method 200, the method 300, the method 400 and/or the method 500. As an example, the software applications include general-purpose software applications for data processing, network communication, database management, web server operation, and/or other functions typically performed by a server.

According to various embodiments, the server 606 receives, via the network 604, the data collected by the one or more sensors 624 using the communications unit 634 and stores the data in the data storage 636. For example, the server 606 then processes the data to perform one or more processes of the method 100, one or more processes of the method 200, one or more processes of the method 300, one or more processes of the method 400 and/or one or more processes of the method 500.

According to certain embodiments, the selected route(s) in the method 100, the method 200, the method 400 and/or the method 500 is transmitted back to the client device 612, via the network 604, to be displayed via the display unit 622.

In some embodiments, one or more processes of the method 100, one or more processes of the method 200, one or more processes of the method 300, one or more processes of the method 400 and/or one or more processes of the method 500 are performed by the client device 612. For example, the processor 616 of the client device 612 processes the data collected by the one or more sensors 624 to perform one or more processes of the method 100, one or more processes of the method 200, one or more processes of the method 300, one or more processes of the method 400 and/or one or more processes of the method 500.

IV. Examples of Certain Embodiments of the Present Disclosure

According to some embodiments, a method for selecting a vehicle route includes collecting information for a future vehicle trip that will be made by a user. The future vehicle trip corresponds to a particular pair of origination and destination points. Also, the method includes generating multiple routes for the same future vehicle trip, where the multiple routes all correspond to the same particular pair of origination and destination points. Additionally, the method includes predicting multiple amounts of fuel consumption for the multiple routes respectively. For each route of the multiple routes, an amount of fuel consumption by the user is predicted based at least in part upon information for the route and one or more user driving features of the user. Moreover, the method includes selecting a route from the multiple routes based at least in part upon the predicted multiple amounts of fuel consumption. The predicted multiple amounts of fuel consumption correspond to the multiple routes respectively and the selected route corresponds to a least amount among the predicted multiple amounts of fuel consumption. For example, the method is implemented according to at least FIG. 1 and/or FIG. 2.

According to certain embodiments, a method for selecting one or more vehicle routes for one or more users for a same future vehicle trip includes collecting information for a future vehicle trip that will be made separately by a first user and by a second user. The future vehicle trip corresponds to a particular pair of origination and destination points. Also, the method includes generating multiple routes for the same future vehicle trip, where the multiple routes all correspond to the same particular pair of origination and destination points. Additionally, the method includes predicting a first set of multiple amounts of fuel consumption for the multiple routes respectively and predicting a second set of multiple amounts of fuel consumption for the multiple routes respectively. For each route of the multiple routes, an amount of fuel consumption by the first user is predicted based at least in part upon information for the route and a first set of one or more user driving features of the first user. For each route of the multiple routes, an amount of fuel consumption by the second user is predicted based at least in part upon information for the route and a second set of one or more user driving features of the second user. Further, the method includes selecting a first route from the multiple routes based at least in part upon the predicted first set of multiple amounts of fuel consumption for the multiple routes. The selected first route corresponds to a least amount among the predicted first set of multiple amounts of fuel consumption. Moreover, the method includes selecting a second route from the multiple routes based at least in part upon the predicted second set of multiple amounts of fuel consumption for the multiple routes. The selected second route corresponds to a least amount among the predicted second set of multiple amounts of fuel consumption. For example, the method is implemented according to at least FIG. 4A and FIG. 4B, and/or FIG. 5A and FIG. 5B.

According to some embodiments, a computing device for selecting a vehicle route includes one or more processors and a memory that stores instructions for execution by the one or more processors. The instructions, when executed, cause the one or more processors to collect information for a future vehicle trip that will be made by a user. The future vehicle trip corresponds to a particular pair of origination and destination points. Also, the instructions, when executed, cause the one or more processors to generate multiple routes for the same future vehicle trip, where the multiple routes all correspond to the same particular pair of origination and destination points. Additionally, the instructions, when executed, cause the one or more processors to predict multiple amounts of fuel consumption for the multiple routes respectively. For each route of the multiple routes, an amount of fuel consumption by the user is predicted based at least in part upon information for the route and one or more user driving features of the user. Moreover, the instructions, when executed, cause the one or more processors to select a route from the multiple routes based at least in part upon the predicted multiple amounts of fuel consumption. The predicted multiple amounts of fuel consumption correspond to the multiple routes respectively and the selected route corresponds to a least amount among the predicted multiple amounts of fuel consumption. For example, the computing device is implemented according to at least FIG. 6.

According to certain embodiments, a non-transitory computer-readable medium stores instructions for selecting a vehicle route. The instructions are executed by one or more processors of a computing device. The non-transitory computer-readable medium includes instructions to collect information for a future vehicle trip that will be made by a user. The future vehicle trip corresponds to a particular pair of origination and destination points. Also, the non-transitory computer-readable medium includes instructions to generate multiple routes for the same future vehicle trip, where the multiple routes all correspond to the same particular pair of origination and destination points. Additionally, the non-transitory computer-readable medium includes instructions to predict multiple amounts of fuel consumption for the multiple routes respectively. For each route of the multiple routes, an amount of fuel consumption by the user is predicted based at least in part upon information for the route and one or more user driving features of the user. Moreover, the non-transitory computer-readable medium includes instructions to select a route from the multiple routes based at least in part upon the predicted multiple amounts of fuel consumption. The predicted multiple amounts of fuel consumption correspond to the multiple routes respectively and the selected route corresponds to a least amount among the predicted multiple amounts of fuel consumption. For example, the non-transitory computer-readable medium is implemented according to at least FIG. 1, FIG. 2 and/or FIG. 6.

V. One or More Systems and Methods for Monitoring, Reducing and/or Offsetting Carbon Emissions According to Some Embodiments According to certain embodiments, a system (e.g., a computer program product) is provided to measure a person's carbon emission, understand a person's carbon emission, offset a portion of a person's carbon emission, and/or empower a person to offset the rest of the person's carbon emission.

In some embodiments, the system (e.g., the computer program product) is configured to measure a person's carbon emission to make accurate carbon accounting easy. In certain embodiments, the system (e.g., the computer program product) is configured to perform one or more of the following:

1. Combustion efficiency—Tailpipe:
   a. Smog test:
      i. Harvest smog test data from DMV records for individual car or use statistical average for specific year/make/model;
   b. Air quality sensor in tailpipe;
   c. EPA database of grams C02 emitted per mile based on year/make/model; and/or
   d. Tailpipe emissions standards;
2. Gallons of fuel combusted:
   a. Per trip;
   b. Per time period (e.g., gallons used per month and/or per year):
      i. Connected car integration to provide tank levels— such as trigger the request manually by pressing a button on the app every time a person fills the tank;
   c. Per tank refill:
      i. Enter the Pump snaps using OCR onboard mobile phone camera;
      ii. Ping Fuel level API for connected car to determine tank level; and/or
      iii. Use machine learning and/or other predictor to determine fuel consumed;
3. Statistical rollup of data from phone app:
   a. Year/make/model;
   b. Location/route; and/or
   c. Driving score;
4. In car:
   a. Real-time display of fuel efficiency in-car; and/or
   b. Trip report;
5. Use some or all of the above to collect training data, then use the app to log driving distance:
   a. By matching path to the road path, the app understands the estimated and/or logged trip distance;
6. Input a trip and/or the miles per gallon:
   a. For example, the app simulates the same trip with alternative vehicles;
7. Electric vehicle emissions:
   a. Use address and name for the utility;
   b. Solar panels on the roof or not;
   c. Use the mobile app to understand where the trip starts and ends; and/or
   d. Understand the utility of the common charging locations.

In some embodiments, the system (e.g., the computer program product) is configured to understand a person's carbon emission in real time and/or in batch. As an example, the system (e.g., the computer program product) is configured to perform one or more of the following in real time:

1. Phone as interface (e.g., a universal real-time interface):
   a. Enter Year/Make/Model;
   b. Use phone sensors, (e.g., gyroscope, GPS sensor): Determine the unnecessary fuel being consumed (e.g., harsh acceleration or gentle acceleration, harsh braking or slower braking);
   c. Max speed (e.g., with degraded performance with regard to CO2 emissions): Reference ambient traffic speed and solve multi-optimization problem, and/or determine safe speed and/or efficient speed;
   d. Feedback (e.g., you are doing not good, immediate burning red, and/or heads up);
   e. Visualization (e.g., a visualization of vehicle emitting healthy trees);
   f. Heads up displays;
   g. Quality of driving (e.g., whether people are making safe driving choices): Safe driving choices fill up a gauge bar and the person can earn a reward (e.g., a tree fills up). In contrast, unsafe driving choices burn the tree down. For example, the reword is that, when a tree is filled up, we plant a tree on your behalf
   h. General feedback:
      i. Visual feedback;
      ii. Haptic feedback (e.g., through steering wheel, watch, and/or phone in pocket); and/or
      iii. Audio feedback (e.g., noises, and/or dings);
   i. Realtime social proof: (e.g., social media post that you have earned and we planted a tree);
   j. Make the game: fit your acceleration pattern at optimum; and/or
   k. Show the gas savings in real time.

For example, the system (e.g., the computer program product) is configured to perform one or more of the following in batch:

1. A web portal:
   a. Visualizations: show running totals of carbon a person has emitted, and/or see carbon on a carbon leaderboard;
   b. Cohorts (e.g., a person's town and/or a person's political affiliation):
      i. How is the person doing within this group?
      ii. Is the person doing the person's fair share? and/or
      iii. Who in this group is doing the most?
   c. Translation of carbon from tons of $CO_2$ emitted: Translate tons of $CO_2$ emitted into another concept— e.g., how many trees a person would have to plant to offset this person's carbon. For example, you are burning trees, so you need to plant these many trees;
   d. Red/green tokens: balance. For example, make a person's carbon balance zero;
   e. Emissions hotspot: one or more locations where a person's harsh acceleration and/or harsh braking occur;
   f. Segments through which a person drives multiple times: Many drivers drive the same segments of road. For all those people, how much carbon individuals are emitting on one segment can be determined. For example, carbon has been burned due to individuals' vehicle choices, and/or due to individuals' behaviors.
      i. How does an individual stack up to other people for the same segment of driving;
      ii. How does an individual's car stack up to other people's cars for the same segment of driving? For example, does an individual's car burn more than other people's cars for the segment of driving? and/or iii. How much carbon is due to what an individual can control right now. For example, there are people who burn less carbon than this individual for the same segment of driving;

g. Comparison to other forms of travels for the same segment of travel:
  i. Cyclists on the same segment are emitting a different amount, and they are increasing their heath; and/or
  ii. An individual can walk, thus saving environment and adding years to the individual's life;

h. Directed feedback (e.g., time of day visualization): When everyone else is driving and emitting. If you go at the same time you breathe the bad air and also add to the bad air.
  i. Reduction of stop and go traffic: If an individual resist the stop and go and buffer, the individual can help smooth out the traffic behind this person. The individual can emit less and also help others emit less;

j. Effect on other vehicles: how many people would be delayed and at what hourly rate? and/or k. Recommendation for next car upgrade: Given an individual's driving and vehicle characteristics, after normalization of such characteristics, the individual's next car is recommended;

2. App;
3. Email;
4. Social media;
5. Ad-based feedback:
  a. For example, an individual has helped plant 45 trees from this person's good driving. Thanks. Clicks through to your portal; and/or
  b. As an example, the ad-based feedback keeps drivers engaged; and/or
6. Smart billboard.

In certain embodiments, the system (e.g., the computer program product) is configured to cause carbon footprint reduction and/or behavior change. In some embodiments, the system (e.g., the computer program product) is configured to perform one or more of the following:

1. Compare users in similar vehicles in similar environments;
2. Compare trip facts with other similar trips an individual takes over again (e.g., the individual's commute)
  a. e.g., above 80 MPH; and/or
  b. e.g., harsh accelerations
3. Road segments:
  a. Number of road segments (e.g., 30,000 road segments);
  b. Predictable events (e.g., consistent hard brakes);
  c. Distribution behaviors. For example, each segment has a distribution of behaviors;
  d. Comparison with one or more other drivers (e.g., a ghost driver, an average driver). For example, the average speed is 70 MPH, but in contrast, the individual's speed is 85 MPH.
    i. The routes an individual driver drives are unique to the individual;
    ii. The simulated driver concept lets the individual compete with other who drive on the same roads; and/or
    iii. Performance levels:
1. e.g., this is the performance of average; and/or
2. e.g., the is the performance of best 10%.
4. Corporate carbon footprint challenge: teams of drivers within companies or between companies vie to win recognition as having the smallest actual carbon footprint;
5. Commute scoring and optimization: e.g., define a trip to work as any telemetry journey that arrives or ends at your office GPS:
  a. e.g., 10× points for walking to work;
  b. e.g., 5× points for biking to work; and/or
  c. e.g., extra bonus for multi-modal trips;
6. Carpooling support;
7. Telecommuting support;
8. Walking commute support;
9. Bike commuting support: solve problems for bikers, and/or make biking safer
  a. Smart helmet; and/or
  b. Smart bike light with turn signals and braking;
10. Make biking to work easier:
  a. Electric assist;
  b. Parking; and/or
  c. Sharing;
11. Electric-drive personal mobility:
  a. Scooters;
  b. Skateboards; and/or
  c. One-wheels;
12. Air quality measurement along an individual's commute;
13. Shared bike;
14. Route-planning based on carbon footprint (e.g., lowest carbon footprint);
15. Highway; and/or
16. Divide emissions by number of passengers in car to spread the accountability to others in the car.

In some embodiments, the system (e.g., the computer program product) is configured to offset an individual's portion of emissions. For example, a quality of driving score is calculated based on how efficient an individual drives and conserves emissions. As an example, the carbon offsets are purchased and/or trees are bought based on an individual's efficiency. For example, if an individual is 100% efficient, offsets for 100% of the individual's emissions are purchased on behalf of this individual. In certain embodiments, the system (e.g., the computer program product) is configured to empower an individual to offset the rest.

According to certain embodiments, a system including a mobile device app that reports driving data to a server algorithm that uses the data and vehicle specific data to estimate the total carbon released during individual trips. As an example, the system is associated with one or more of the following features:

a. Algorithm estimates fuel consumption during the trip, which is used to derive carbon release;
b. Algorithm is based on a model calibrated with user-supplied fueling and driving distance inputs;
c. Driving data includes location, accelerometer data, gyroscopic data, magnetometer data, and/or barometer data;
d. System rewards users for mindful driving (and potentially carpooling) with insurance discounts based on carbon release;
e. System provides route suggestions for a destination based on actual user driving behaviors to reduce carbon footprint; and/or
f. System provides training feedback to modify driving techniques to reduce carbon footprint.

According to some embodiments, a system including a mobile device app that reports driving data to a server algorithm that uses the data to compare actual MPG performance to vehicle manufacturer MPG claims and/or MPG performance of other drivers. As an example, the system is associated with one or more of the following features:

a. System provides gaming environment to encourage improved mindful driving behaviors (e.g., controlling for environmental factors);
b. System provides route suggestions for a destination based on actual user driving behaviors to optimize fuel consumption; and/or
c. System provides training feedback to modify driving techniques to reduce fuel consumption.

In some embodiments, a system (e.g., a computer program product) uses a phone to automatically log data elements for every trip, such as locations. For example, an accelerometer of the phone is used to detect information related to braking, acceleration, and/or cornering. As an example, a gyroscope of the phone is used to detect information related to where the phone is facing in space. For example, a magnetometer of the phone is used to detect information related to where the phone is facing respect to the North. As an example, a barometer of the phone is used to detect information related to elevation of the phone.

In certain embodiments, a system (e.g., a computer program product) is configured to join sensor data with weather data and/or other data sets. For example, other data sets include data about different types of vehicles and facts about the vehicles. As an example, the system uses how far and/or aggressively a driver drove to estimate how much gas the driver has used. For example, the system is configured to obtain actual gas snapshots of fuel used, and/or odometer snapshots. As an example, these actual snapshots provide data that are used to train the model, which, once trained, can be used as a predictive model to determined expected gas used.

In some embodiments, a system (e.g., a computer program product) is configured to use sensor data collected from a phone with vehicle specific data to determine total gas usage for a trip to derive total carbon released. For example, a neural network is trained to put together trips concatenated together to predict the final MPH without having to use the specific vehicle type. As an example, by training model in this way, one can learn how various events relate to burning gas (e.g., being still in traffic).

In certain embodiments, a system (e.g., a computer program product) is configured to work with electric vehicles (e.g., taking into account their charging location). For example, the electric vehicles are usually plug in at home. As an example, the system is configured to derive which utility provide electricity to the home, and estimate carbon needed to generate the electricity. For example, electric cars do not really use that much less in carbon than fuel powered cars. As an example, the system is configured to compute carbon emissions of all electric and/or hybrid electric vehicles.

In some embodiments, a system (e.g., a computer program product) is configured to verify the accuracy of car MPH claims. For example, the system is configured to compare a driver's MPH for a particular vehicle to other drivers after controlling for environmental factors that the driver cannot control. As an example, the system is configured to provide a ghost car that an actual driver can drive with to improve performance. For example, if the actual driver does what the ghost driver does, the actual driver is considered to be the perfect driver. As an example, the system is configured to let an actual driver to compete with other people who drive on same roads. For example, the system is configured to provide level assessment (e.g., here is what you do to be average but here is what you do to get to the top level).

In certain embodiments, a system (e.g., a computer program product) is configured to receive from a user information related to origin and destination and then provide the user with the best route (e.g., route planning) for the environment (e.g., reduction of carbon footprint) based on how the user actually drives (e.g., the driving characteristics of the user). In some embodiments, a system (e.g., a computer program product) is configured to provide a driver with information on how the driver can improve driving techniques to reduce carbon footprint (e.g., by making fewer hard brakes, reducing time over a certain speed threshold such as 80 MPH). For example, the system is configured to help a driver to reduce carbon emissions for the trip that the driver takes over and over again. In another example, the system is configured to pass the data to a back-end server.

In some embodiments, a system (e.g., a computer program product) is configured to predict an individual's actual MPH in other types of vehicles (e.g., to help the individual buy a different vehicle) based on the model of the system. In certain embodiments, the system (e.g., a computer program product) is related to accounting what a driver is doing, improving driving behavior, and/or offsetting carbon footprint.

FIG. 7 to FIG. 22 are simplified diagrams showing a system (e.g., a computer program product) according to certain embodiments. These diagrams are merely examples.

FIG. 23 to FIG. 42 are simplified diagrams showing a system (e.g., a computer program product) according to some embodiments. These diagrams are merely examples.

VI. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VII. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method for selecting a vehicle route, the method comprising:
 collecting, by a computing device, information for a future vehicle trip that will be made by a user, the future vehicle trip corresponding to a particular pair of origination and destination points;
 generating, by the computing device, multiple routes for the future vehicle trip, the multiple routes all corresponding to the particular pair of origination and destination points;
 predicting, by the computing device, multiple amounts of fuel consumption for the multiple routes respectively by providing the multiple routes for the future vehicle trip to an artificial neural network that is trained using one or more sets of training data that are adjusted based on a modeling function, wherein the modeling function comprises at least one of a loss function or a cost function, wherein for each route of the multiple routes, an amount of fuel consumption by the user is predicted based at least in part upon information for the route and one or more user driving features of the user, wherein the one or more user driving features comprise one or more driving maneuvers each comprising a respective type, a respective speed, and a respective duration, and wherein the one or more driving maneuvers are each configured to be classified by a level of fuel consumption based on the respective type, the respective speed, wherein the respective duration of each of the one or more driving maneuvers, and wherein the respective type for each of the one or more driving maneuvers comprises a respective one of braking, acceleration, speeding, or cornering; and selecting, by the computing device, a selected route from the multiple routes based at least in part upon the multiple amounts of fuel consumption, the selected route corresponding to a least amount among the multiple amounts of fuel consumption.

2. The method of claim 1, further comprising:
collecting, by the computing device, user driving data for one or more vehicle trips that have already been made by the user, the user driving data including information related to a user driving behavior; and analyzing, by the computing device, the user driving data to determine the one or more user driving features of the user, the one or more user driving features being related to a fuel consumption efficiency of the user.

3. The method of claim 1, wherein the selected route is driven by the user between the particular pair of origination and destination points for the future vehicle trip.

4. The method of claim 2, wherein the one or more user driving features include:
one or more first user driving features that increase the fuel consumption efficiency of the user; and
one or more second user driving features that decrease the fuel consumption efficiency of the user;
wherein:
the one or more first user driving features correspond to one or more first importance levels respectively for increasing the fuel consumption efficiency of the user; and
the one or more second user driving features correspond to one or more second importance levels respectively for decreasing the fuel consumption efficiency of the user.

5. The method of claim 1, wherein the multiple routes for the future vehicle trip are generated based at least in part upon the information for the future vehicle trip.

6. The method of claim 5, wherein the information for the future vehicle trip include:
one or more vehicle information for the future vehicle trip;
one or more distance information for the future vehicle trip; and
one or more congestion information for the future vehicle trip.

7. A method for selecting one or more vehicle routes for one or more users for a same future vehicle trip, the method comprising:
collecting, by a computing device, information for a future vehicle trip that will be made separately by a first user and by a second user, the future vehicle trip corresponding to a particular pair of origination and destination points;
generating, by the computing device, multiple routes for the future vehicle trip, the multiple routes all corresponding to the particular pair of origination and destination points;
predicting, by the computing device, a first set of multiple amounts of fuel consumption for the multiple routes respectively by providing the multiple routes for the future vehicle trip to an artificial neural network that is trained using one or more sets of training data that are adjusted based on a modeling function, wherein the modeling function comprises at least one of a loss function or a cost function, wherein for each route of the multiple routes, an amount of fuel consumption by the first user is predicted based at least in part upon information for the route and a first set of one or more user driving features of the first user, wherein the one or more user driving features comprise one or more driving maneuvers each comprising a respective type, a respective speed, and a respective duration, and wherein the one or more driving maneuvers are each configured to be classified by a level of fuel consumption based on the respective type, the respective speed, wherein the respective duration of each of the one or more driving maneuvers, and wherein the respective type for each of the one or more driving maneuvers comprises a respective one of braking, acceleration, speeding, or cornering;

selecting, by the computing device, a selected first route from the multiple routes based at least in part upon the first set of multiple amounts of fuel consumption for the multiple routes, the selected first route corresponding to a least amount among the first set of multiple amounts of fuel consumption;

predicting, by the computing device, a second set of multiple amounts of fuel consumption for the multiple routes respectively, wherein for each route of the multiple routes, an amount of fuel consumption by the second user is predicted based at least in part upon information for the route and a second set of one or more user driving features of the second user; and selecting, by the computing device, a selected second route from the multiple routes based at least in part upon the second set of multiple amounts of fuel consumption for the multiple routes, the selected second route corresponding to a least amount among the second set of multiple amounts of fuel consumption.

8. The method of claim 7, further comprising:
collecting, by the computing device, a first set of user driving data for a first set of one or more vehicle trips made by the first user, the first set of user driving data including information related to a first user driving behavior; and analyzing, by the computing device, the first set of user driving data to determine the first set of one or more user driving features, the first set of one or more user driving features being related to a first fuel consumption efficiency of the first user.

9. The method of claim 8, further comprising:
collecting, by the computing device, a second set of user driving data for a second set of one or more vehicle trips made by the second user, the second set of user driving data including information related to a second user driving behavior; and analyzing, by the computing device, the second set of user driving data to determine the second set of one or more user driving features, the second set of one or more user driving features being related to a second fuel consumption efficiency of the second user.

10. The method of claim 9, wherein the first user is different from the second user.

11. The method of claim 10, wherein the first set of one or more user driving features for the first user is different from the second set of one or more user driving features for the second user.

12. The method of claim 11, wherein the second set of multiple amounts of fuel consumption for the multiple routes being different from the first set of multiple amounts of fuel consumption for the multiple routes.

13. The method of claim 12, wherein the selected second route being different from the selected first route.

14. The method of claim 7, wherein:
the selected first route is driven by the first user between the particular pair of origination and destination points for the future vehicle trip; and
the selected second route is driven by the second user between the particular pair of origination and destination points for the future vehicle trip.

15. A computing device for selecting a vehicle route, the computing device comprising:
one or more processors; and
a memory storing instructions that, when executed by the one or more processors, cause the one or more processors to:
collect information for a future vehicle trip that will be made by a user, the future vehicle trip corresponding to a particular pair of origination and destination points;
generate multiple routes for the future vehicle trip, the multiple routes all corresponding to the particular pair of origination and destination points;
predict multiple amounts of fuel consumption for the multiple routes respectively by providing the multiple routes for the future vehicle trip to an artificial neural network that is trained using one or more sets of training data that are adjusted based on a modeling function, wherein the modeling function comprises at least one of a loss function or a cost function, wherein for each route of the multiple routes, an amount of fuel consumption by the user is predicted based at least in part upon information for the route and one or more user driving features of the user, wherein the one or more user driving features comprise one or more driving maneuvers each comprising a respective type, a respective speed, and a respective duration, and wherein the one or more driving maneuvers are each configured to be classified by a level of fuel consumption based on the respective type, the respective speed, wherein the respective duration of each of the one or more driving maneuvers, and wherein the respective type for each of the one or more driving maneuvers comprises a respective one of braking, acceleration, speeding, or cornering; and
select a selected route from the multiple routes based at least in part upon the multiple amounts of fuel consumption, the selected route corresponding to a least amount among the multiple amounts of fuel consumption.

16. The computing device of claim 15, wherein the instructions, when executed by the one or more processors, further cause the one or more processors to:
collect user driving data for one or more vehicle trips that have already been made by the user, the user driving data including information related to a user driving behavior; and
analyze the user driving data to determine the one or more user driving features of the user, the one or more user driving features being related to a fuel consumption efficiency of the user.

17. The computing device of claim 15, wherein the selected route is driven by the user between the particular pair of origination and destination points for the future vehicle trip.

18. The computing device of claim 16, wherein the one or more user driving features include:
one or more first user driving features that increase the fuel consumption efficiency of the user; and
one or more second user driving features that decrease the fuel consumption efficiency of the user;
wherein:
the one or more first user driving features correspond to one or more first importance levels respectively for increasing the fuel consumption efficiency of the user; and
the one or more second user driving features correspond to one or more second importance levels respectively for decreasing the fuel consumption efficiency of the user.

19. The computing device of claim 15, wherein the multiple routes for the future vehicle trip are generated based at least in part upon the information for the future vehicle trip.

20. The computing device of claim 19, wherein the information for the future vehicle trip include:
one or more vehicle information for the future vehicle trip;
one or more distance information for the future vehicle trip; and
one or more congestion information for the future vehicle trip.

* * * * *